United States Patent [19]

Dailey et al.

[11] Patent Number: 4,825,388

[45] Date of Patent: Apr. 25, 1989

[54] APPARATUS AND METHOD FOR PROCESSING DIGITAL IMAGES

[75] Inventors: David C. Dailey, West Trenton; Richard B. Mott, Ringoes, both of N.J.

[73] Assignee: Princeton Gamma Tech., Inc., Princeton, N.J.

[21] Appl. No.: 846,915

[22] Filed: Apr. 1, 1986

[51] Int. Cl.$^4$ .................. G06F 15/00; G09G 1/19
[52] U.S. Cl. .................... 364/518; 364/522; 382/47
[58] Field of Search .................. 364/518, 521, 522; 340/720, 724, 798, 799, 800; 382/47, 44, 45, 46, 48; 358/111

[56] References Cited

U.S. PATENT DOCUMENTS

| | | | |
|---|---|---|---|
| Re. 31,200 | 4/1983 | Sukonick et al. | 340/724 |
| 4,197,590 | 4/1980 | Sukonick et al. | 364/900 |
| 4,356,482 | 10/1982 | Oguchi | 340/731 |
| 4,393,402 | 7/1983 | Keyes et al. | 358/111 |
| 4,394,684 | 7/1983 | Verhoeven | 358/111 |
| 4,425,580 | 1/1984 | Haendle et al. | 358/111 |
| 4,437,161 | 3/1984 | Anderson | 364/414 |
| 4,482,918 | 11/1984 | Keyes et al. | 358/111 |
| 4,484,187 | 11/1984 | Brown et al. | 340/724 X |
| 4,496,985 | 1/1985 | Jensen et al. | 358/111 |
| 4,520,358 | 5/1985 | Makino | 340/799 |
| 4,533,910 | 8/1985 | Sukonick et al. | 340/721 |
| 4,546,349 | 10/1985 | Prohofsky et al. | 340/731 |
| 4,613,852 | 9/1986 | Maruko | 340/723 X |
| 4,616,336 | 10/1986 | Robertson et al. | 340/723 X |
| 4,686,580 | 8/1987 | Kato et al. | 382/47 X |

OTHER PUBLICATIONS

"Electronic Displays", Sol Sherr, Pub., by John Wiley and Sons Pub. Co., pp. 324–381, (1979).
"Continuous Anti-Aliased Rotation and Zoom of Raster Images", by C. Weiman, 1980 Conference Proceedings, Computer Graphics, 14(3), 286–293, (Jul., 1980).
"Image View System", manufactured by Lexidata Corp., Billerica, Mass., (1983).
PC-VISION®, Model #FG-100-AT brochure of Imaging Technology, Inc., Woburn, Mass.
Trapix 5500 brochure of Recognition Concepts, Inc., in Incline Village, Nev., 89540.
"Computer Comparison of Digital Images", by R. B. Mott, R. H. Geiss, Ed., Microbeam Analysis, 287–289, (1987).
Fundamentals of Interactive Computer Graphics by J. D. Foley and A. Van Dam, Chapter 12, pp. 149, 479 and 488 to 500.
Electronic Displays, by Sol Sherr, pub. by John Wiley & Sons Publishing Co., pp. 347–354 and 363–381.
"Continuous Anti-Aliased Rotation and Zoom of Raster Images", by C. Weiman, published by the Association for Computing Machinery, SIGGRAPH, 1980.

Primary Examiner—Gary V. Harkcom
Assistant Examiner—H. R. Herndon
Attorney, Agent, or Firm—Hoffmann & Baron

[57] ABSTRACT

A computer graphics apparatus and a method for allowing the comparison of two or more digitally-stored images on a raster-scan display device, such as a cathode ray tube (CRT), by use of arithmetic or Boolean logic operations performed on the picture elements (pixels) in each image which are to be superimposed at a given display pixel on the CRT. The invention provides the features of color lookup tables, continuous zoom and roam logic and high-speed processing in a computer graphics apparatus for digital image comparison.

21 Claims, 36 Drawing Sheets

ZOOM

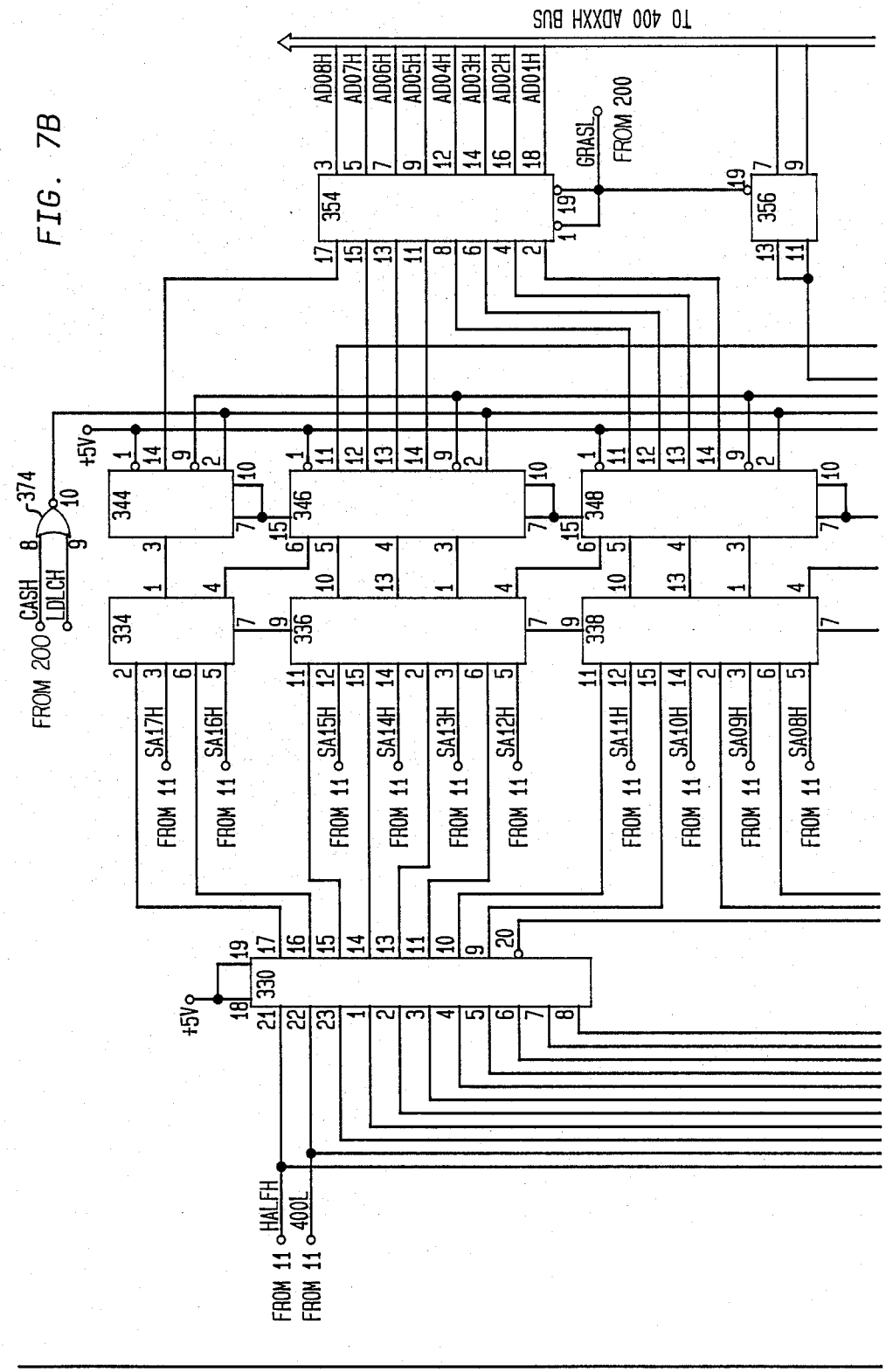

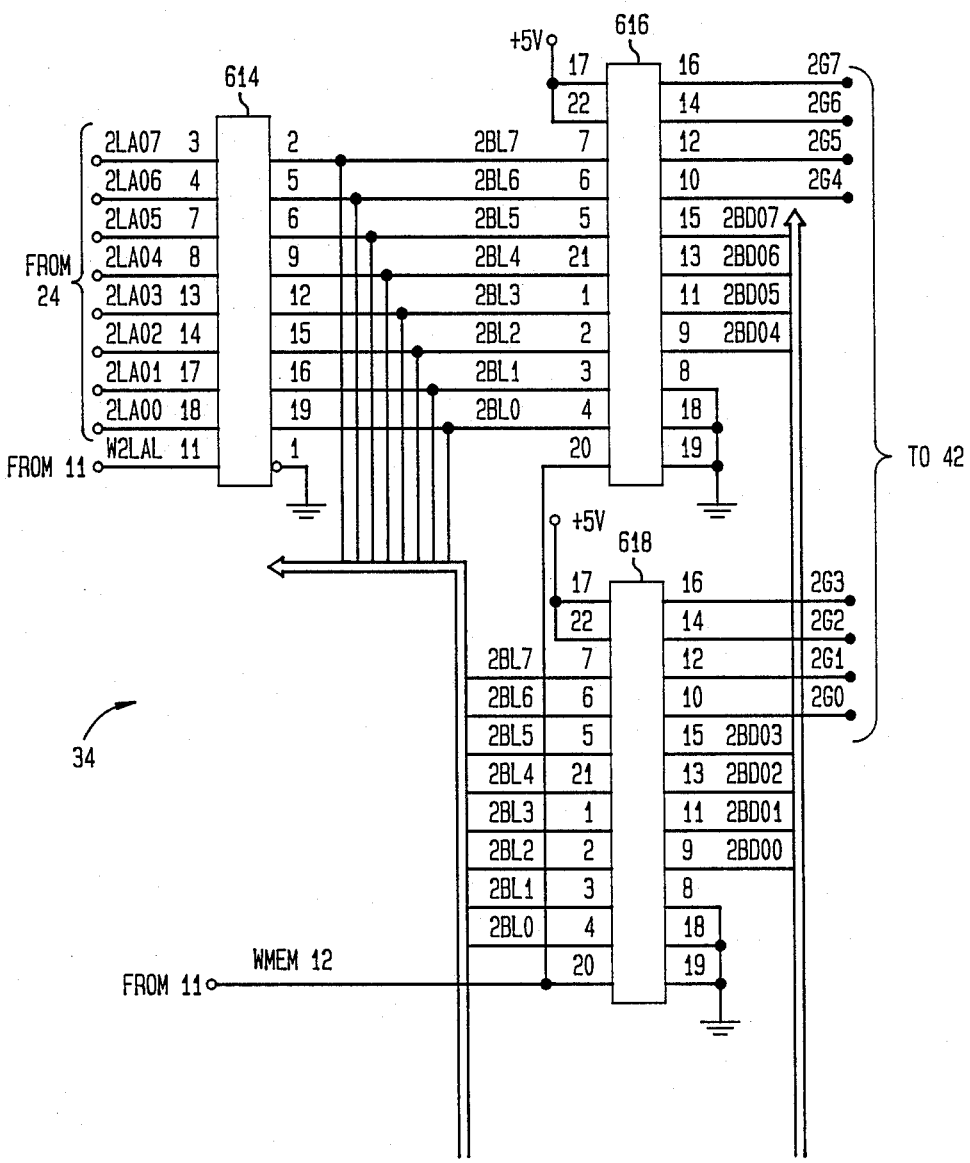

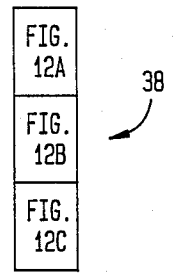
FIG. 12
FIG. 12A
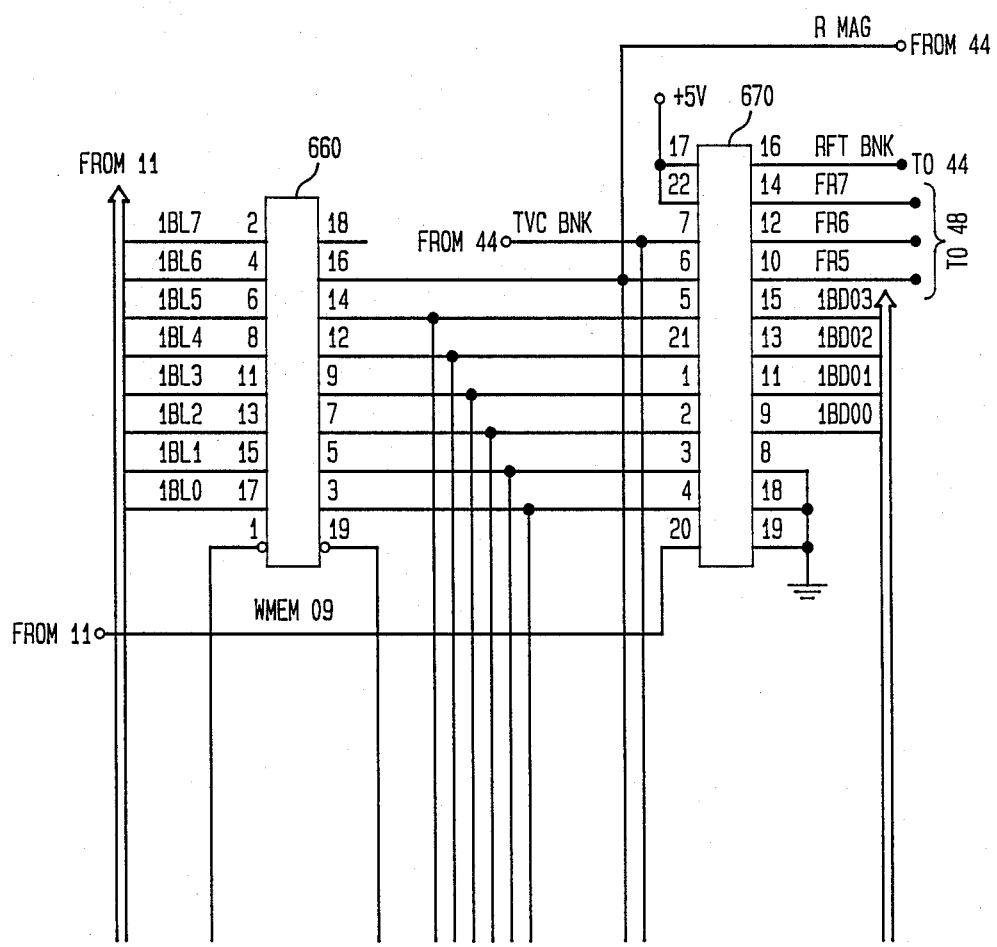

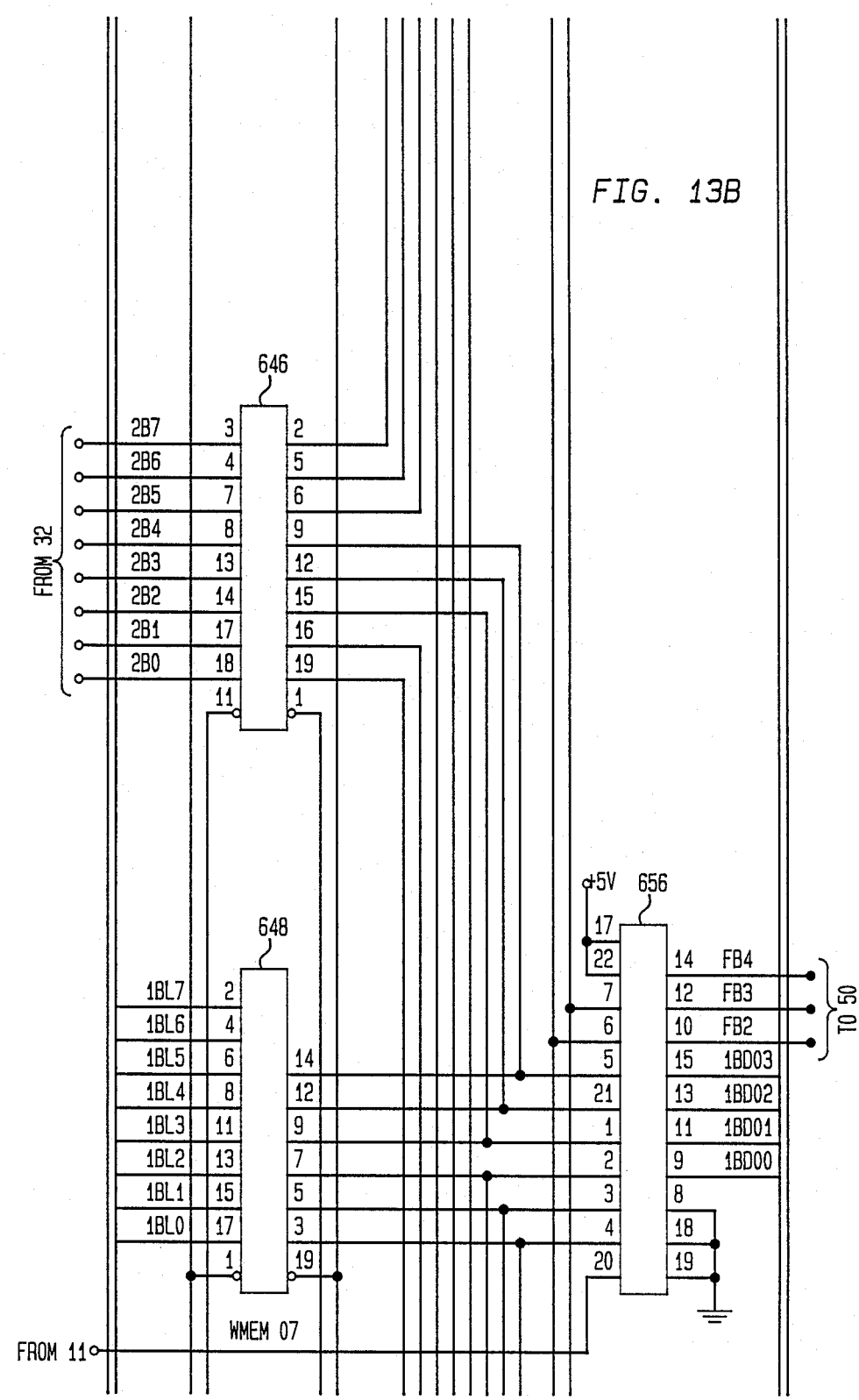

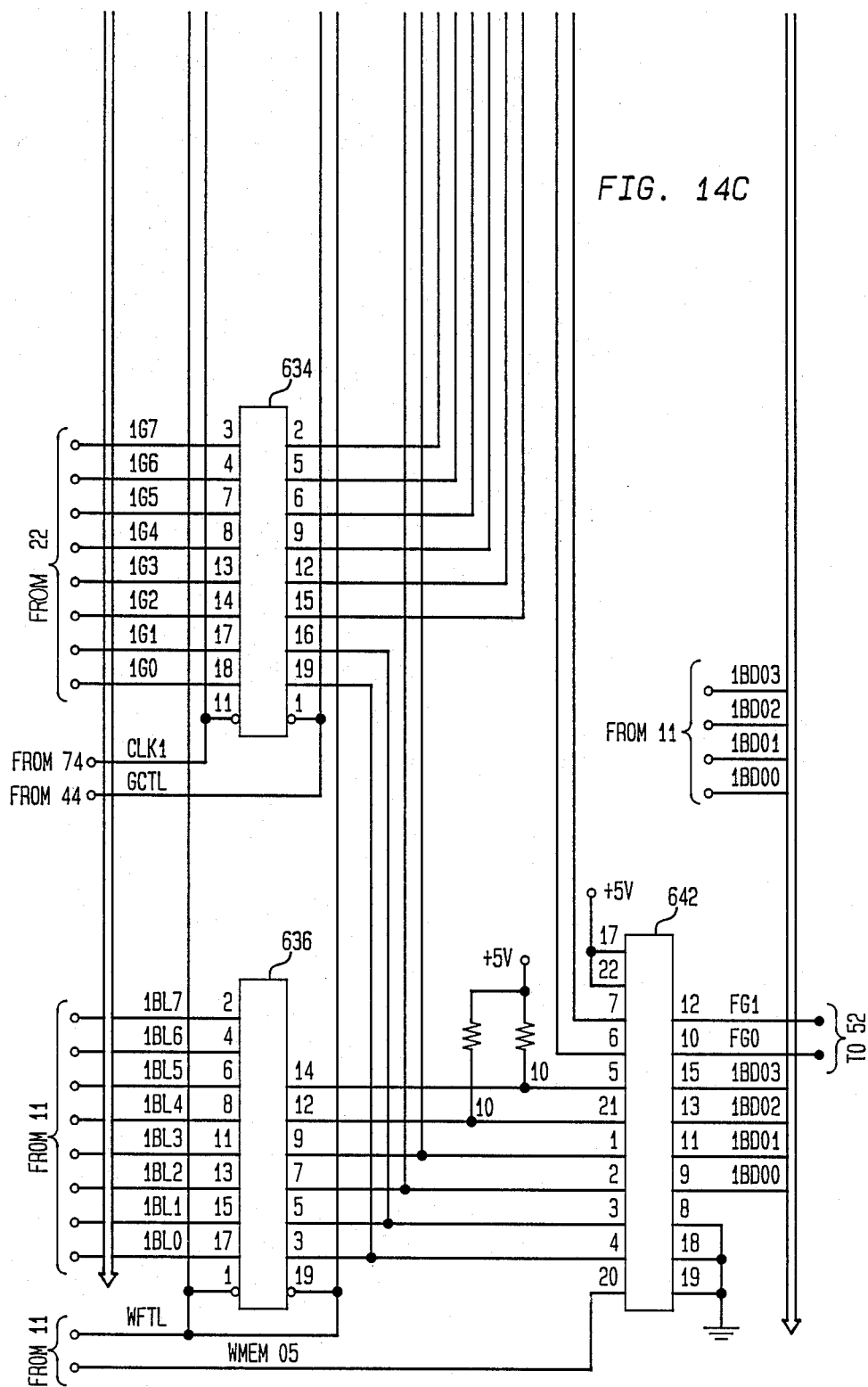

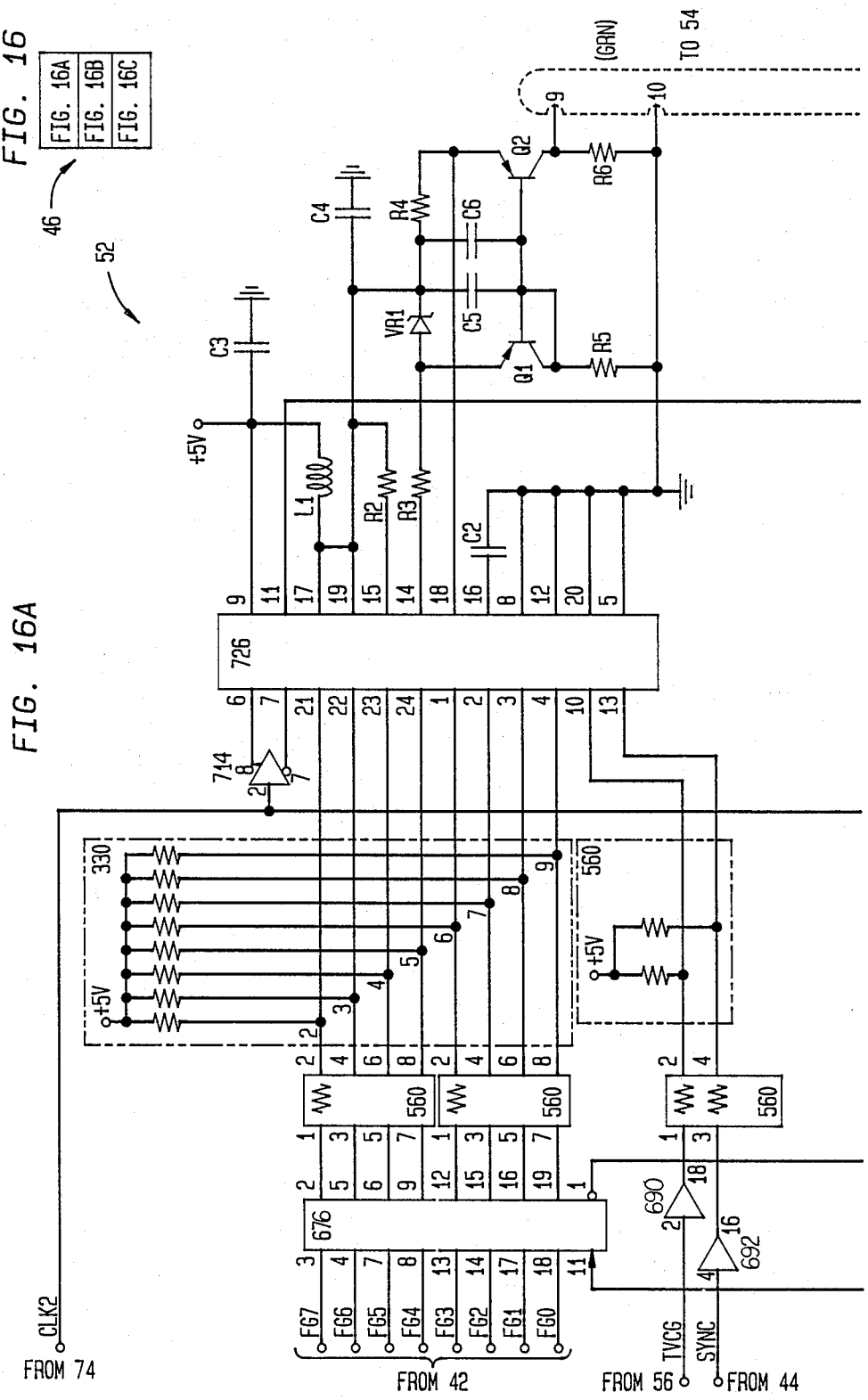

APPARATUS AND METHOD FOR PROCESSING DIGITAL IMAGES

BACKGROUND OF THE INVENTION

1. Field of the Invention

This invention relates to an improved computer graphics apparatus and method for comparing two or more digitally-stored images on a raster-scan display device.

2. Description of the Prior Art

The processing and analysis of digital images often requires comparison or combination of two different images that are related in some way, producing another digital image which represents the result. The specific application which led to the development of this invention is quality control and failure analysis of integrated circuit chips. Using the "voltage contrast" technique, digital images in which the intensity is correlated with voltage at each pixel can be collected. For example, an image from a scanning electron microscope of a faulty device can be compared with an image of a functioning one to locate the faults by visually comparing the differences between the two images. Similarly, in fields such as materials science, differences between successive images show propagation of failures in stressed parts. In other applications, the user is interested in regions where two images match rather than where they differ. For example, in biological and medical research the use of two-dimensional gel electrophoresis produces an image whose pattern represents the distribution of the components in a sample. To determine the content of an unknown sample, the unknown sample images may be matched against images of many standards, such as proteins, amino acids and nucleic acids.

A brief history of computer graphics as well as helpful definitions of many of the concepts and terms used by those skilled in the art are presented and discussed in *Fundamentals of Interactive Computer Graphics* by J.D. Foley and A. Van Dam, Addison-Wesley Publishing Co. (1982), at Chapter 1, Pages 18–22, Chapter 3, Pages 129–135 and Chapter 12, Pages 479, 488–500. Also see, *Electronic Displays* by Sol Sherr, John Wiley & Sons Publishing Co. (1979), and *Computer Graphics Theory and Application* by Tosiyasu and Kumii, Springer-Verlag Publishing Co. (1984).

The general concept of computer graphics displays of the kind having a refresh memory buffer connected to a raster-scan display is well explained in Sherr's book *Electronic Displays*. Sherr discusses refresh memory at pages 347–354, and the connection of the refresh memory to a raster-scan display under the heading "digital television" at pages 363–381.

The Foley and Van Dam, and the Tosiyasu and Kumii textbooks discuss the concept of generating apparent magnification on a display by causing one pixel in the image buffer to appear in more than one pixel on the display. They also explain the concept of transforming intensity values stored in the image buffer into new intensity values or colors by using a lookup table, and the concept of processing mathematical functions using a lookup table.

Foley and Van Dam explain at page 492 that only translation (roam) and integer scalings are available commercially. Integer scaling means zoom by integer numbers (1, 2, 3, etc.) so that a single pixel in the image buffer covers a 2 by 2, 3 by 3, etc. pixel area on the display. Tosiyasu and Kumii, two years later, stated that only binary (2, 4, 8...) or integer scalings are available commercially.

Foley and Van Dam discuss at pages 489–491 the concept of performing mathematical operations on two images using lookup tables. However, the images are assumed to be in the stacked bit planes (i.e. a one-to-one correspondence between pixels in all images). Our invention permits non-integer scaling relationships between the images. Also, nowhere in either test is the concept mentioned of concatenating the logic for processing mathematical functions to intensity or color lookup tables in order to process the mathematical function on the outputs of the lookup tables. The functions are assumed to be processed directly on the value stored in the image buffer. Our invention processes the mathematical function on the output of the color lookup tables, permitting either the function process (which may also be implemented as lookup tables), or the color lookup tables to be altered independently and both to be altered without affecting the data stored in the image buffer.

Foley and Van Dam also reference a paper published by the ACM (Association for Computing Machinery) SIGGRAPH (Special Interest Group for Graphics), 1980 Conference Proceedings, published as *Computer Graphics* 14(3) (July 1980) at pages 286–293. The paper is entitled *Continuous Anti-aliased Rotation and Zoom of Raster Images* by C. Weiman. This paper describes purely a software implementation of an algorithm for performing a continuous zoom. Although mention is made of the possibility of placing this algorithm into hardware, no disclosure is given of how this could be done. Further, the algorithm as shown requires modifying the data in the image memory buffer, which consumes time and destroys the relationship between the image pixel data and the color lookup tables. Preservation of image data when performing zoom operations is a purpose of our invention.

There are many commercially available image buffer display systems, some packaged as complete systems and some packaged as printed circuit boards for use with a host computer system. Some image buffer display systems contain "pipeline processors". These systems provide separate apparatus for altering the grey levels or colors assigned to the pixels in an image with lookup tables; for varying the apparent magnification ("zoom") or position ("pan" or "roam") of the displayed area within the digital image and for computing the results of operations on the pixels contained in the two digital images at high rates with said pipeline processor. The aforementioned functions are all treated independently in the prior art devices. These pipeline processors operate on pixel intensity without regard to assigned colors and either ignore screen zoom-roam altogether or assume a one-to-one correspondence between the two or more input pixels and between the input pixels and the output pixel. In addition a currently popular technique called "windowing" does not overcome these limitations, but merely divides the display into a number of regions, each of which is separately subject to the same limitations.

These pipeline processors cannot dynamically correct for differences between two or more images. They must correct the data in the stored image for registration, scaling, and grey-level normalization, separately before the high speed comparison can be done.

The following systems are typical of currently available apparatus. Imaging Technology Incorporated, in Woburn, Mass. 01801, markets a printed circuit board (or set of boards) for use with the IBM At series personal computers, under the mark PC-Vision ®, model number FG-100-AT. This product includes an image buffer, zoom and roam logic and color lookup tables (red, blue and green). However, only zoom magnifications of 2, 4 and 8 are available. All bit planes in the buffer are a synchronized stack; no independent zoom and roam is possible. No function processing exists between the color lookup tables and the DAC's. The host computer interface is described as a set of I/O-mapped registers allowing programs to control the functions of the board or set of boards.

Lexidata Corporation, in Billerica, Mass. 01865, markets a system under the name Imageview which incorporates the concept, described by Foley and Van Dam, of dividing stacked bit planes into two images, and using a lookup table to perform the mathematical operations. Here again, the images cannot be zoomed and roamed independently. The color and function lookup tables are the same, so that for two images of N-bits, a table with $2^{2N}$ entries must be altered to change the mathematical function performed or the color assignments for either image. Our invention provides for independent zoom and roam and separates the color tables and function tables, permitting the color assignments for either image to be modified by altering only $2^N$ entries in that image's individual color tables. This becomes significant very quickly as N becomes larger; if N is 8 (two 8-bit images), $2^N$ is only 256, while $2^{2N}$ is 65,536.

Recognition Concepts, Inc. in Incline Village, Nev. 89450 markets a system under the name Trapix 5500 which incorporates a pipeline processor. This means that mathematical operations are destructive to the data in the image memory. By contrast, our invention does not alter image memory but shows the result on the display. Zoom in the Trapix 5500 is limited to integer values from 1 to 8, and the pipeline processor cannot operate on the output of the color lookup tables.

We are aware of no other company which provides a system that can perform near continuous non-integer zoom in their display hardware. However, Dipix Systems Ltd., Ottawa, Ontario, Canada, K2E 7J5, markets a system under the name Aries II which claims to have a continuous zoom, although no means of accomplishing this is disclosed. Further investigation has revealed that the system is capable of zooming in the relatively coarse linear steps 1, 1.2, 1.4, 1.6, etc., while our invention can zoom in increments of less than 2 percent (1, 1.0159, 1.0323, 1.0492, etc.) near unity and in progressively larger steps at higher magnifications. The small steps are useful for image comparison since often the images are fairly close in scale and fine adjustments are needed. The larger steps are useful when interactively viewing a single image, since the magnification appears to accelerate when zooming in to examine a relatively small area in the image. This acceleration is visually appealing as opposed to steady linear magnification at very fine steps.

None of the systems discussed herein is capable of processing mathematical operations on two images which are zoomed (by non-integer factors) and roamed in different amounts relative to each other, and displaying the resulting images wihtout altering the data in the image memories. None of the systems have separate color lookup tables preceding function processing logic, permitting the color tables to be updated independently of the functions; and for processing the functions on the transformed values produced by the color lookup tables. None of these systems is capable of providing zoom magnifications in very small increments near unity and providing progressively larger magnifications steps at higher magnifications. Our invention provides all these capabilities.

SUMMARY OF THE INVENTION

This invention provides an improved computer graphics apparatus and a method for allowing the comparison of two or more digitally-stored images on a raster-scan display device, such as a cathode ray tube (CRT), by means of arithmetic or Boolean logic operations performed on the picture elements (pixels) in each image which are to be superimposed at a given display pixel on the CRT. The invention provides the features of color lookup tables, continuous zoom and roam logic and high-speed processing in an improved computer graphics apparatus for digital image comparison.

Use of the apparatus according to the method of this invention allows for dynamic and interactive correction of differences between two or more images by changing only the zoom, roam and lookup table parameters. There is no need to modify the stored digital image intensities. The stored intensities are also not altered when the raster display is generated showing the results of the arithmetic or Boolean function performed on the images. The function selected and zoom, roam or lookup table parameters for either image memory can be changed independently without affecting any of the other parameters or the stored image data. The pixel comparison operations are performed on either grey level (black to white) or primary additive color (red, blue or green) output intensity values assigned to the pixel from the lookup table, rather than on the original intensity value stored in the digital image. The operations are performed at a rate matching the scan rate of the raster-scan display, allowing an image of the comparison results to be formed in a single complete scan.

The computer graphics digital image comparison apparatus includes at least two image memory refresh buffer devices for digitally storing an image in a pixel matrix which has a storage capacity of at least two bits per pixel. Zoom and roam logic devices for each of these memory refresh buffer devices independently provide an apparent continuous magnification on the raster-scan display of a region of the stored image which has a selected size and located at a position set by the roam device within the image memory refresh buffer device. The roam device selects a particular pixel in the image memory refresh buffer device which corresponds to a specific pixel on the raster-scan display device. The zoom device chooses a ratio of the display size, in pixels on the display, to the selected size of the region at the position set by the roam in the memory refresh buffer device. The ratio chosen by the zoom device is equal to a ratio of two whole numbers each not greater than the display size. Lookup table devices for each of the image memory refresh buffer devices are provided to independently transform the pixel selected by the roam device to a programmable value. A function processing logic device is used to mathematically process the programmable values derived from all of the lookup table devices and generate a new value. A digital-to-analog conversion device converts the new value generated by the function processing logic device into an analog signal, and a raster-scan display device uses the analog signal to produce a visible image.

These and other features of the invention will be more fully understood with reference to the following drawings and detailed description of the preferred embodiment.

BRIEF DESCRIPTION OF THE DRAWINGS

FIGS. 7 and 7A-7C comprise a detailed schematic of the memory address control and DRAM refresh generator apparatus of the present invention.

FIGS. 8 and 8A-8B comprise a detailed schematic of the refresh memory apparatus of the present invention.

FIGS. 9 and 9A-9B comprise a detailed schematic of the data latch and multiplex apparatus of the present invention.

FIGS. 11 and 11A-11C comprise a detailed schematic of the components of the color lookup tables for the second image memory refresh buffer of this invention.

FIGS. 12 and 12A-12C comprise a detailed schematic of the components of the red function processing logic apparatus of this invention.

FIGS. 13 and 13A-13C comprise a detailed schematic of the components of the blue function processing logic apparatus of this invention.

FIGS. 14 and 14A-14C comprise a detailed schematic of the components of the green function processing logic apparatus of this invention.

FIGS. 16 and 16A-16C comprises a detailed schematic of the components of the color digital-to-analog converter apparatus of this invention.

DETAILED DESCRIPTION OF THE INVENTION

During the course of this description like numbers will be used to indicate like elements according to the figures illustrating the invention.

Figure 1:
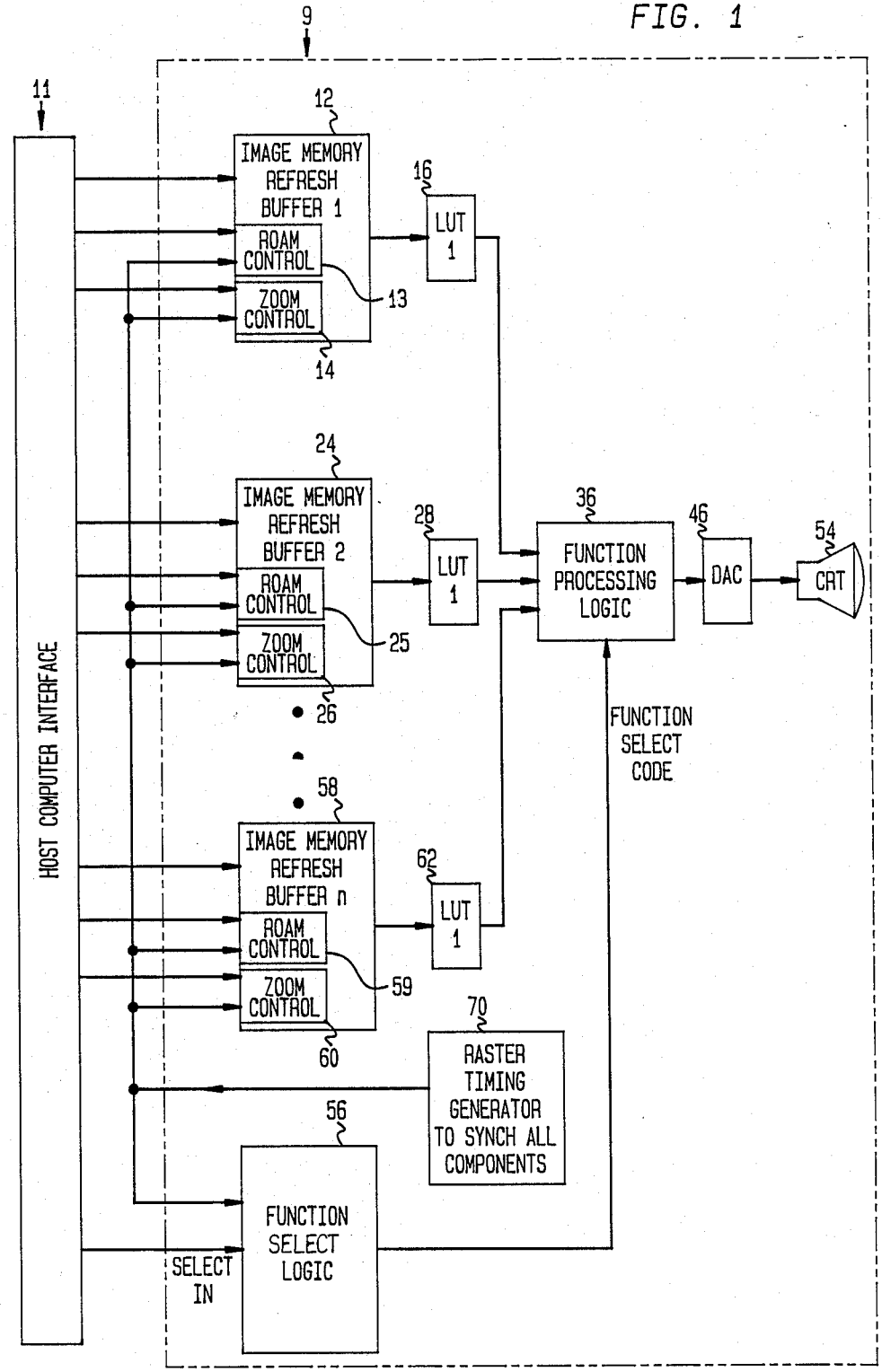
FIG. 1 is a block diagram showing the interrelationship between the major components of this invention.

FIG. 1 is a block diagram illustrating the essential components of a preferred embodiment 9 of an improved computer graphics digital image comparison apparatus for comparing and manipulating at least two digitally stored images from a host compute 11 and displaying a visible image of the result on a raster-scan display means 54. The apparatus 9 shown in FIG. 1 may be applied to monochrome (grey level black to white) image comparison systems. The apparatus 9 comprising at least two image memory refresh buffer means 12, 24, 58 for digitally storing an image in a pixel matrix having at least 2 bits per pixel. Independent zoom 14, 26, 60 and roam 13, 25, 59 logic apparatus for each of the image memory refresh buffer means 12, 24, 58, respectively, independently provide apparent magnification on the raster-scan display means 54 of a region of the digitally stored image having a selected size and located at a positin set by the roam means 13, 25 or 59, respectively, within the image memory refresh buffer means 12, 24, 58, respectively. The roam means 13, 25 or 59 selects a particular pixel in the image memory refresh buffer means 12, 24 or 58 which corresponds to a specific pixel on the raster-scan display means 54. The zoom means 14, 26 or 60 chooses a ratio of display size, in pixels on the display 54, to the selected size at the set region at the position found by the roam means 13, 25 or 59 in the memory refresh buffer means 12, 24, 58, respectively. The ratio chosen by the zoom means of 14, 26, or 60 is equal to a ratio of two whole numbers each not greater than the display 54 size. Independent lookup table means 16, 28 or 62 for each of the image memory refresh buffer means 12, 24 or 58 are provided to independently transform the pixel selected by the roam means 13, 25 or 59 to a programmable value. A function processing logic means 36 is used to mathematically process the programmable values derived from all of the lookup table means 16, 28 or 62 and generate a new value. A digital-to-analog conversion means 46 converts the new value generated by the function processing logic means 36 into an analog signal, and a raster-scan display device, such as a CRT, uses the analog signal to produce a visible image.

Figure 2:
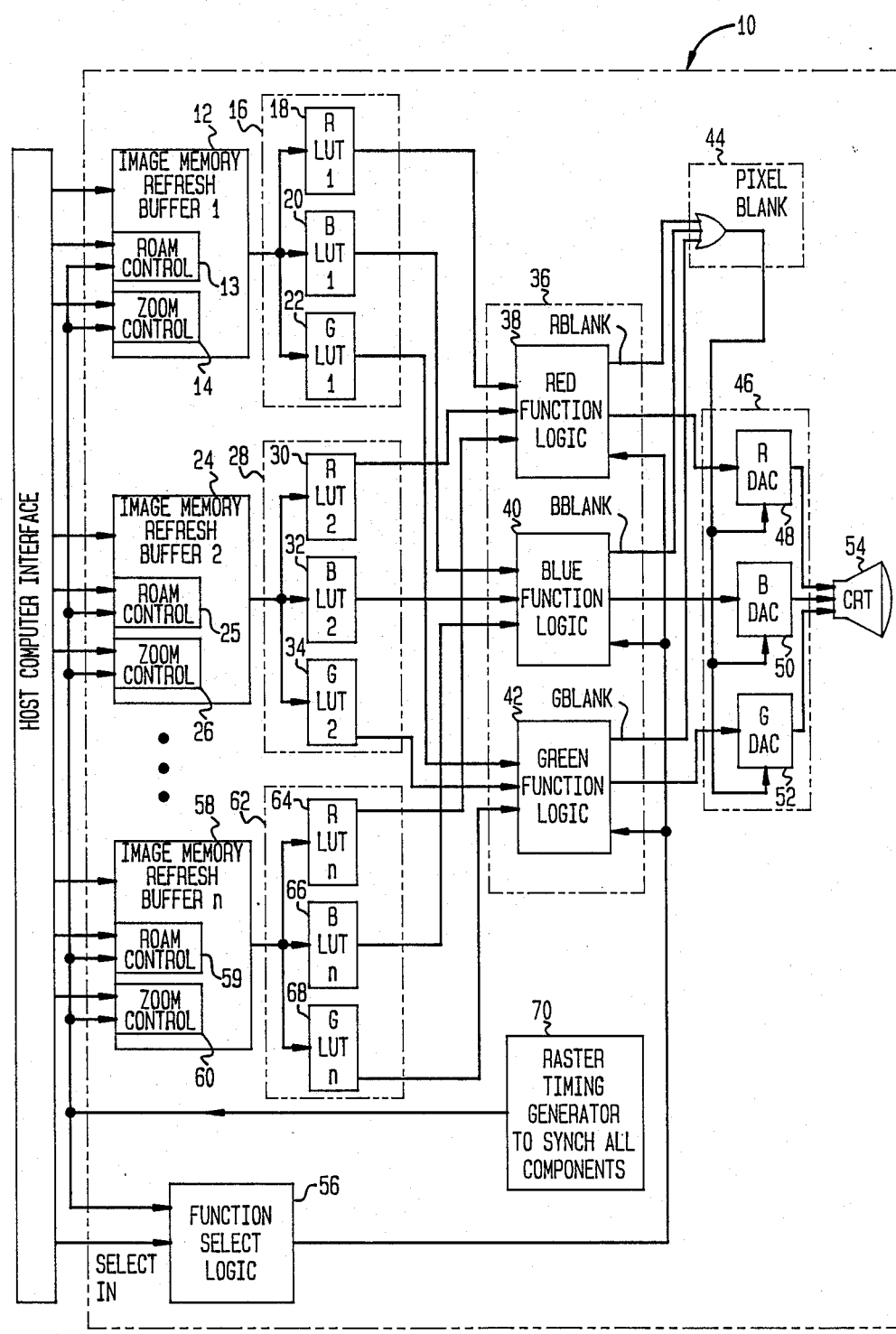
FIG. 2 is a block diagram showing the interrelationship between the major components of a preferred embodiment of this invnetion with specific detail shown for color operation.

FIG. 2 is a block diagram showing the interrelationship between the major components of a preferred embodiment 10 of this invention with specific detail shown for color operation. In this preferred embodiment of the invention for color operation 10 the lookup table means 16, 28 or 62 for each of the image memory refresh buffer means 12, 24, or 58, respectively, include at least three independently programmable lookup table means each corresponding to a different additive primary color for transforming the pixel selected by the zoom 14, 26 or 60, and roam means 13, 25 or 59, respectively. Accordingly, for the first image memory refresh buffer 12, a red lookup table 18, a blue lookup table 20 and a green lookup table 22 are provided; for the second image memory refresh buffer 24, a red lookup table 30, a blue lookup table 32 and a green lookup table 34 are provided; and for the n'th image memory refresh buffer 58, a red lookup table 64, a blue lookup table 66 and a green lookup table 68 may be provided. Likewise, the preferred function processing logic means 36 for color operation includes at least three function processing logic means 38, 40 and 42. Each function processing logic means corresponds to a different additive primary color red, blue and green, respectively, for processing the programmable values from all of the lookup table means 16, 28 or 62, and for generating a new value for the particular primary color, red, blue or green. For color operation the digital-to-analog conversion means 46 includes at least three digital-to-analog conversion means 48, 50, and 52, each corresponding to the different additive primary color. The digital-to-analog conversion means for converting the new value generated by the function processing logic means 36 (38, 40, 42), each corresponding to the particular additive primary color, to an analog signal. The raster-scan display means 54 includes a color raster-scan display means, usually having three color guns each corresponding to the different additive primary colors to produce a visible color image.

For color operation in the preferred embodiment of this invention 10, the function processing logic means 38, 40, 42 each includes an additional logic means for processing the programmable value from all of the color lookup tables, respectively, and for generating an additional value, such as a one bit signal, for each particular primary color. The preferred embodiment of this invention 10 also includes a pixel blank means 44 for inhibiting all of the digital-to-analog conversion means 48, 50 and 52 when at least one of the additional values generated by at least one of the additional logic means in the function processing logic means 38, 40 and 42 is equal to a particular programmed value. It is also preferred that each of the function processing logic means 38, 40 and 42 is independently programmable for a specific process and it is preferable that each of these function processing logic means 38, 40 and 42 are independently programmable for at least two specific processes. These processes may include mathematical manipulation such as arithmetic or Boolean logic operations. A function select logic means 56 may preferably be included with either preferred embodiment of the present invention be it the monochrome (grey level, black to white) 9 image comparison system, or the preferred color image comparison system 10. The function select logic means 56 selects which specific process is to be performed by the function processing logic means 36 (38, 40, 42) on the programmable values at a specific pixel on the raster-scan display means 54. The function-selection signals from the function selection logic means 56 permit different functions to be displayed in different windows for regions having arbitrary shapes in portions of the raster-scan display means 54. The function-selection signals may be controlled in rectangular regions by setting a function code based on the X and Y sweep positions of the raster-scan display device 54. Regions of any shape may be defined by using another memory refresh buffer which contains a function code for each pixel on the raster-scan display device 54.

To summarize, for color operation there must be independent sets of at least three lookup tables (one for each of the three primary colors, red, blue and green) for each memory refresh buffer. Function processing logic means operates on the outputs of each red, blue and green lookup tables to produce the input to the red, blue and green digital-to-analog converters. A pixel blanking apparatus with additional logic in each of the function logic apparatus allows the particular function results from any of the primary color paths to cause the output of the raster-scan display pixel to be blanked for all three primary colors.

The present invention provides an improved zoom 14 and roam 13 logic means for a digital computer graphics apparatus, of the type using an image memory refresh buffer, for providing apparent magnification on a raster-scan display means 54 of a region having a selected size and position within the image memory refresh buffer means 12. The improved zoom 14 and roam 13 means selects a pixel in the image memory refresh buffer means 12 which corresponds to a specific pixel on the raster-scan display means 54. As described above, the roam means sets the position of the region within the image refresh buffer means. And as described above, the zoom means provides apparent continuous magnification by choosing a ratio of a display size in pixels on the raster-scan display means to the selected size of the region set in the image memory refresh buffer. The ratio of the display size to the selected size of the region chosen by the zoom means is a ratio of two whole numbers each not greater than the display size.

Figure 3:
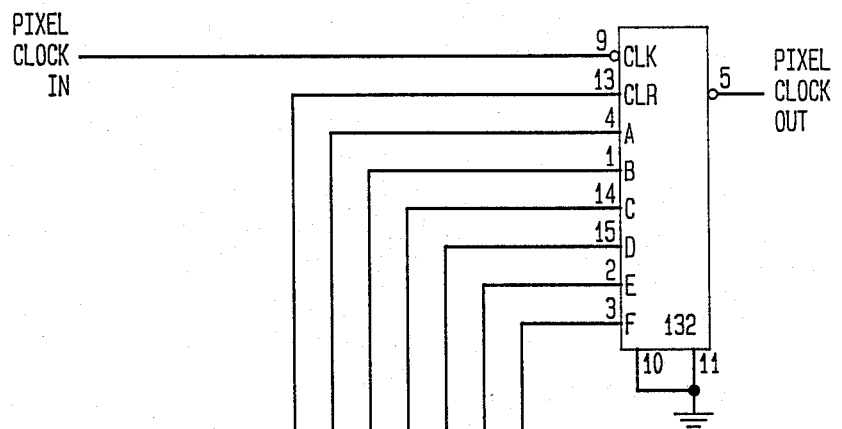
FIG. 3 is a general schematic of a zoom control logic apparatus of this invention.
Figure 3:
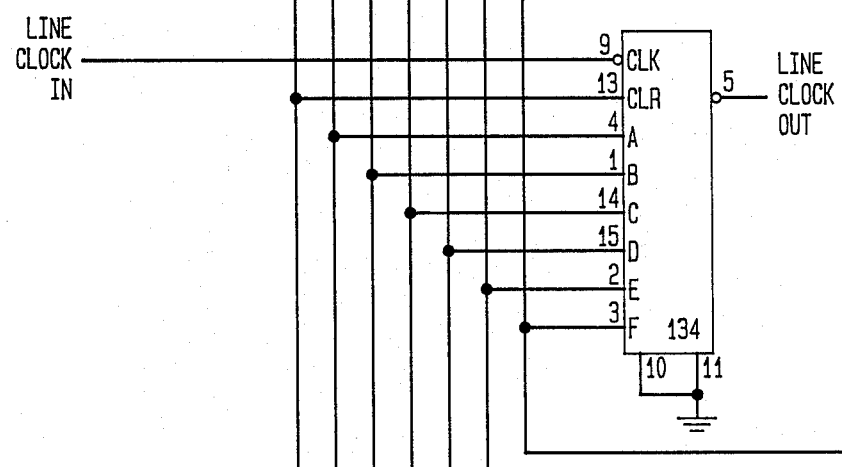
Figure 3:
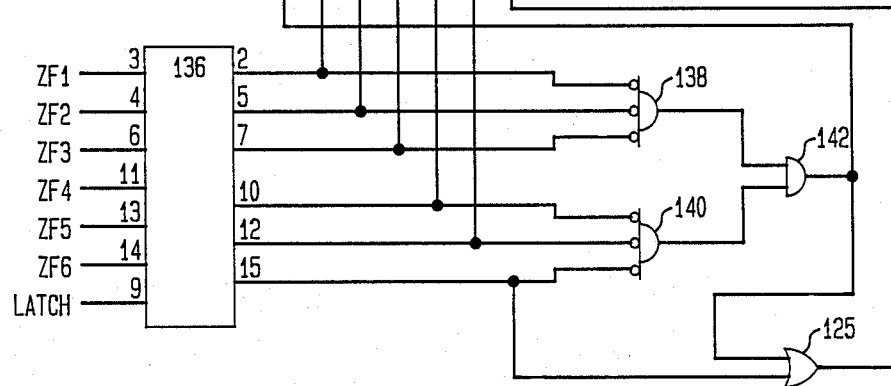

FIG. 3, is a general schematic of a zoom control logic apparatus of this invention. The zoom control means 14 has an N-bit storage register means 136 (here N=6), which stores a zoom factor number ranging from 0 to $2^N-1$, in $2^N$ integer steps. The zoom factor number of the N-bit storage register controls a first variable rate N-bit binary rate multiplier means 132, for dividing a pixel clock signal. For every $2^N$ pixel clock pulses which enter this multiplier means 132, a number of pulses which is a function of the stored zoom factor number leave this multiplier means 132. In this embodiment, the function provides that the number of pulses is equal to the stored zoom factor number.

The zoom factor number of the N-bit storage register also controls a second variable rate N-bit binary rate multiplier means 134, for dividing a line clock signal. For every $2^N$ line clock pulses which enter this multiplier means 134 a number of pulses which is a function of the stored zoom factor number leave this multiplier means. In this embodiment, the function provides that the number of pulses is equal to the stored zoom factor number. In addition, a zero detection means 125, 140, 138 and 142 compares the zoom factor number to 0, and if the zoom factor number is equal to 0 causes the number of pulses leaving each of the multiplier means 132 and 134, respectively, to be equal to the number of pulses entering each of the multiplier means 132, 134, respectively.

The foregoing discussion describes in detail the improved computer graphics digital image comparison apparatus and method for comparing and manipulating at least two digitally stored images and displaying a visible image of the result on a raster-scan display means. In summary the above method comprises the following steps.

Storing at least two digital images from a host computer 11 are stared in at least two image memory refresh buffers in a pixel matrix which has at least 2 bits per pixel. A pixel in each of the image memory refresh buffers which corresponds to a specific pixel on the raster-scan display, is selected by using zoom and roam logic for each of the image memory refresh buffers, for independently providing apparent magnification on the raster-scan display of a region of the stored image having a selected size and position within each of the memory refresh buffers. The pixel selected by the zoom and roam logic is transformed into a programmed value by using an independent lookup table for each of the image memory refresh buffers. The programmed values from all of the lookup tables are processed and a new value is generated by using a function processing logic apparatus. The new value generated by the function processing logic apparatus is converted to a analog signal by using a ditial-to-analog converter. A visible image is produced by displaying the analog signal on a raster-scan display apparatus.

The step of selecting a pixel in each of the image memory refresh buffers further includes the steps of: Setting the position of the region within the image memory refresh buffer by using a roam apparatus. A ratio of a display size in pixels on the raster-scan display to the selected size of the region set at the position, is chosen by the roam means in the image memory refresh buffer, by using a zoom apparatus for providing apparent continuous magnification in which the ratio of the display size to the selected size of the region is a ratio of two whole numbers each not greater than the display size.

The step of choosing a ratio of the display size in pixels on the raster-scan display to the selected size of the region set at the position in the image memory refresh buffer is accomplished by the following steps. A zoom factor number ranging from 0 to $2^N-1$ is stored in $2^N$ integer steps on an N-bit storage register. A pixel clock signal is divided by means of a first variable rate N-bit binary rate multiplier controlled by the stored zoom factor number in the N-bit storage register, in which for every $2^N$ pixel clock pulses which enter this multiplier means, a number of pulses which is a function of the stored zoom factor number, leaves this multiplier means. A line clock signal is divided by means of a second variable N-bit binary rate multiplier controlled by the stored zoom factor number in the N-bit storage register, in which for every $2^N$ line clock pulses which enter this multiplier means, a number of pulses which is a function of the stored zoom factor number leave this multiplier means. The zoom factor number is compared with zero and if the zoom factor number is equal to 0, the number of pulses leaving each of the multiplier means, respectively, is caused to be equal to the number of pulses entering each multiplier means respectively, by using a zero detection apparatus.

For color applications the steps of transforming the pixel selected by the zoom and roam apparatus further includes, transforming the pixel by means of the independently programmable lookup tables which include at least three independently programmable lookup tables for each of the image memory refresh buffers, each of these independently programmable lookup tables corresponding to a different additive primary color (red, blue and green).

The step of processing the programmable values from the lookup tables for color operations further includes processing the programmable values from all of the lookup tables corresponding to a particular additive primry color and generating a new value for the particular additive primry color by using the function processing logic apparatus. The function processing logic apparatus includes at least three function processing logic apparatus each corresponding to a different additive primary color.

The step of converting the new value generated by the function processing logic apparatus to analog signal for color applications, further includes: converting the new value generated by the function processing logic apparatus corresponding to each particular primary color to an analog signal by using the digital-to-analog conversion apparatus. The digital-to-analog conversion apparatus includes at least three digital-to-analog conversion apparatus each corresponding to the different additive primary color. Also, for color applications the step of producing a visible image further includes: using all of the analog signals corresponding to the different additive primary colors by using a color raster-scan display device, for example, having three color guns corresponding to each of the three primary colors.

It is preferable in this method, whenever color images are being compared, that the processing step further includes: processing the programmable values from all of the lookup tables corresponding to a particular additive primary color; and, generating an additional value for the particular primary color using an additional logic device in the function processing logic device. The method further includes an additional step of inhibiting all of the digital-to-analog conversion apparatus, by using a pixel blank device, when at least one of the additional values generated by at least one of the additional logic devices is equal to a particular programmed value.

It is preferred for both color and black to white applications, that the steps of processing the programmable values from all of the lookup tables to generate a new value further include the step of independently programming a function processing logic apparatus for a specific process. It is even more preferable that the programming step include, independently programming each of the function processing logic devices for at least two specific processes. This preferred method further includes an additional step of selecting which of the specific processes is performed by the function processing logic device on the programmable values. This selecting step is accomplished by using a function select logic device in which the specific processes selected by the function select logic device correspond to a specific pixel on the raster-scan display. As mentioned above, the use of a function select logic device is equally applicable to monochrome grey level (black to white) digital image comparison applications.

As previously explained in detail, the present invention also discloses a method for providing zoom and roam capability for an image memory refresh buffer apparatus to provide apparent magnificaton on a raster-scan display of a region having a selected size and position within the image memory refresh buffer.

The previously discussed step of selecting a pixel in each of the image memory refresh buffers further includes the following additional steps. The position of the region within the image memory refresh buffer by using a roam apparatus. A ratio of a display size in pixels on the raster-scan display to the selected size of the region set at the position, is chosen by the roam means in the image memory refresh buffer, by using a zoom apparatus for providing apparent continuous magnification, in which the ratio of the display size to the selected size of the region is a ratio of two whole numbers each not greater than the display size.

In this method the step of choosing a ratio of the display size in pixels on the raster-scan display to the selected size of the region set at the position in the image memory refresh buffer is accomplished by carrying out the following steps. A zoom factor number ranging from 0 to $2^N-1$, in $2^N$ integer steps is stored in an N-bit storage register. A pixel clock signal is divided by means of a first variable rate N-bit binary rate multiplier, controlled by the stored zoom factor number in the N-bit storage register, in which for every $2^N$ pixel clock pulses which enter the first multiplier means a number of pulses which is a function of the stored zoom factor number leave the first multiplier means. A line clock signal is divided by means of a second variable N-bit binary rate multiplier controlled by the stored zoom factor number in the N-bit storage register, in which for every $2^N$ line clock pulses which enter the second multiplier means a number of pulses which is a function of the stored zoom factor number leave the second multiplier. The zoom factor number is compared to zero, and if the zoom factor number is equal to zero, the number of pulses leaving each of the multiplier means, respectively, is caused to be equal to the number of pulses entering each multiplier means, respectively, by using a zero detection apparatus.

Method of Operation of the Present Invention

To aid in understanding the method of opertion of the present invention, we shall trace the generation of a single pixel on the raster-scan display through the entire apparatus of the present invention.

A general purpose host computer connects to the apparatus of the present invention and supplies the image data to be loaded into each of the image memory refresh buffers. The host computer also loads the transformation data into each of the color lookup tables, and the data for selecting the mathematical function processed by the function processing logic. The details of the interface to the host computer will vary depending on the computer's data bus structure. Interfacing information is freely available from the manufacturer of most host computers and can be obtained and understood by anyone of ordinary skill in the art. The embodiment described herein is connected to computers made by Digital Equipment Corpration, Maynard, Mass. using the computer bus which is marketed under the mark Q-Bus ®. Digital Equipment Corporation supplies a set of integrated circuits which contain the circuitry required to communicate with computers using the Q-Bus ®. The function and use of these integrated circuits is described in a *Chipkit User Manual: LSI*-11 *Bus Interface Chips and Accessories,* published by the Technical Volume Group of Digital Equipment Corpration, 77 Reed Road, Hudson, Mass.

Raster-scan display systems generate timing signals which can be used to synchronize other circuits to the raster-scan display. Details of the operation and signals used in raster-scan displays can be found in the *Raster Graphics Handbook,* published by Conrac Corporation (ISBN 0-960972-0-X 1980, 2nd edition 1985).

By way of an example, a host computer provides two voltage contrast images as described in *Fundamentals of Electron Beam Testing of Integrated Circuits* by E. Menzel and E. Kubalek, Scanning, vol. 5, No. 3, pp. 103–122 (1983). These images have values at each pixel which are related to the voltage and therefore the logic state at each pixel location in the integrated circuit. In this example, the image data loaded into the two image memory refresh buffers are images of integrated circuit chips. The first image is generated at a 5% larger scale than the second image and is also misregistered relative to the second image, by 10 pixels and 10 scan lines. The color lookup tables are set so that regions of the two semiconductor devices at a logic level "1" are colored red, at logic level "0" are colored green, and at the substrate level are colored blue.

The function selected in the function processing logic will be XOR (exclusive OR), which produces an output if and only if the two inputs are different. The function operates on each bit of the two image pixels to be compared. If the high order bit of the pixel from the first image is not the same as the high order bit of the pixel from the second image, then the high order bit of the result is "1", and so on for all bits in the two pixels.

The present invention places the function processing logic in the video chain after the independent zoom and roam logic apparatus of the image memory refresh buffers, and after the lookup tables for each memory refresh buffer. The function processing logic may be implemented as hard-wired logic, additional lookup tables, microprocessor arithmetic logic units, custom integrated circuits or gate arrays, or any other means of generating appropriate values to be fed to the digital-to-analog converters. The means may be defined by a function operating on the output of the lookup tables for two or more image memory refresh buffers.

In this embodiment, there are always two functions loaded into the function processing logic. Which of the two function is performed at any specific pixel on the display is determined by a bit from the function select logic apparatus. The apparatus generates one bit for each raster-scan display pixel. Note, however, that the number of pixel lines and the number of pixels on each line, for a given display, is not necessarily the same as the number of lines and the number of pixels per line in the image memory refresh buffers.

Returning to our example, in order to correct for the 10 pixel and 10 scan line misregistration, the first image memory refresh buffer's roam starting address is set to the 10th pixel of the 10th line in the image memory refresh buffer. The roam's starting address determines the particular pixel in the image memory refresh buffer corresponding to the first pixel of the raster. The second image memory refresh buffer's roam starting address is left at 0. This causes the first image memory refresh buffer to shift by 10 pixels and 10 lines relative to the second image, aligning the two images in one position on the raster-scan display.

Next, consider generating the 128th pixel of the 64th scan line on the raster-scan display. The raster-scan timing signals will have supplied 64 line pulses and 128 pixel pulses to the zoom logic of each image memory refresh buffer. In the first image memory refresh buffer, the larger of the two, the zoom factor is zero indicating no zoom at all. Thus, selecting the pixel from the first image memory refresh buffer, which is offset by 64 lines and 128 pixels from the roam starting address of 10 lines, and 10 pixels, results in a selected pixel location in the first image memory refresh buffer of the 74th line, 138th pixel. In the second (smaller scale) image memory refresh buffer, the smaller of the two zoom factor numbers is set to 61 out of 64, producing an apparent magnification of 64/61 or 1.049, quite close to matching a 5% difference in scale. The pixel selected in the second image memory refresh buffer is found by dividing the timing pulses by the apparent magnification, so that f64 divided by 64/61 yields 61; and 128 divided by 64/61 yields 122. Accordingly, the pixel selected from the second image memory refresh buffer is offset by 61 lines and 122 pixels from the roam starting address of 0 lines and 0 pixels, to obtain a final selected pixel location in the second image memory refresh buffer of 61st line and 122nd pixel. As should be expected, this pixel location is about 5% closer to the origin of the selected region in the second image memory refresh buffer, than the 74th line and 138th pixel is to the origin of the selected region in the first image memory refresh buffer. The second image is 5% smaller, so the two pixels correlate in the two integrated circuits and are aligned on the display as to scaling as well as to position.

At this point there are two pixel values which correspond with the correctly aligned points in the integrated circuits and which will be superimposed on the raster-scan display. If the bitwise XOR function was processed directly on these values, the result would be uncertain since there is likely to be some noise or error in the image values even from regions of the same voltage; keeping in mind that image values are correlated with voltages. Therefore, the bit patterns of two pixel values may not match even though they are "conceptually" the same and should be XOR'ed to zero. For example, the values 127 and 128, whose binary bit patterns are 01111111 and 10000000, respectively, differ by less than 1%, well within the range of image collection noise. Yet processing the XOR function on these two values results in the binary bit pattern 11111111, or 255, which is the maximum value possible with 8 bits.

This type of problem is solved by feeding the pixel values into a color lookup table, which transforms the pixel values into new values of programmed bit patterns. For example, if the image memory refresh buffer pixel values range from 120 to 140, corresponding to a certain voltage for logic level "1" on the integrated circuit, then the lookup table produces a full-intensity red value, all red bits on, zero intensity blue, and zero intensity green. If the pixel value in the other image memory refresh buffer also produced full intensity red, zero blue, and zero green regardless of the pixel value's original bit pattern, the XOR function will treat these pixel values as equal, and produce the desired cancellation.

To further illustrate the behaviour of the present invention, assume that the pixel value selected from the second image memory refresh buffer falls in the range of values corresponding to a logic level "0" in the integrated circuit, so that the output of the color lookup tables for the second image memory refresh buffer are: zero red, full intensity green and zero blue. These lookup table values are then processed by each of the function processing logic apparatus corresponding to each of the additive primary colors red, blue and green, respectively. A bit value programmed into the function select logic apparatus controls which of the two functions loaded into the function processing logic apparatus will be performed. Assuming that the function select logic apparatus is programmed to be filled with zeros, the first function loaded (XOR in this example) will always be performed. Accordingly, the red function processing logic apparatus receives full intensity red from the first lookup table and zero intensity red from the second lookup table. Since the signals are different, processing the XOR function on the signals produces an output of all "1", full intensity, to the red digital-to-analog converter (DAC). The green function processing logic apparatus receives a signal for zero intensity green from the first lookup table and receives a signal for full intensity green from the second lookup table. Since the signals are different, processing the XOR function on the signals produces an output of all "1", full intensity, to the green DAC. The blue function processing logic apparatus receives a signal for zero intensity blue from the first lookup table and receives a signal for zero intensity blue from the second lookup table. Since the signals are the same, processing the XOR function on the signals produces an output of "0", zero intensity, to the blue DAC.

The DAC's for red, blue and green convert the digital intensity signals to analog signals and send them to the raster-scan display apparatus. The raster-scan display apparatus causes both a red and a green dot to appear at line 64 and pixel 128 which blend together so that the color of the resulting visual pixel appears yellow to the human eye.

Repeating this analysis for all pixels on the display, the displayed image will have the following characteristics:
(1) The images will appear to be matched in position and zoom (scaling), although the pixels in the two image memory refresh buffers do not match.
(2) Corresponding pixels assigned the same color by the respective lookup tables will appear black on the display.
(3) Since the combination of red and green appear as yellow, red and blue appear as purple, and green and blue appear as aqua, then from the lookup table assignments provided above, the following information will be apparent:
  (a) The appearance of yellow raster-scan display pixels means that the corresponding image refresh buffer pixels have different logic levels.
  (b) The appearance of purple raster-scan display pixels means that one of the corresponding image memory refresh buffer pixels has the substrate value, and the other image memory refresh buffer pixels has the logic level "1".
  (c) The appearance of aqua raster-scan display pixels means that one of the corresponding image memory refresh buffer pixels has the substrate value, and the other image memory refresh buffer has the logic level "0".

This example illustrates the unique and useful information which can be derived from this invention and which cannot be easily and interactively obtained with any prior art device.

Means of Operation of the Zoom Control Logic

There are a number of ways of implementing hardware zoom functions, but all have the effect of changing the mapping of image pixels to display pixels. Thus, a single image pixel may cover more (or less) than one display pixel in each dimension.

In the present invention, zoom factors may be integer (simple pixel replication) or non-integer. Non-integer zoom can be accomplished by replication of some fraction of the pixels in the image. Also, the present invention can be generalized to provide provide different zoom factors in the X and Y dimensions.

The present invention is preferably used with an image memory refresh buffer, such as the one disclosed herein, to support non-integer zoom for allowing fine gradations in the relative magnification of the images. The function processing logic effectively operates on the display pixels as the raster-scan is generated. No one-to-one (or even integer multiple) correspondence between the image pixels in the two or more image memory refresh buffers is necessary. The zoom and roam parameters can be independently adjusted for each image memory refresh buffer until the images are aligned on the display. As the images shift, the function processing logic automatically follows the display.

A general schematic of continuous zoom circuitry is extracted and shown in isolation in FIG. 3. This continuous zoom circuitry can be used independently of the preferred image comparison apparatus 9 or 10 of the present invention, by any raster-scan display system driven by an image memory refresh buffer. A host computer interface 11, connected with the zoom apparatus 14 and with the image memory refresh buffer 12, supplies a zoom factor value to a latch 136. Latch 136 maintains the zoom factor value at the inputs to two synchronous binary rate multipliers 132, 134. One rate multiplier 132 is connected to the pixel clock and the other rate multiplier 134 is connected to the line clock. As shown in this embodiment, the latch 136 for holding the zoom factor value, and the rate multipliers 132, 134 have a six bit capacity. However, those of ordinary skill in the art will readily understand that to adapt this zoom circuitry to an N-bit capacity is simply a matter of adding more latches and cascading the rate multipliers as needed.

A binary rate multiplier is a circuit for accepting input pulses and passing a variable number of the pulses through to its output. The number of pulses the binary rate multiplier passes is a function of the bit pattern input on the multiplier's rate input lines. The equivalent in gate logic of the rate multiplier circuit is shown in *The TTL Data Book for Design Engineers* at page 7-103, published by Texas Instruments (Second Edition 1976). The binary rate multiplier operates as follows: Whenever there are zero bits at the rate input lines, then the passage of a certain number of pulses through the rate multiplier will be blocked. For example, if the high-ordered bit of the rate input is low ("0"), every other pulse entering the rate multiplier will be prevented from leaving.

In the present embodiment the number of pulses leaving each rate multiplier for every $2^N$ pulses entering is equal to the zoom factor number presented to the rate multiplier inputs. Accordingly, for N-bits, the range of zoom is from a zoom factor of 0 to a zoom factor of $2^N-1$. If a zoom factor of $2^N-1$ (all 1's) is presented at the rate multiplier's inputs, all but one of the pulses entering the rate multiplier will leave. If only the low-order bit of the rate multiplier's input is one, then only one pulse out of every $2^N$ pulses entering will leave. If all 0's is presented, then no pulses will pass through the rate multiplier. Since blocking the passage of all pulses through the rate multiplier is not useful for zoom operations, an additional circuit including the gates 125, 138, 140 and 142 were developed for detecting a 0 zoom factor, and for holding both the CLEAR input in the low-order rate input high ("1") when a 0 zoom factor is detected. The desired effect of passing all input pulses through to the output is achieved while maintaining a constant propagation delay.

Accordingly, a variable number ranging from 1 to $2^N$ pulses will leave each rate multiplier for every $2^N$ pulses which enter. Conversely, $2^N$ minus this variable number of pulses will be dropped. When an input pulse to the pixel clock rate multiplier 132 is dropped, the pixel register, containing the pixel address is image memory, is not incremented. Therefore, the previous memory pixel's data is sent to the current display pixel. The same is true of the line rate multiplier 134; when a clock pulse is dropped the entire previous line of pixels is repeated at the current display line. If every other line and every other pixel are skipped, the appearance at the display is a magnification factor of 2, since each memory pixel would then occupy a two-by-two pixel area on the display.

For example, if an image in the image memory refresh buffer is a regular cross-hatch pattern at a magnification of two, the image appears the same, but twice as big. If only a few in every $2^N$ pixels or lines on the display are replicated and the display is closely examined, the image will appear as a plaid pattern rather than a regular cross-hatch, since some of the rows and columns will be wider than others.

A pixel on the screen is very small, and the human eye tends not to see detail on the scale of a single pixel, especially if the color or brightness is not markedly different from the neighboring pixels. This fact holds true for most digitized images of real objects, as opposed to line drawings. Therefore, the human eye would not see a plaid pattern in the aforementioned display; instead, the display would appear magnified by an amount equal to $2^N$ divided by the zoom factor number. Accordingly, for a six bit zoom input the available zoom magnifications are 64/63, 64/62, 64/61 and so on. For N-bits, the magnifications would be $2^N/(2^N-1)$, $2^N(2^N-2)$, etc.

Since the smallest magnification possible is obtained by doubling one in every $2^N$ lines and pixels, it makes little sense for N to be larger than the binary logarithm of the display size in pixels minus 1. For example, for a display size of 512 pixels, if N=8, the smallest magnification skips one out of every 256 pixels, or one pixel and one row on the display. Therefore, if N is greater than 8, the display will not appear to be changed at a minimum magnification.

At the other end of the spectrum, the maximum magnification allowed is theoretically $2^N$. However, in the present embodiment, the pixel clock is used to generate RAM refresh signals, at a minimum rate of approximately every 10 microseconds. Therefore, the highest allowable magnification may be determined by the need to generate a pixel clock signal at least every 10 microseconds. For example, in the present embodiment the pixel clock period is 62.5 nanoseconds. Therefore, the maximum allowable mangification is really 10,000/62.5 or 160, regardless of the number of bits N in the zoom factor number.

Means of Operation of the Function Processing Logic

The function processing logic apparatus 36 is explained herein with particular attention to the desirability of separating the color lookup tables from the function processing logic, even if the functions themselves are also generated using lookup tables.

It is possible to apply different functions to the different primary colors, for example, summing red and subtracting blue if it is so desired.

Generating a general function of $2^N$-bit numbers requires at $2^{2N}$ word function table. However, as long as the functions performed are limited to bit-wise Boolean logic, additions, subtractions and combinations of these functions then the functions can be performed with two $2^{N+1}$ word tables, in a manner analogous to long hand addition and subtraction, as follows: A comparator compares the low-order N/2 bits of both input numbers and generates a "borrow" for subtraction. For addition, the low-order bit of each input number is routed to the high-order bit of the comparator inputs. This routing operation allows the color lookup tables to force a "carry" from the comparator, for example, setting the low order bit of the color table output when a "carry" is desired. Multiplication or division can effectively be performed only on the high order N/4 bits of the two input numbers.

In the preferred embodiment of this invention, three $2^N$-word tables have been used in order to provide the capability of loading two functions at once, necessitating dividing the N-bits even further, as explained above.

If the color lookup tables and the function processing logic were combined, there would be no way to separate the functions into low and high order bits, since the mapping of the image data into the output number can be made arbitrarily by the color lookup table. Therefore, to retain the ability to use arbitrary table lookup values and still be able to perform mathematical functions equivalent to operating on the output of lookup tables, a full $2^{2N}$-word table would be needed. As N becomes larger, such a table would rapidly grow prohibitively large.

Figure 4:
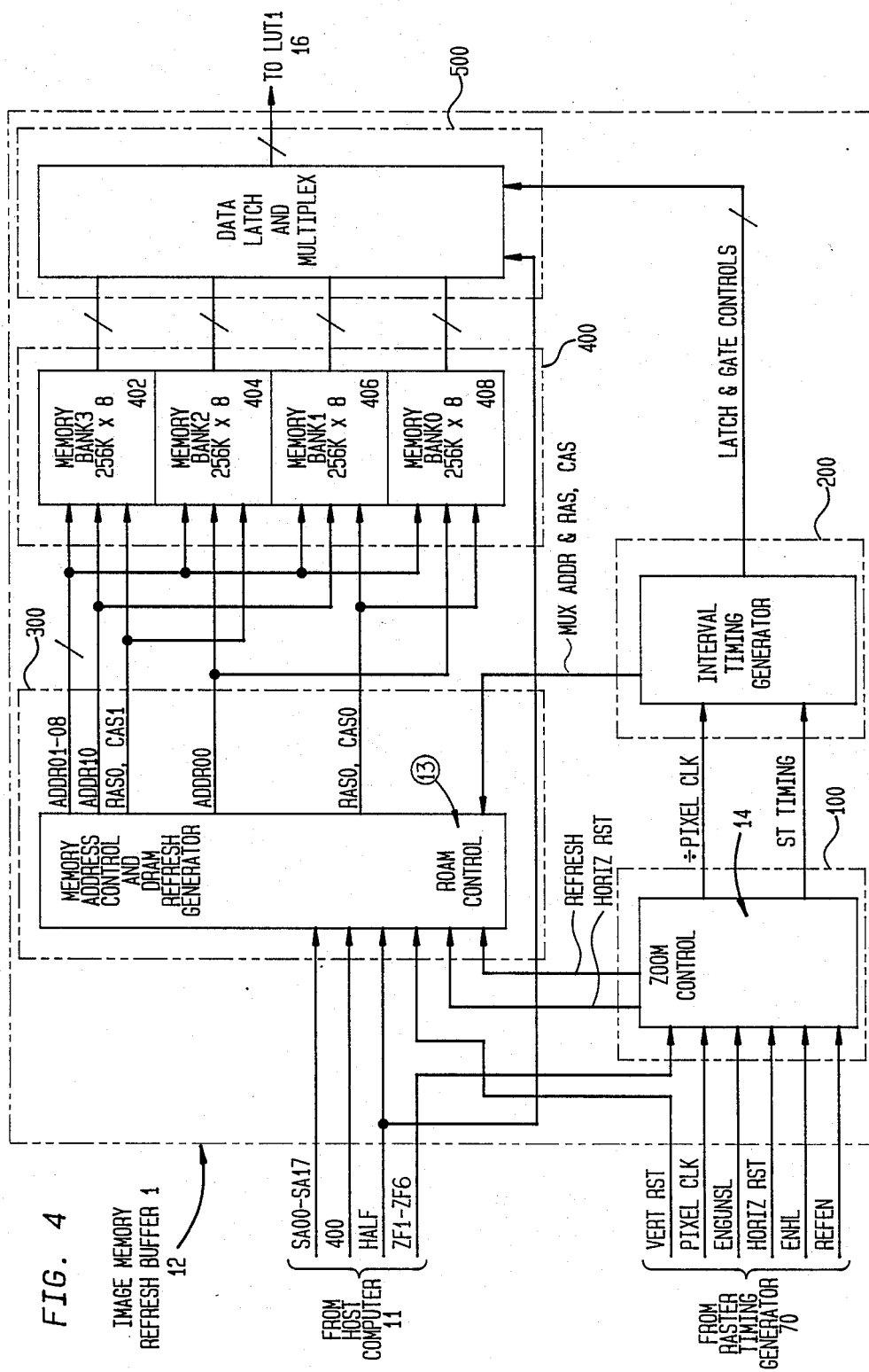
FIG. 4 is a detailed diagram of an image memory refresh buffer of this invention.

Detailed Description of the Individual Component Circuits of the Preferred Embodiment of the Present Invention 1. Image Memory Refresh Buffer FIG. 4 shows a detailed schematic diagram of the preferred, first image memory refresh buffer 12 of the present invention. The image memory refresh buffer 12 includes a number of individual components, they are: zoom control 100 (14 in FIGS. 1 and 2); internal timing generator 200; memory address control and DRAM refresh generator 300, which includes roam control 13; refresh memory 400, including individual memory banks 0, 1, 2 and 3 corresponding to the numbers 402, 404, 406 and 408, respectively; and data latch and multiplex 500. The digitized image is input from the host computer interface 11 into the memory address control and DRAM refresh generator 300. Also, timing information signals are input from the raster timing generator 70 into both the memory address control and DRAM refresh generator 300, and zoom control 100. The components are connected as shown in FIG. 4 and a signal is output from the data latch and multiplex 500 to the lookup tables 16.

(i) Zoom Control Logic Apparatus 100

Figure 5:
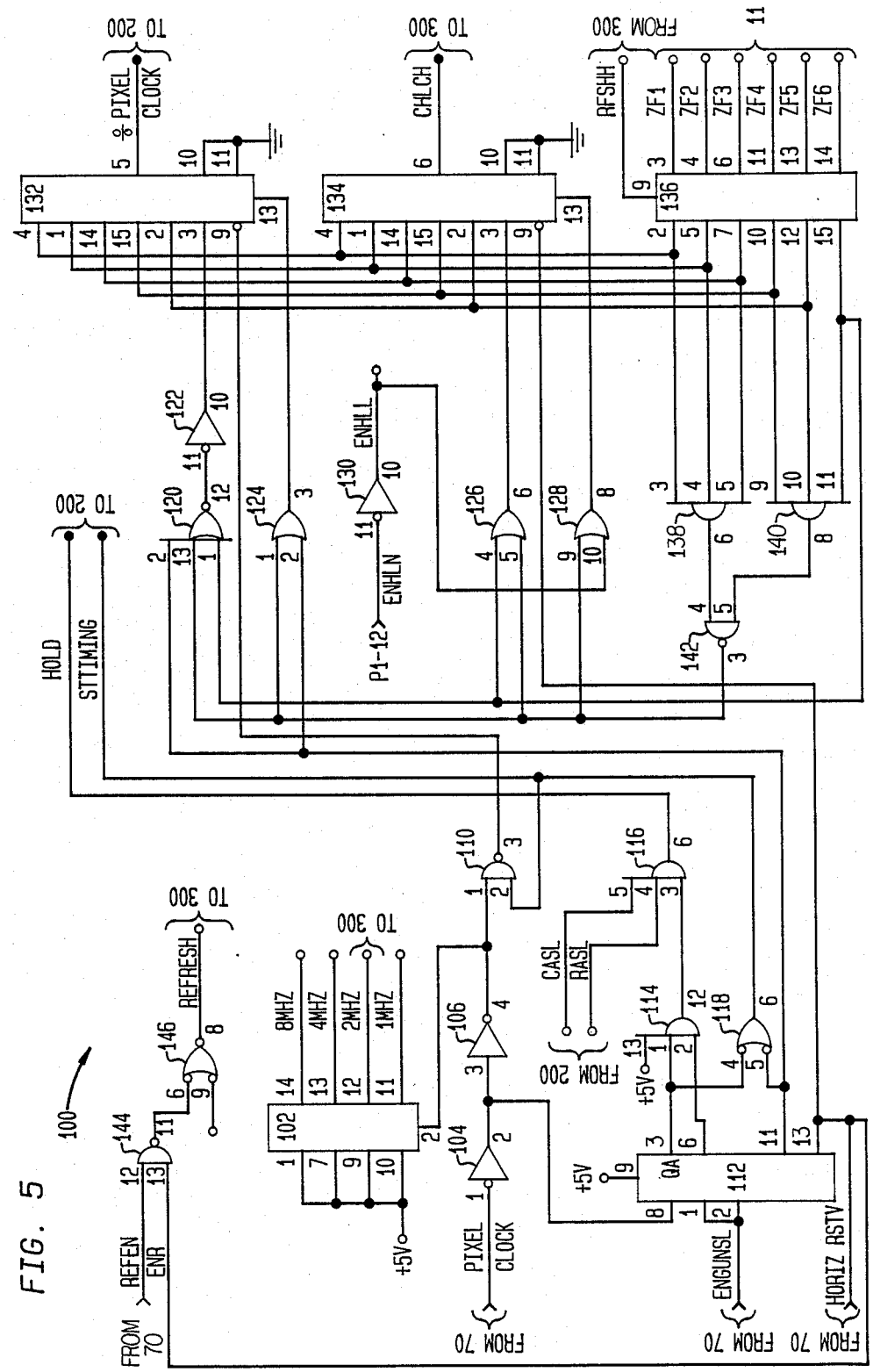
FIG. 5 is a detailed schematic of a preferred embodiment of the zoom control logic apparatus of this invention.

FIG. 5 shows a detailed schematic of a preferred embodiment of the zoom control logic apparatus 100 of the present invention. As previously explained, in this invention zoom is accomplished by duplicating pixels on the horizontal line and duplicating lines in a vertical direction of a standard raster-scan display. For example, if a horizontal line display is 400 pixels (0 to 399) for a 1:1 image, by causing pixels 0 to 199 to be displayed twice, 400 pixels are still displayed, but only the first 200 pixels are seen. Therefore, the zoom factor is 2.

To generate a variable zoom, the host computer presents six bits of date ZF6-ZF1 to circuit 136. Signal RFSHH latches this value into circuit 136. The 6 bit number has a value of 0-63. The value determines how many pulses are output from circuit 132 and 134, for every 64 pulses input. Therefore, the zoom factor is 64/(value of ZF6-ZF1). Note that the value 0 could cause a problem, therefore as previously explained circuits 138, 140 and 142 were added to detect the value 0. The output of circuit 142 is presented to circuits 120, 122, 124, 126 and 128 which cause the ZF6 and "clear" inputs of circuits 132 and 134 to be forced high ("1"). When the "clear" inputs of circuits 132 and 134 are forced high, circuits 132 and 134 are made to output 64 pulses for every 64 input pulses.

ENGUNSL is a negative pulse from the raster timing generator 70 having a duration equal to the number of pixels in a horizontal line multiplied by the period of the pixel clock. Circuits 104, 106, 110, 112 and 118 are used to synchronize ENGUNSL to the PIXEL CLOCK. Since the image memory refresh buffer has not had data input prior to the start of ENGUNSL, circuit 118 and 112 delay ENGUNSL for 4 PIXEL CLOCKS.

Signal ENHLH is from the raster timing generator. The signal will go high when the first horizontal line is to be displayed, and will go low after the last horizontal line of a frame is displayed. The amount of time that it takes for the first horizontal line to be displayed to the time when the last horizontal line of a frame is displayed is the active vertical time. When low, ENHLH resets circuit 134 and the line counter in the memory address control and DRAM refresh generator apparatus 300. While high, ENHLH allows circuit 134 to divide HORIZRSTH pulses from the raster timing, generated in accordance with the zoom factor supplied by circuits 136, 138, 140, 142, 126 and 128, as described above.

Circuits 114 and 116 are used as "look ahead" circuits towards the end of the horizontal line. These circuits perform the function of detecting when there are three clock pulses left in a horizontal line. If a DRAM RAS or CAS is not in operation, the circuits 114 and 116 do not start a memory cycle, because a short RAS or CAS can cause a loss of DATA in the DRAM.

Circuit 102 divides a pixel clock into 4 rates, one of which is used in the refresh generator of the address control and DRAM refresh generator 300.

Since DRAM has to be refreshed, circuit 112 generates a refresh level at the end of the horizontal line. Refresh also has to be generated during vertical retrace time. REFEN and HORIZRSTH generate refresh cycles during this time. Circuits 144 and 146 provide this function to the memory address control and DRAM refresh generator.

(ii) Internal Timing Generator Apparatus 200

Figure 6:
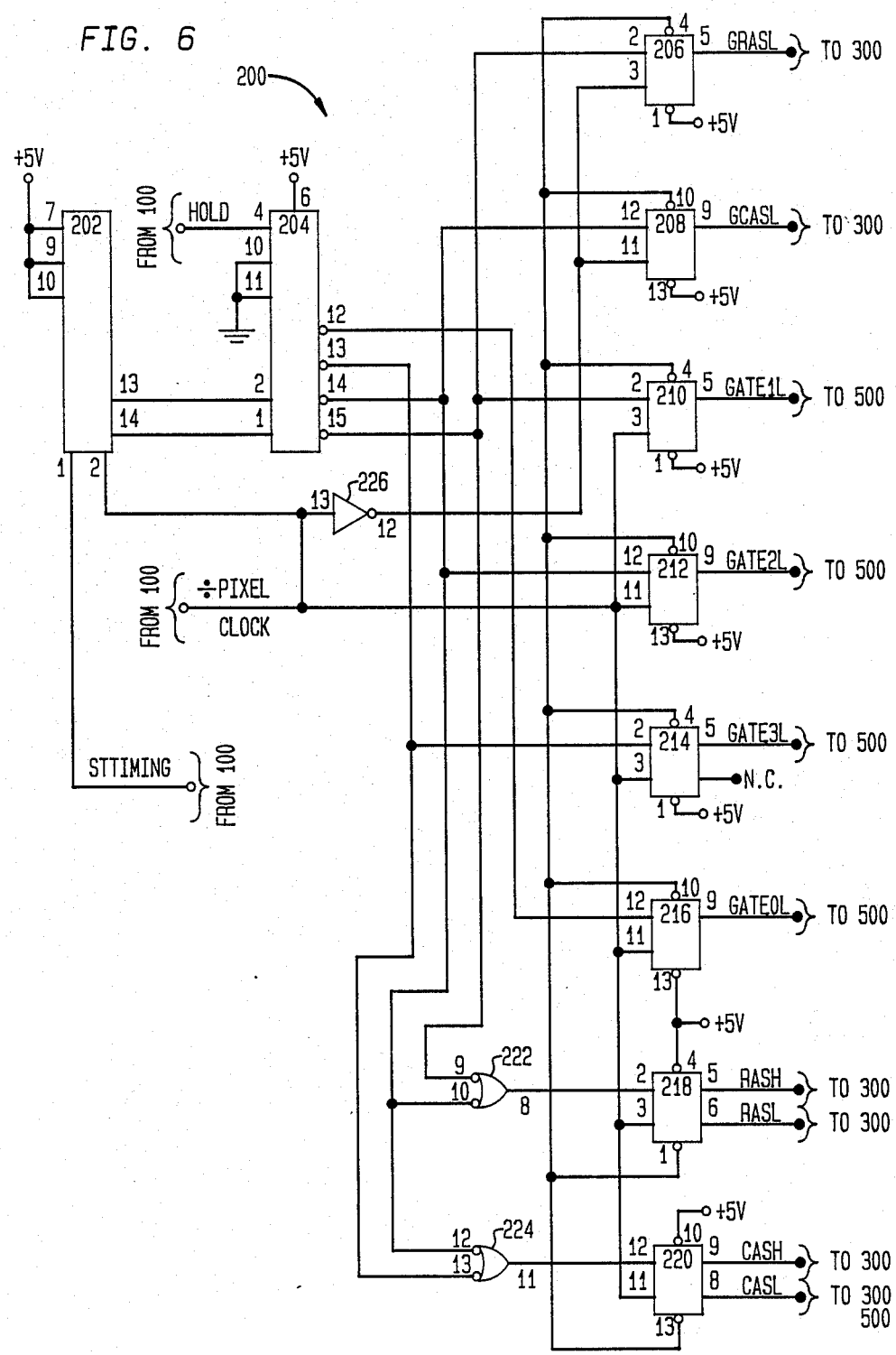
FIG. 6 is a detailed schematic of the internal timing generator apparatus of the present invention.

FIG. 6 is a detailed schemtic of the preferred internal timing generator apparatus of the present invention. Because DRAM cycle time does not approach the speed of the PIXEL CLOCK, a means of providing more than one pixel from the memory during a memory cycle is required. The internal timing generator apparatus 200 provides the timing necessary to perform this function.

Circuits 202 and 204 are connected so that circuit 204 provides 4 phases, 1 phase per clock pulse. Circuit 226 allows signals to be generated at the middle of a phase. GRASL is low from phase 0.5 to phase 1.5. RASL is low for phase 1 and phase 2. GCASL is low from phase 1.5 to phase 2.5. CASL is low for phase 2 and phase 3. These four signals are provided by circuits 206, 208, 218, 220, 222 and 224. The signals are outputs which are provided to memory address control and DRAM refresh generator 300. The CASL signal is also provided to the data latch and the multiplex block 500.

Circuits 210, 212, 214 and 216 provide gating signals to data latch and multiplex apparatus 500. GATE 0 is low for phase 0, GATE 1 is low for phase 1, GATE 2 is low for phase 2, and GATE 3 is low for phase 3.

(iii) Memory Address Control and DRAM Refresh Generator Apparatus 300

Figure 7A:
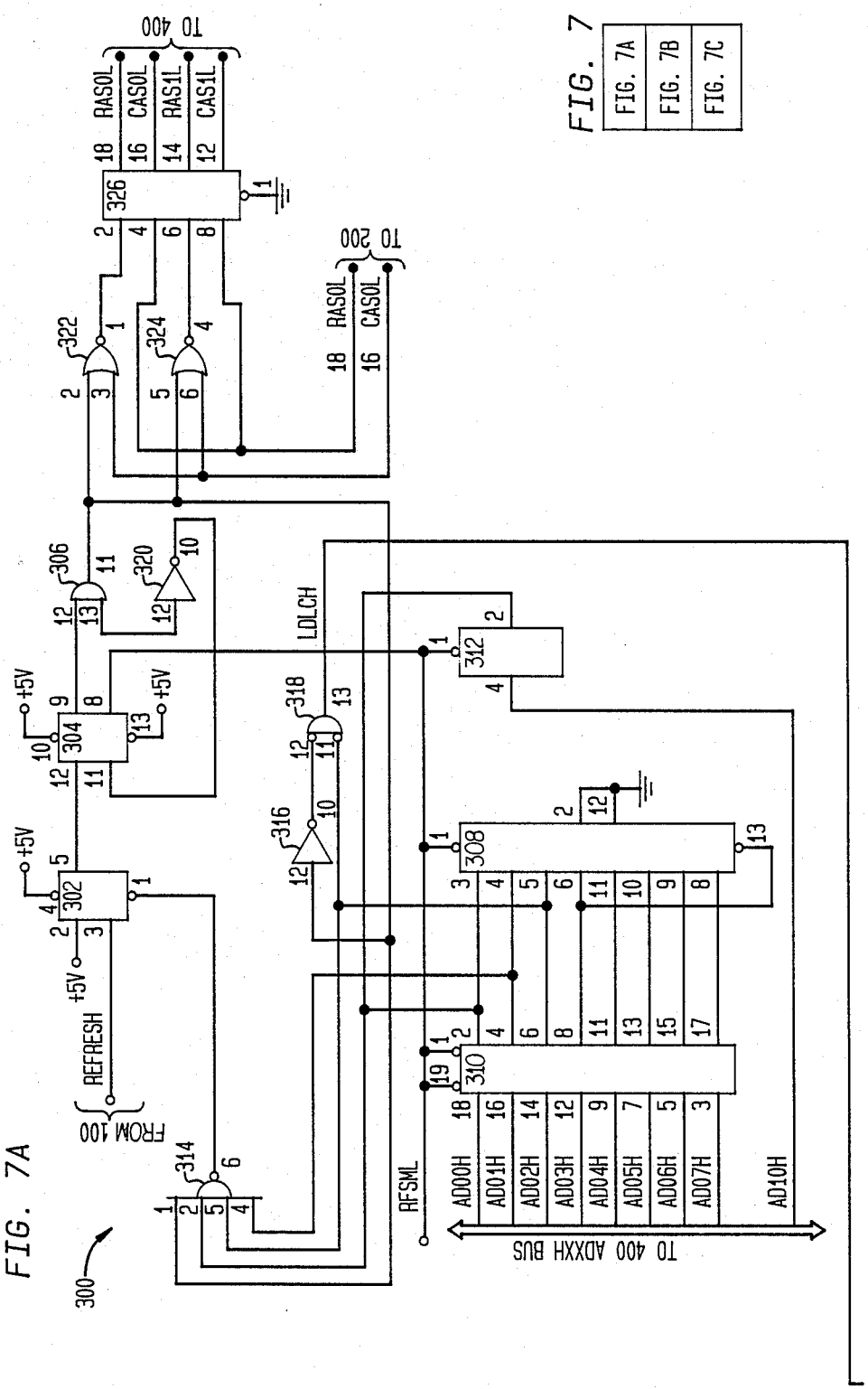
Figure 7C:
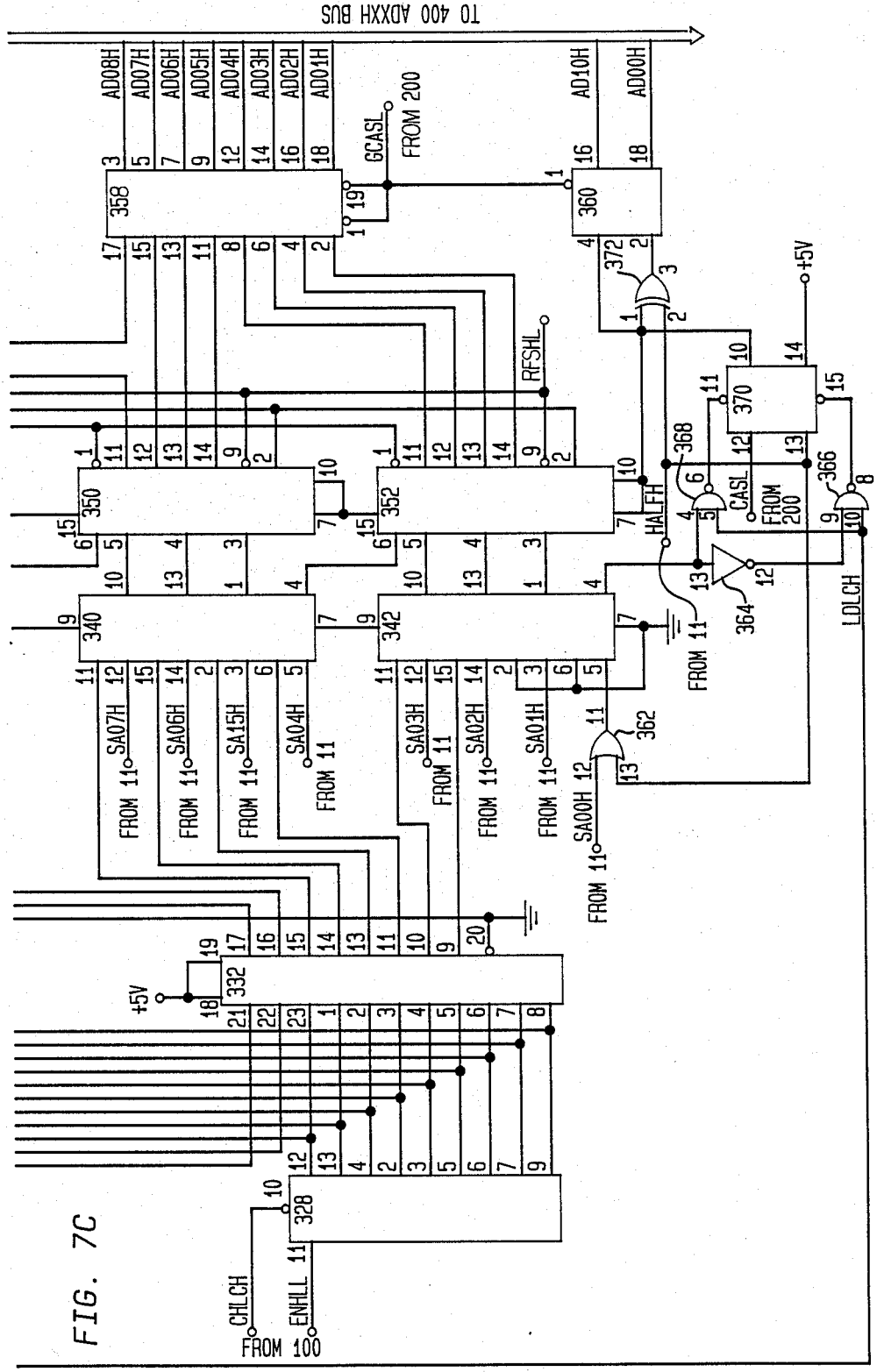

FIGS. 7A–7C show a detailed schematic of the preferred memory address control and DRAM refresh generator apparatus 300 of the present invention. A positive REFRESH edge from the zoom control logic apparatus 100, sets circuit 302. Circuits 302 and 304 synchronize the set state to the two MHZ clock from the zoom control logic apparatus 100. The positive portions of the output of circuit 306 cause RAS 0 and RAS 1 via circuits 322, 324 and 326. The negative edge of the output of circuit 306 increments counter 308. Circuit 314 detects the low order 3 bits of circuit 308 and resets circuit 302 when 7 is detected. An additional clock pulse is required to reset circuit 304. The additional clock pulse resets circuit 304. This cycle provides eight RAS only refresh cycles to the DRAM in refresh memory apparatus 400.

Circuits 316 and 318 provide the function of load line counter high (LDLCH) which is output to circuit 374. RASH and CASH from the internal timing generator apparatus 200 apply to circuits 322, 324, and 326 to be outputs as RASOL, RAS1L, CASOL, CAS1L to the refresh memory apparatus 400.

Images stored in the refresh memory apparatus 400 are contiguous. An example showing the first 8 pixels in tabular form is as follows:

TABLE 1

|  | Address | Pixel | Address | Pixel |
|---|---|---|---|---|
| Bank3 | 0 | 3 | 1 | 7 |
| Bank2 | 0 | 2 | 1 | 6 |
| Bank1 | 0 | 1 | 1 | 5 |
| Bank0 | 0 | 0 | 1 | 4 |

To read pixels 0–3, the address counter which includes circuits 344, 346, 348, 350, 352, and 370 must be set at zero. Circuits 354, 356, 358, and 360 provide the address to the memory refresh memory apparatus 400 as required by DRAM technology under control of GRASL and GCASL provided by the internal timing generator apparatus 200. When pixels 0–3 are loaded into the data latch and multiplex apparatus 500, the address is incremented by 1. Circuits 344, 346, 348, 350 and 352 are clocked by circuit 374 input CASH. Circuit 370 is closed by CASL. Clocking the circuits 344, 346, 348, 350 and 352 by circuit 374 input CASH and circuit 370 by CASL loads pixel 4–7 into the data latch and multiplex apparatus 500. For normal operations of the couner HALFH should be low, causing circuit 370 to toggle on every CASL.

To perform a zoom of 0.5 the ideal method would be to display every other pixel of every other line. Table 1 shows that pixel 0, 4 and 2, 6 are in the same bank, but at different addresses, so they cannot be read at the same time. In order to derive 4 pixels from the 8 pixels (0–7) available in one memory cycle, two odd and two even pixels must be selected. Therefore, to achieve a zoom 0.5, HALFH is placed in the high state by the host computer, forcing pin 10 of circuit 370 in a high state. When GCASL gates circuit 360, AD10H will be high and AD00H controlled by circuit 372 will be low. In the memory block Bank 0 has a pixel 0, Bank 1 has pixel 5, Bank 2 has pixel 2, and Bank 3 has pixel 7. Circuits 504 and 506 rearrange the pixel numbers in the bank to 0, 2, 5, 7. Then the next CASH reads addresses 2 and 3 of all banks, providing pixels numbers 8, 10, 13 and 15.

The address counter must be loaded with the correct starting address for each line. Circuit 328 is the line counter; it is clocked by the (divide) HORIZRST from zoom control logic apparatus 100 at the end of a display line. Line counter circuit 328 drives PROMS 330, and 332 which contain the address for the first four pixels of a line.

These PROMS contain the starting addresses of successive scan lines within the four memory banks 400. There are four sets of starting addresses stored in the PROMS so that four modes of operation, selected by two bits from the host computer interface 11, are possible.

A single PROM address generates 4 pixels at a time. In the first mode of operation, the image lines are 400 pixels long. Successive PROM entries for lines 0, 1, 2, 3, etc. are 0, 100, 200, 300, etc. In the second mode, the image lines are 800 pixels long. The ROM entries for lines 0, 1, 2, 3, etc. are 0, 200, 400, 600, etc.

The third mode also uses 800 pixel image lines, but the magnification produced by a specific zoom factor is cut in half. Therefore, zoom factors from 1 to 2 give apparent magnifications from 0.5 to 1. The third mode's PROM entries are 0, 400, 800, 1200, etc.

The fourth combination of mode select bits is not used. Half zoom of a line 400 pixels long cannot be used because the image must be at least twice the size of display apparatus 54.

The PROM entries are multiples at the display size, which is 400 pixels in our preferred embodiment. Those of ordinary skill in the art will realize that any other display size can be used by altering the ROM entries.

The PROM output is then fed into an 18 bit adder. SA00 through SA17 from the host computer 11 are added to the PROM output. The adder includes circuits 334, 336, 338, 340, 342. The output of the adder is loaded into the address counter during the horizontal retrace time.

(iv) Refresh Memory Apparatus 400

Figure 8A:
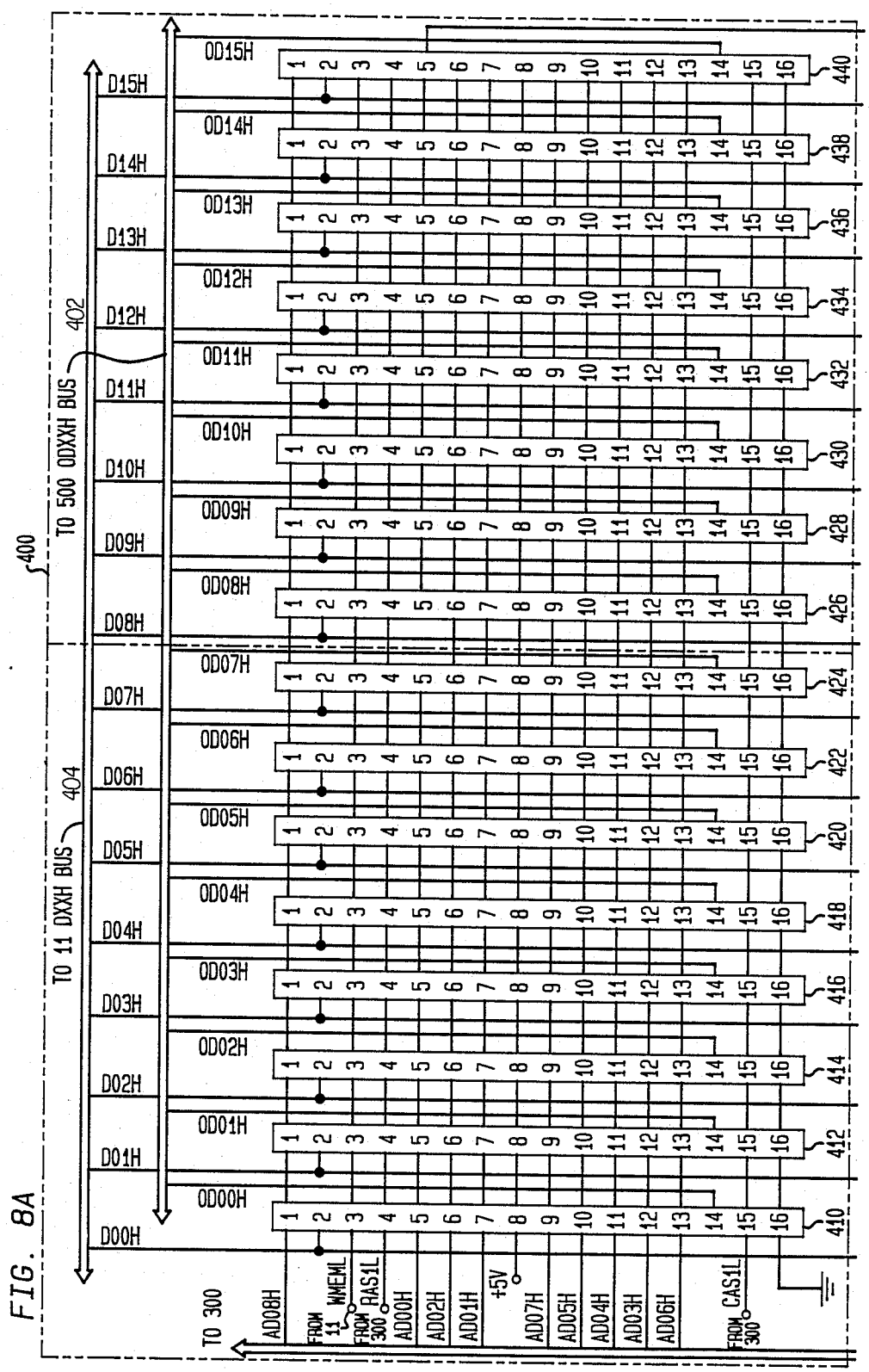
Figure 8:
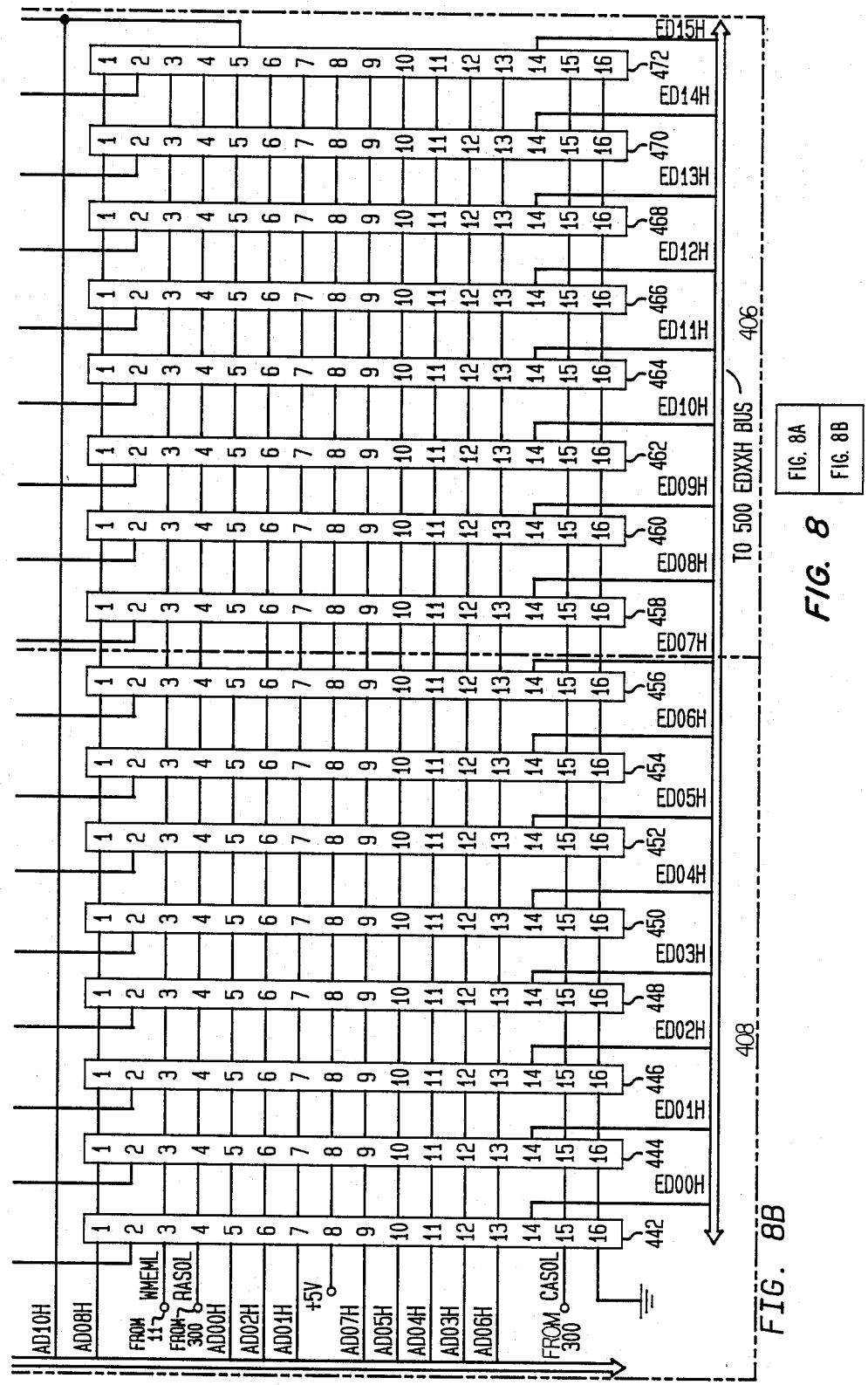

FIGS. 8A–8B show a detailed schematic of the preferred refresh memory apparatus of the present invention. The refresh memory apparatus 400 includes 32, 256K×1 dynamic memory circuit 410–472. The array of dynamic memory circuits is broken down into four blocks of eight circuits each. The high byte of the high word (HBHW) circuit 402 is made up of circuits 326–440. The low byte of the high word (LBHW) circuit 404 is made up of circuits 410–424. The high byte of the low word (HBLW) circuit 406 is made up of circuits 458–472. The low byte of the low word (LBLW) is circuite 408 and is made up of circuits 442–456.

The WMEML signal is provided by the host computer interface to load the refresh memory apparatus 400. RASOL and CASOL access circuits 408 and 406. RAS 1L and CAS 1L access circuits 404 and 402.

For display purposes the initial memory address control and DRAM refresh generator apparatus 300, provide AD00H through AD08H, AD10H, RASOL, CASOL, RAS1L, and CAS1L. Under control of these signals the refresh memory provides four 8 bit pixels, 2 on the ODXXH (odd data) bus, and 2 on the EDXXH (even data) but to the date latch multiplex apparatus 500.

(v) Data Latch and Multiplex Apparatus 500

Figure 9A:
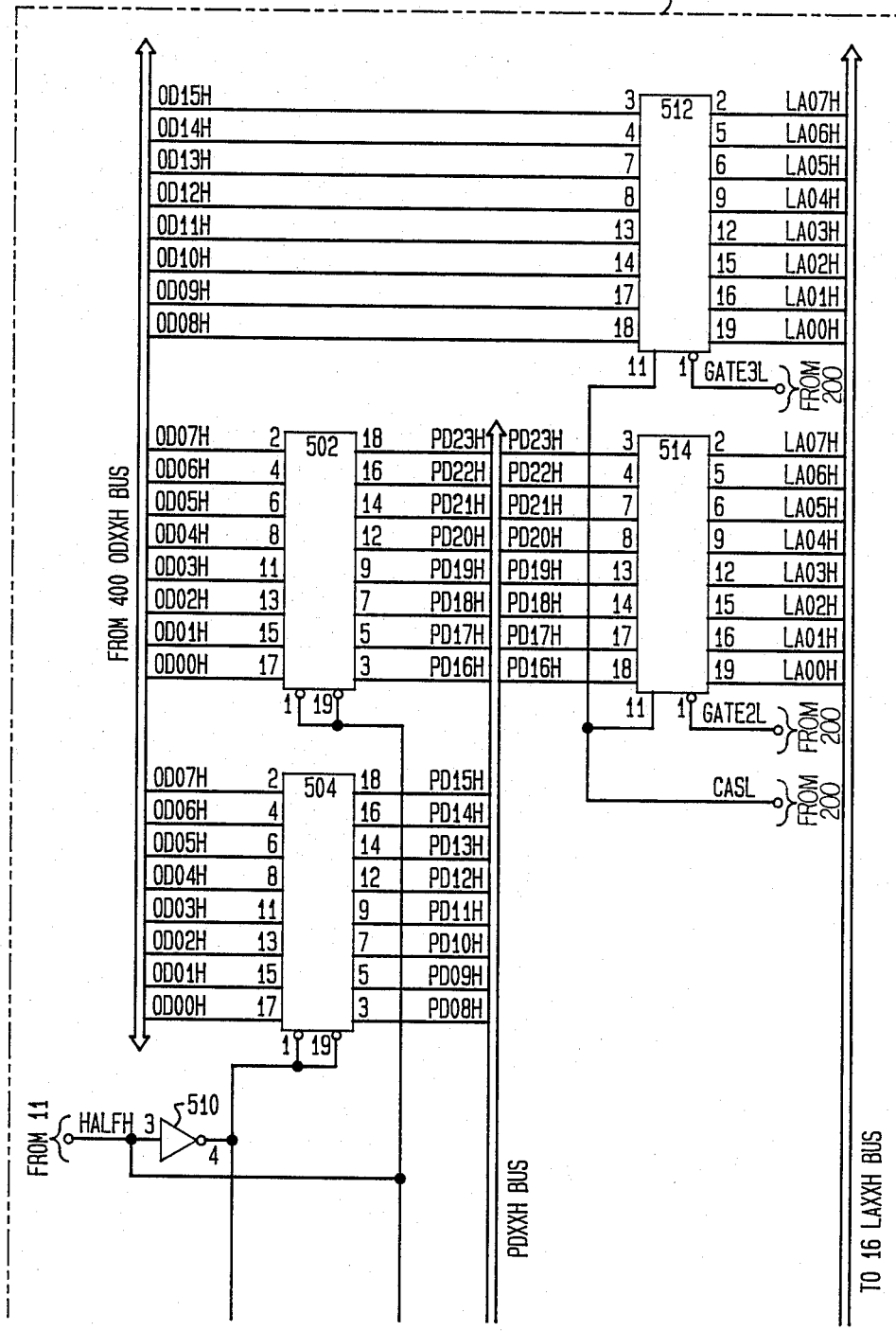
Figure 9B:
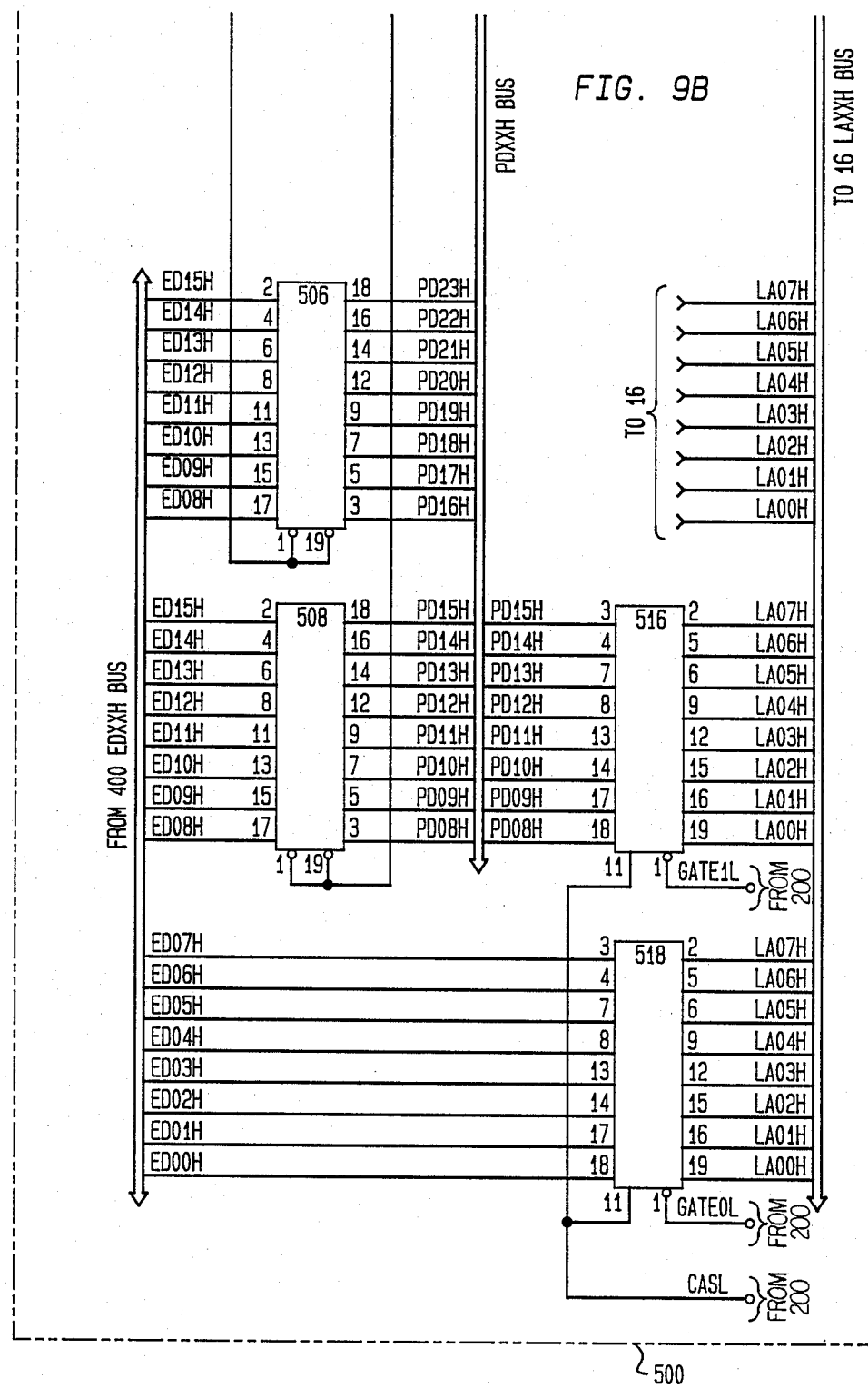

FIGS. 9A–9B show a detailed schematic of the preferred data latch multiplex apparatus 500 of the present invention. The output of circuit 408 (LBLW) is always input to circuit 518. The output of circuit 402 (HBHW) is always input to circuit 512. If HALFH is high, circuit 508 switches the output of circuit 406 to circuit 516, and circuit 512 switches the output of circuit 404 to circuit 514. If HALFH is low, circuit 506 switches the output of circuit 406 to circuit 514 and circuit 504 switches the output of circuit 514 to circuit 516. When the data is stable at the inputs of circuits 512, 514, 516 and 518 CASL from the internal timing generator apparatus 200 clocks the data into circuits 512, 514, 516 and 518. At the same time GATE 0L, GATE 1L, GATE 2L and GATE 3L sequentially switch the outputs of circuits 518, 516, 514 and 512 on the LAXXH BUS for input to the LOOKUP TABLE apparatus 16 (for color; 18, 20, 22) 28 (for color: 30, 32, 34).

2. Clock Phase Synchronization Logic Apparatus 74

Figure 17:
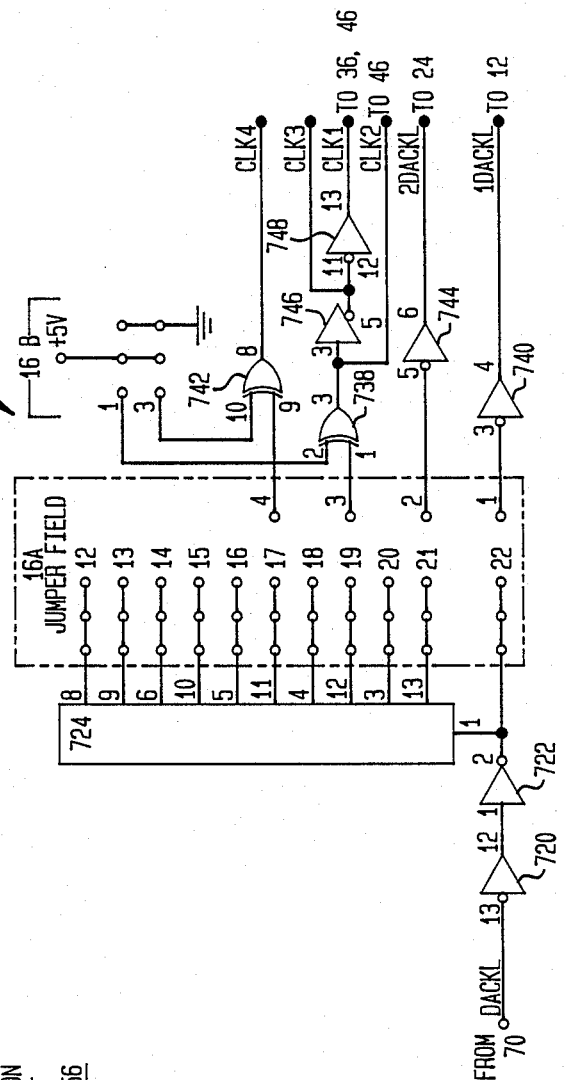
FIG. 17 is a detailed schematic of the clock phase synchronization apparatus of this invention.

The preferred clock phase synchronization logic apparatus 74 shown in FIGS. 17 accepts a 16-megahertz pixel clock from the raster-scan timing signals and creates six clock phases. Two of the six clock phases are output back to the image memory refresh buffer, as pixel clocks, for input to zoom logic apparatus 100. The phase synchronization logic apparatus 74, contains 6 hex inverters 720, 722, 740, 744, 746 and 748; two 2-input XOR gates 738, 742; and, a variable delay line 724 which permits the pixel clock pulses sent to the two image memory refresh buffers to be staggered by a variable time delay. The delay permits corrections for any differences in propagation on delays between the two image memory refresh buffers, respectively, and allows adjustment of the display so that the two images are properly aligned when set to the same zoom and roam factors.

The phase synchronization apparatus also generates timing signals which control the latches between the image memory refresh buffers and the color lookup tables 16 and 28; and between the color lookup tables 16, 28 and the function processing logic apparatus 36; and between the function processing logic apparatus 36 and the digital-to-analog converters 46, to provide an orderly progression of signals through the apparatus of the present invention (9 or 10).

3. Color Lookup Tables 18, 20, 22

Figures 10, 10A:
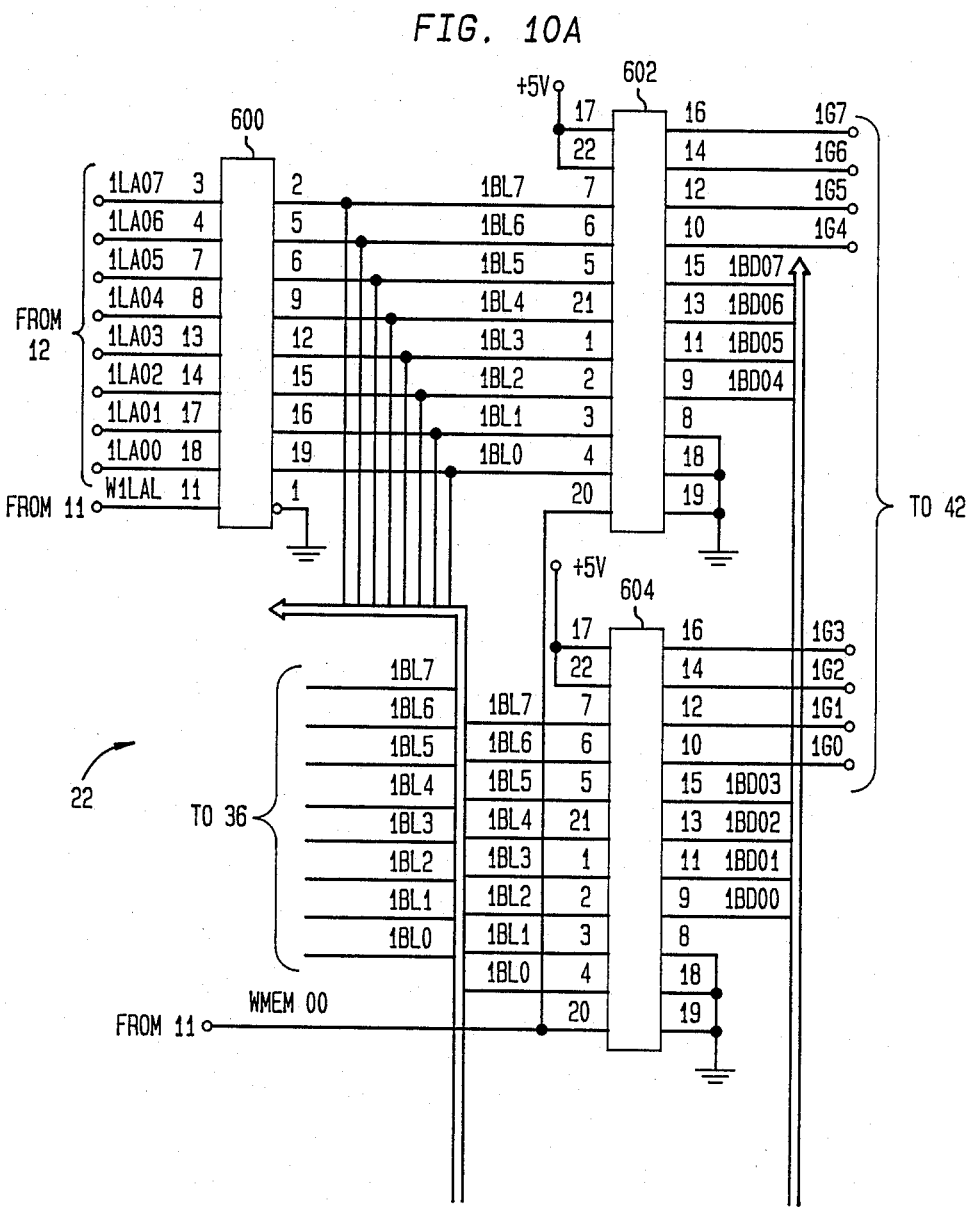
FIGS. 10 and 10A-10C comprise a detailed schematic of the components of the color lookup table for the first image memory refresh buffer of this invention.
Figure 10B:
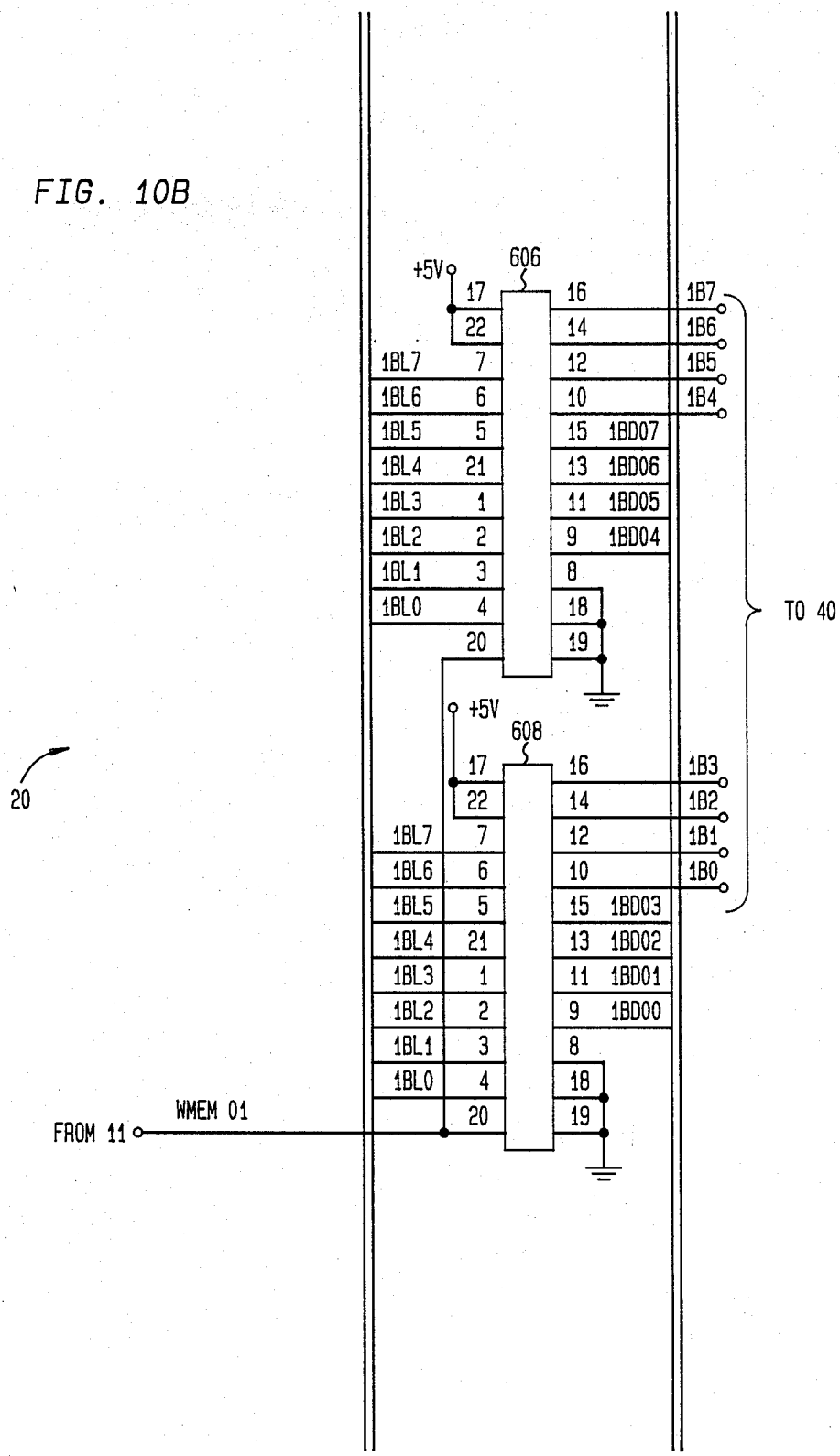
Figure 10C:
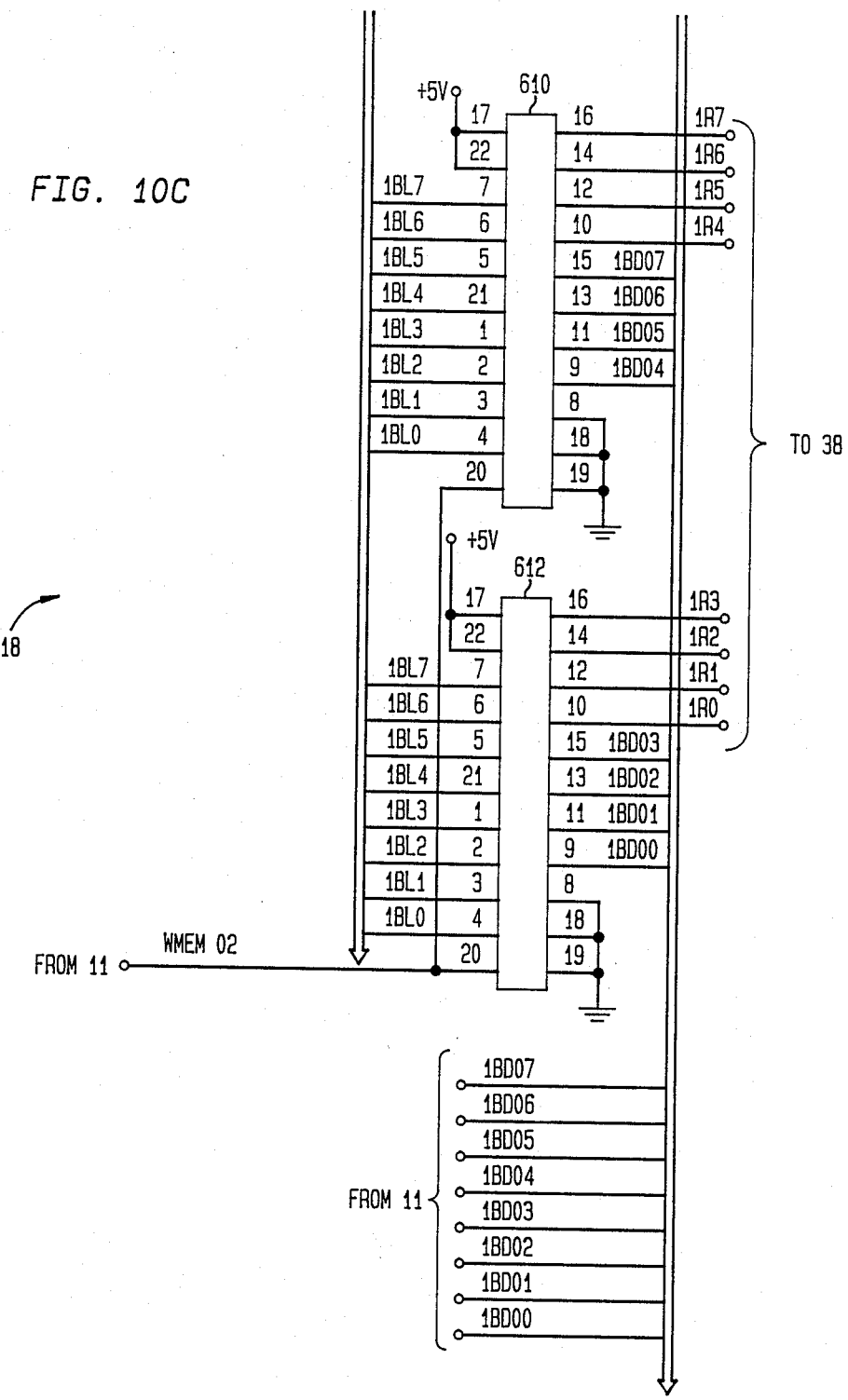

(i) FIGS. 10A–10C show a detailed schematic of the components of the preferred color lookup tables 16 (18, 20, 22) for the first image memory refresher buffer 12 of the present invention.

Figure 11B:
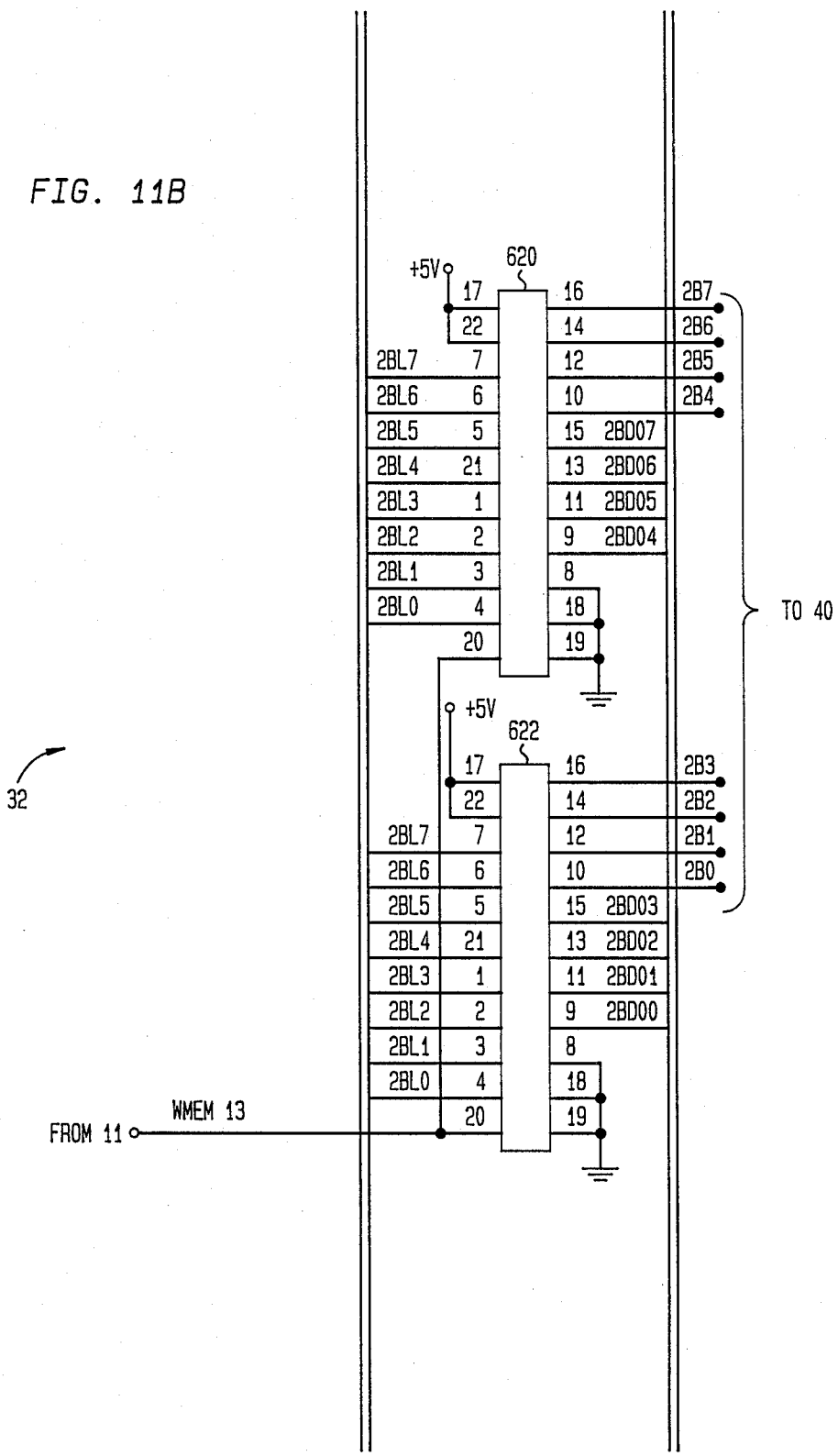
Figure 11C:
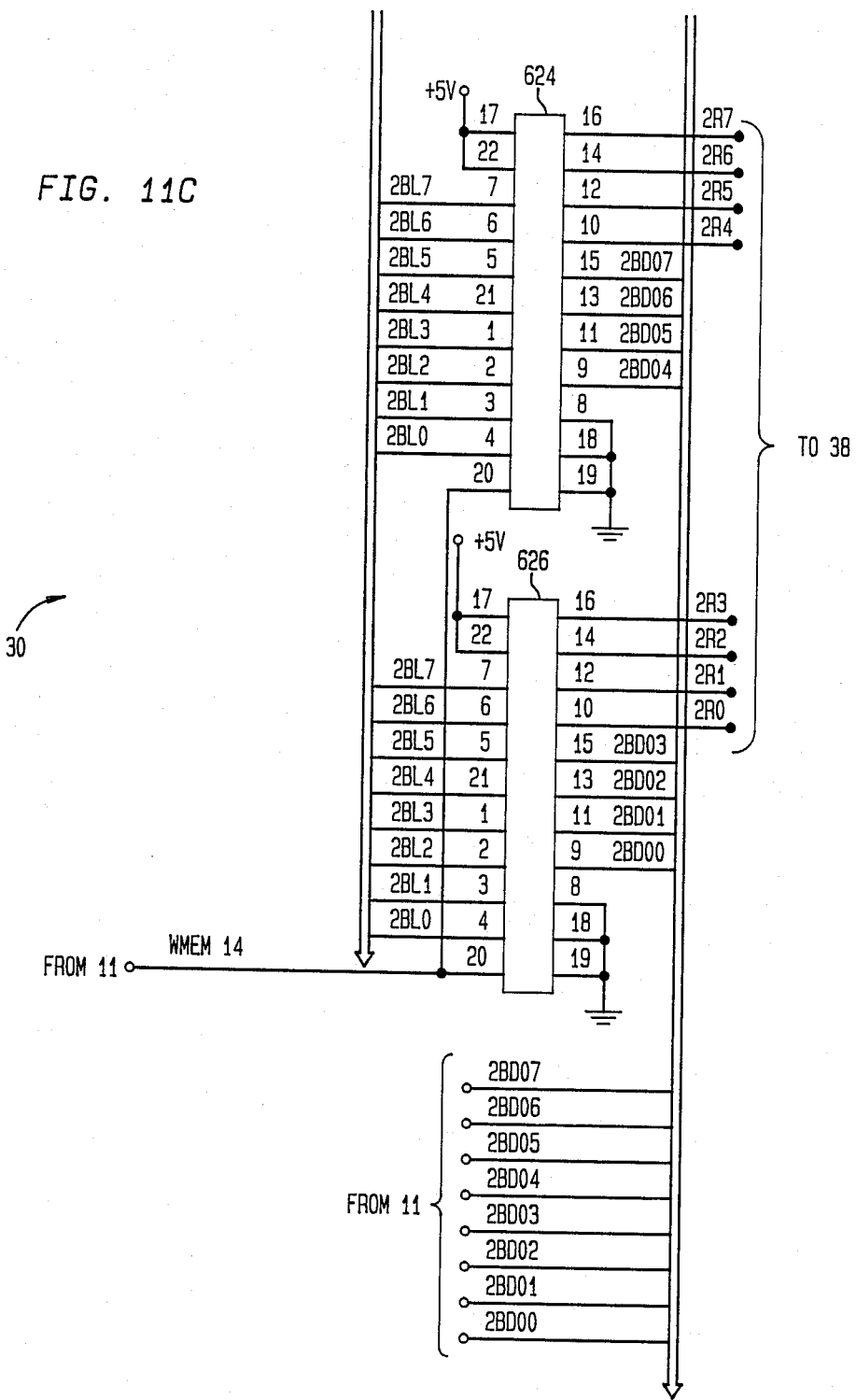
Figure 12B:
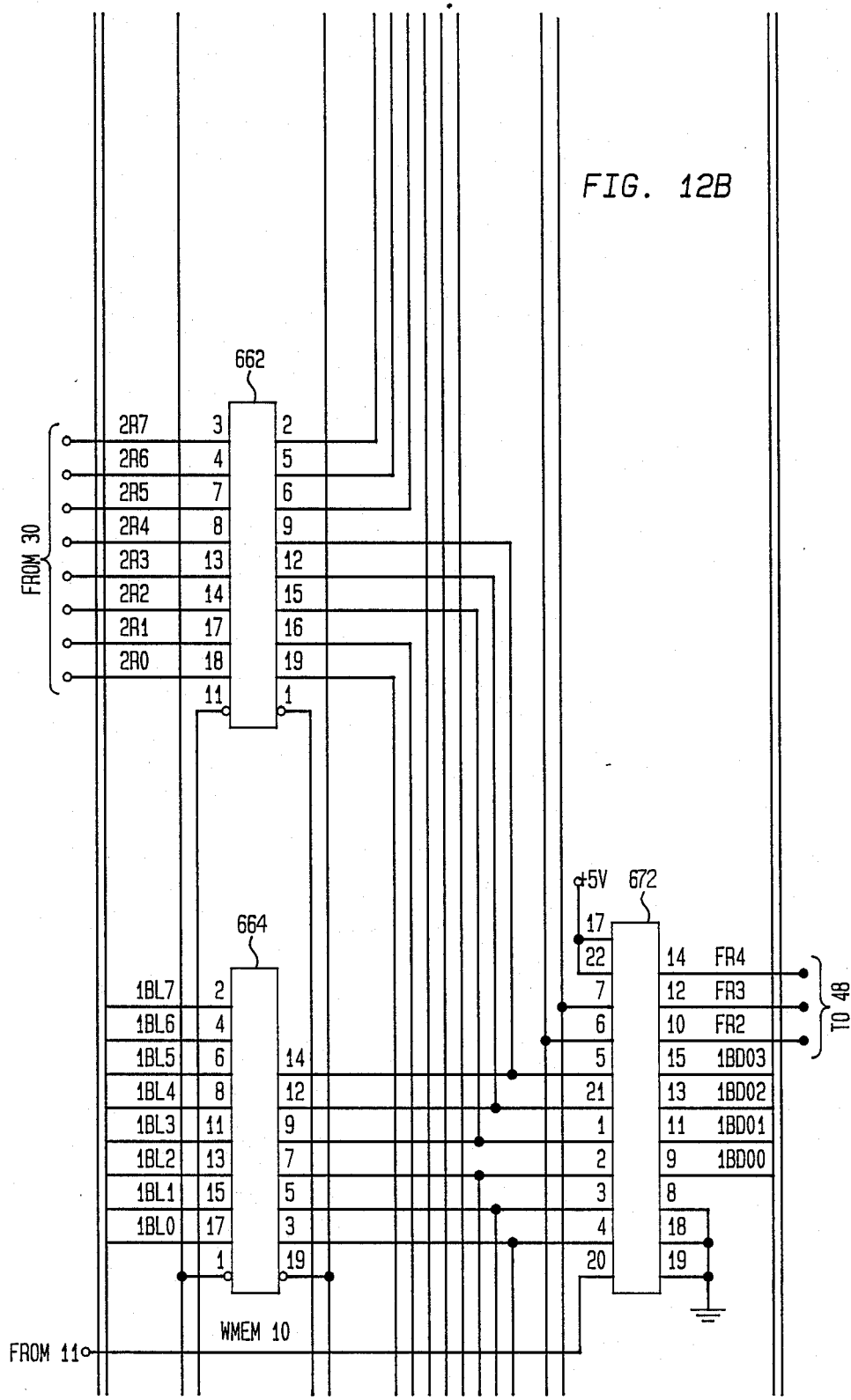
Figure 12C:
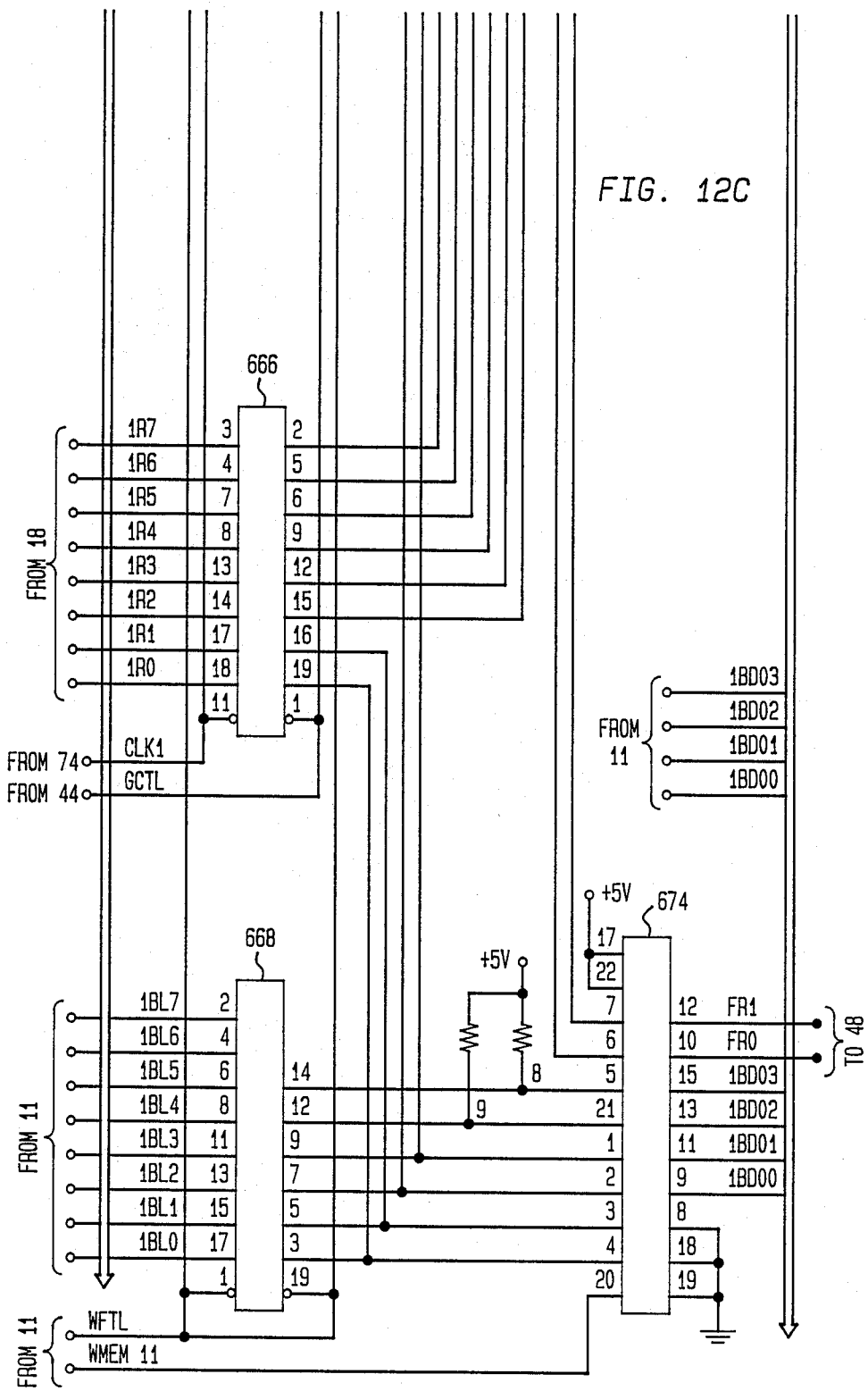

(ii) FIGS. 11A–11C show a detailed schematic of the components of the preferred color lookup tables 28 (30, 32, 34) for the second image memory refresh buffer 24 of the present invention.

The lookup table(s) 16 (18, 20, 22) for the first image memory refresh buffer 12 accept(s) a pixel value from the image memory refresh buffer 12 via the LAXXH bus. The lookup table(s) include a data latch 600, clocked by the raster-scan timing signals and six (256×4) static RAM's 602–612. The six static RAM's maintain the data entries in three 8-bit color lookup tables, two RAM's each for red 602, 604, blue 606, 608, and green 610, 612. Memory-write signals are supplied from the interface with the host computer 11 allowing new values to be input into the lookup table RAM memory devices.

The lookup table 28 for the second image memory refresh buffer 24 has indentical components as lookup table 16, it uses an input latch 614 and six 256×4 bit RAM's 616–626.

4. Function Processing Logic Apparatus 36 (38, 40, 42)

Figures 13, 13A:
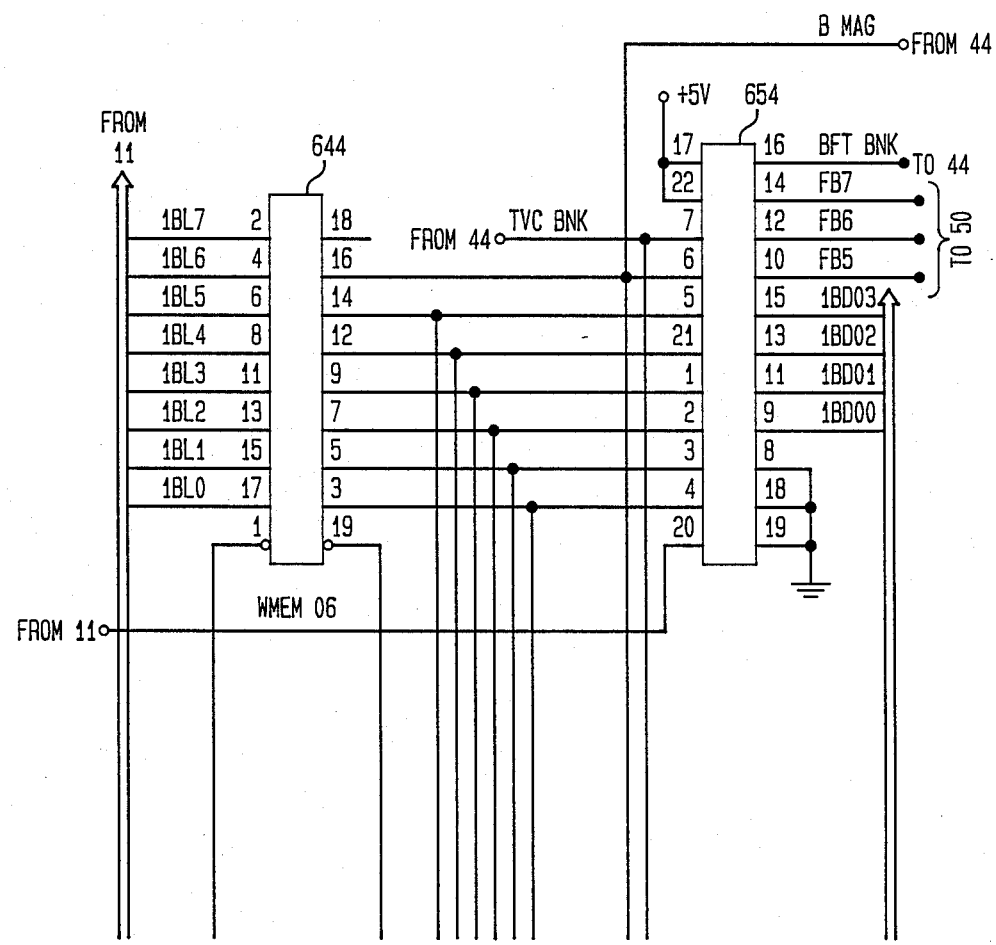
Figure 13C:
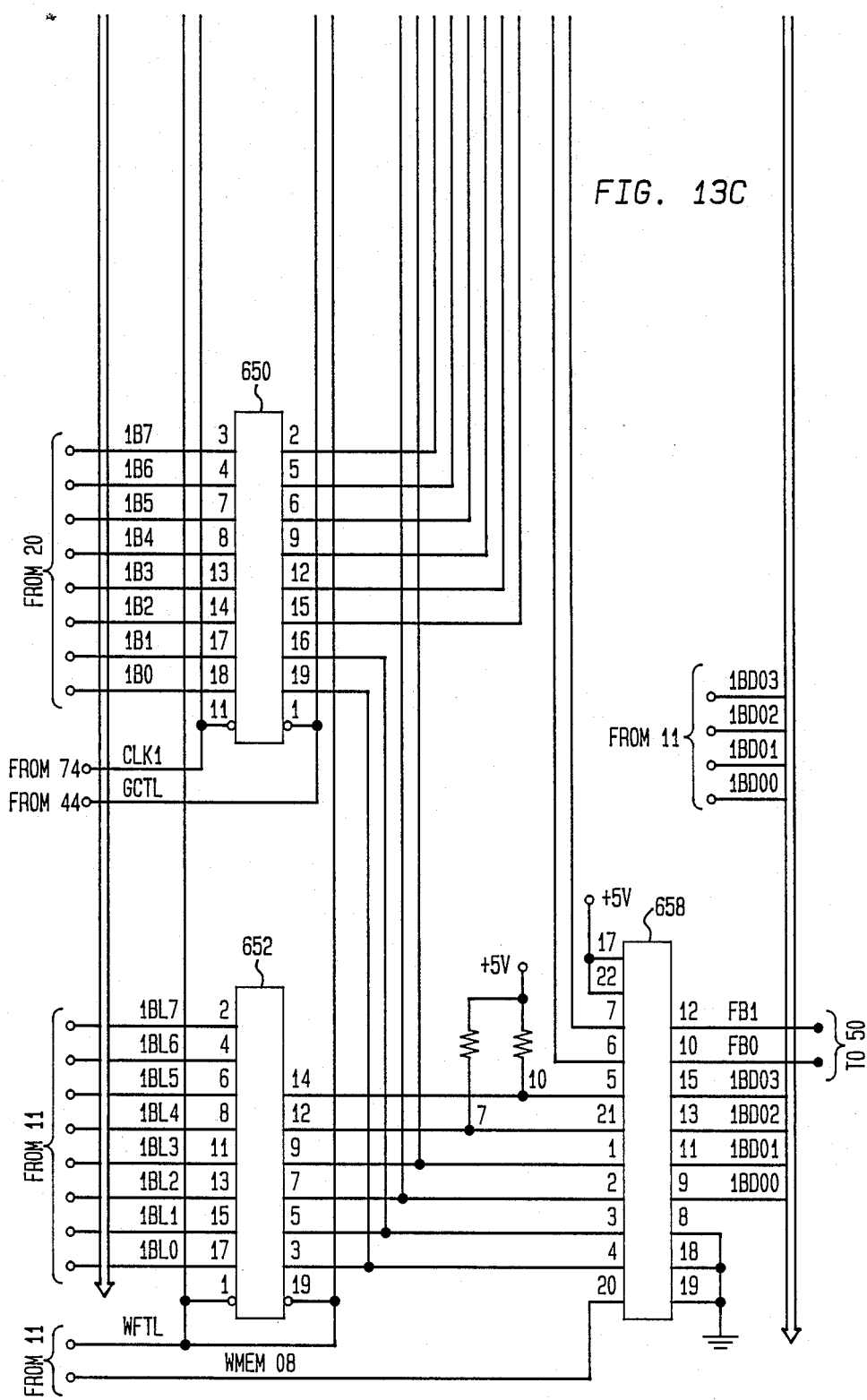
Figures 14, 14A:
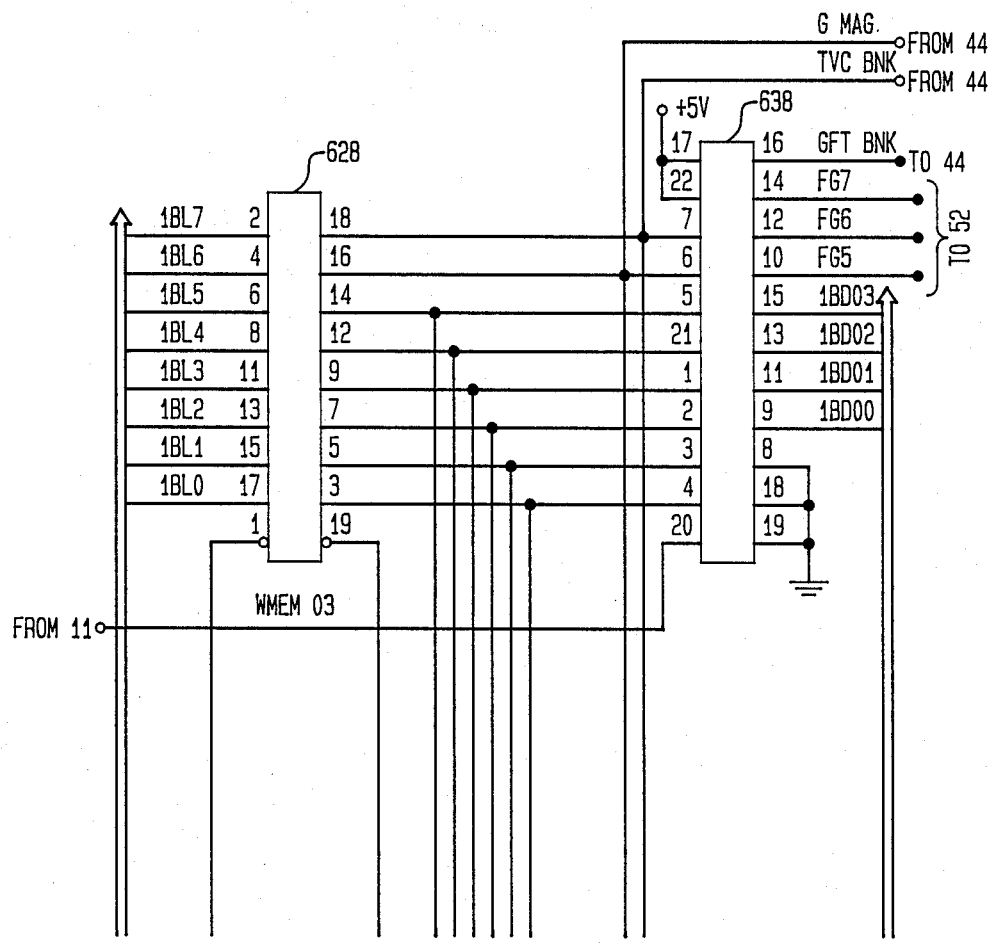
Figure 14B:
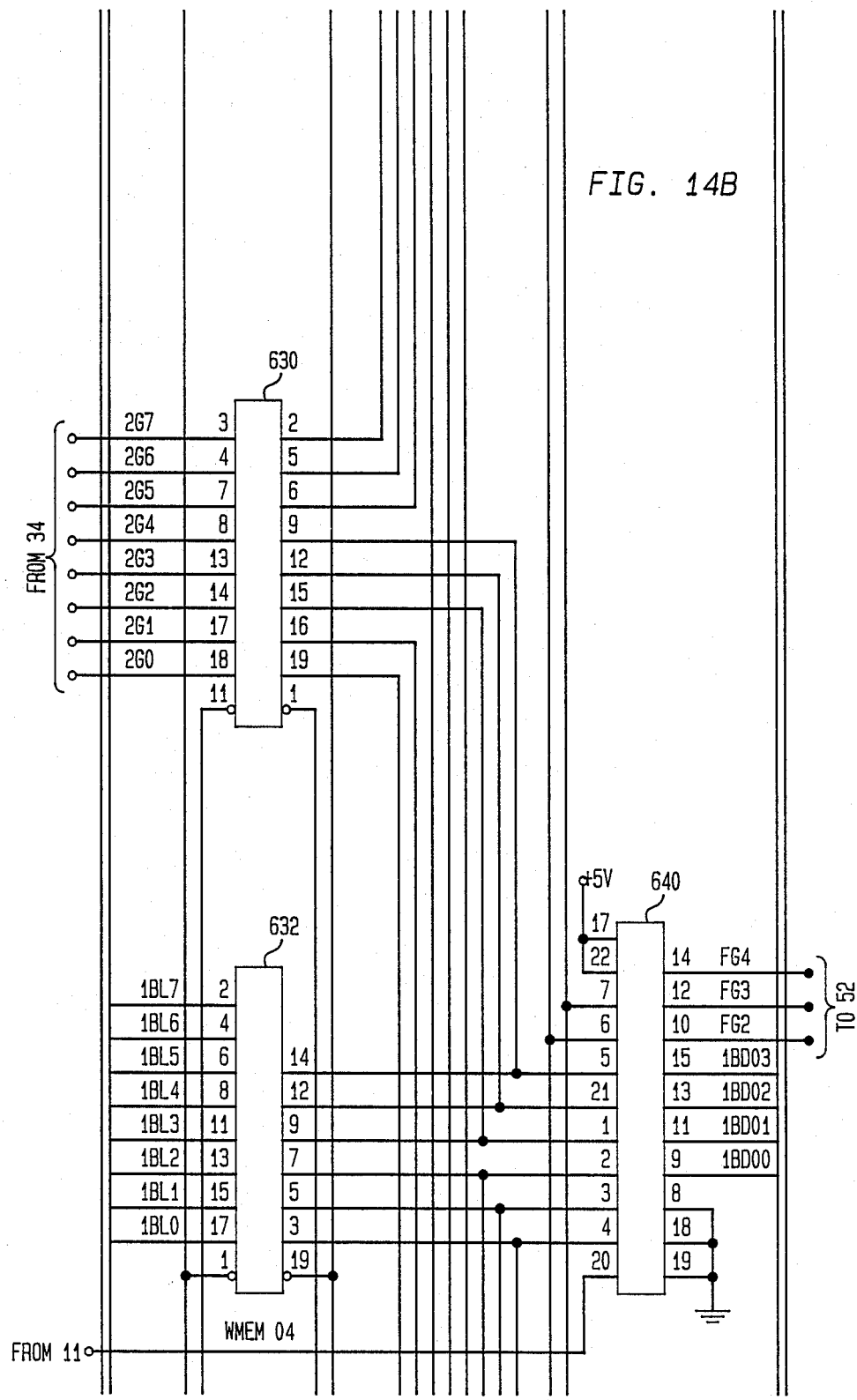
Figure 15:
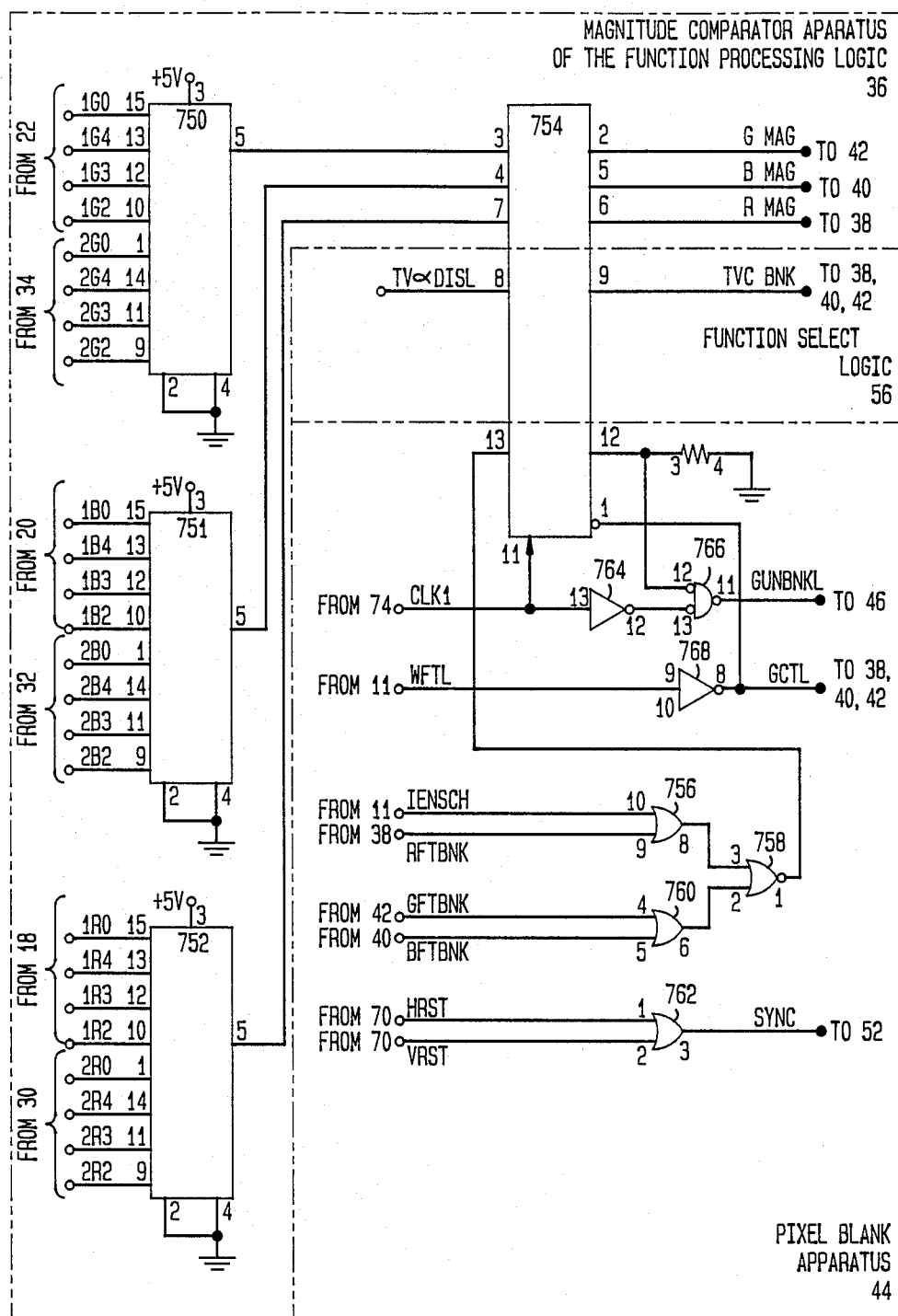
FIG. 15 is a detailed schematic of the components of the pixel blank, the magnitude comparator of the function processing logic and a part of the function select logic apparatus of this invention.

FIGS. 12–15 show the detailed schematics of the components of the preferred function processing logic apparatus 36 of the present invention. More specifically, FIGS. 12A–12C show the detailed schematics of the preferred red function processing logic apparatus 38, FIGS. 13A–13C show the detailed schematic of the components of the preferred blue function processing logic apparatus 40, and FIGS. 14A–14C show detailed schematics of the components of the preferred green function processing logic apparatus 42 of the present invention. In addition, FIG. 15 shows a detailed schematic of the components of the preferred pixel blank apparatus 44, the preferred magnitude comparator apparatus of the function processing logic 36 and the TV ALPHA DISL line to TVC BNK output which is a part of the function selector logic apparatus 56 of the present invention.

The two 8-bit values produced by the green lookup tables 22, 34 for each image memory refresh buffer 12, 24, respectively, are latched into the green function processing logic apparatus 42 inputs by the octal latches 630, 634. The three bits input to the middle order RAM, and the low-order bit input to the low order RAM, from each value are also output to the 4-bit magnitude comparator 750. The comparator 750 outputs back 1-bit to three 256×4 static RAM's 638, 640, 642 in the green function processing logic apparatus 42. The comparator 750 determines whether the four bits from the first image memory refresh buffer 12 satisfy the function "greater than" with respect to the four bits from the second image memory refresh buffer 24. The additional buffers 628, 632, 636 of the green function processing logic apparatus 42 permit these three static RAM's 638, 640, 642 to be loaded from the interface with the host computer 11.

The three static RAM's 638, 640, 642 taken together have 24 bits of input and 12 bits of output and a total of 768 table entries available. A complete truth table for an arbitrary function of two 8-bit inputs would require 65,536 table entries. Therefore, this circuit arrangement cannot perform all possible functions of two 8-bit inputs.

In order to alleviate the problem of lack of storage for a full 16-bits of input, the two 8-bit inputs are split into pairs of high-order three bits, middle-order three bits, and low-order two bits. Therefore, one of the RAM's 638 receives two 3-bit inputs which are the high-order 3 bits from the first green color lookup table means 22 and the high-order 3 bits from the second green color lookup table means 34. The next RAM 640 receives the middle three bit inputs from the first green color lookup table means 22 and from the second green color lookup table means 34. The third RAM 642 receives the low-order 2-bit inputs from the first green color lookup table means 22, and from the second green color lookup table means 34. By so dividing the 8-bit value inputs, none of the RAM's 638, 640, 642 has more than the 6 of its 8 input lines filled with input data, therefore only requiring 64 entries out of the 256 in each RAM.

This circuit arrangement allows bit-wise logical (Boolean) mathematical functions to be performed with full 8-bit accuracy. The high-order RAM 638 produces the high order 3-bits of the result. The middle order RAM 640 produces the middle order 3-bits of the result, and the low-order RAM 642 produces the low-order 2-bits of the result. In the preferred embodiment of the invention, for color applications 10, the high-order RAM 638 also produces a foruth bit GFT BNK which is output in certain functions to force the output of the latches 676, 678, 680 using the pixel blank apparatus 44 to hold the output of the function processing logic to zero. This operation blanks the inputs to the digital-toanalog converter(s) 46 (48, 50, 52) shown in FIGS. 16A–16C, resulting in a blank pixel on the raster-scan display 54.

Arithmetic functions, such as addition and subtraction can be approximated with the circuits of the function processing logic 36 (38, 40, 42) using the output of the 4-bit comparator 750 of the magnitude comparator shown in FIG. 15, to 6-bits of accuracy.

5. Function Select Logic Apparatus 56

Figure 18:
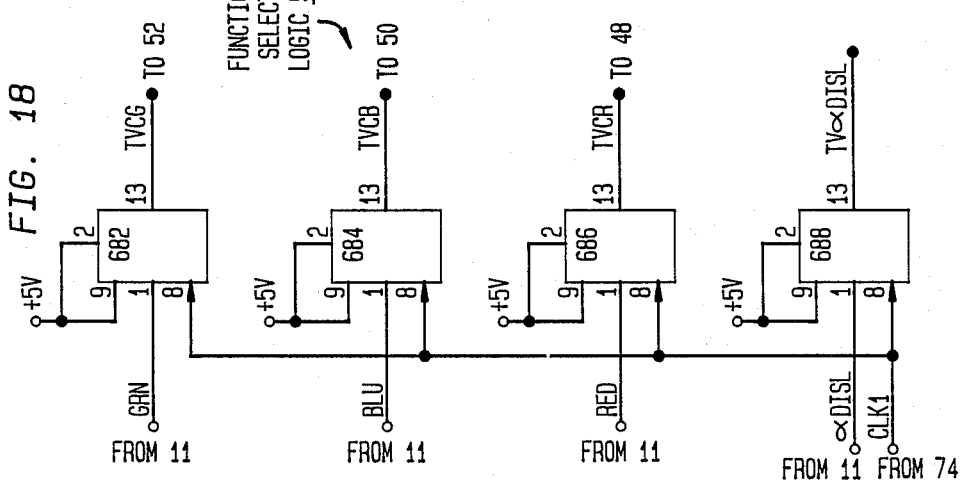
FIG. 18 is a detailed schematic of the function select syncrhonization logic apparatus of the present invention.

FIG. 18 shows the detailed schematic of the preferred function select logic apparatus 54 of the present invention. The function select logic apparatus 54, accepts a bit of data from the host computer interface 11, and passes the bit to the high-order bit of all three function lookup RAM's 638, 640, 642 to divide the entries of these RAM's into two halves, one for each function. Within each half of the available entries the aforementioned description of the function processing logic apparatus applies. Additional circuits 682, 684, 686 in the preferred function select logic apparatus 54 provide the ability to force the outputs of the green, blue and red digital-to-analog converters 726, 728, 730, respectively, to an "overbright" state. The "overbright" state is a level about 10% higher than the maximum function-table output can generate. Generation of the "overbright" state is useful, for example, in generating text or line drawings overlaid on the displayed image. When the "overbright" state is used, the actual function processing logic apparatus table result is ignored for any pixel for which the "overbright" signal is on.

6. Digital to Analog Converter Apparatus 46 (48, 50, 52)

Figure 16B:
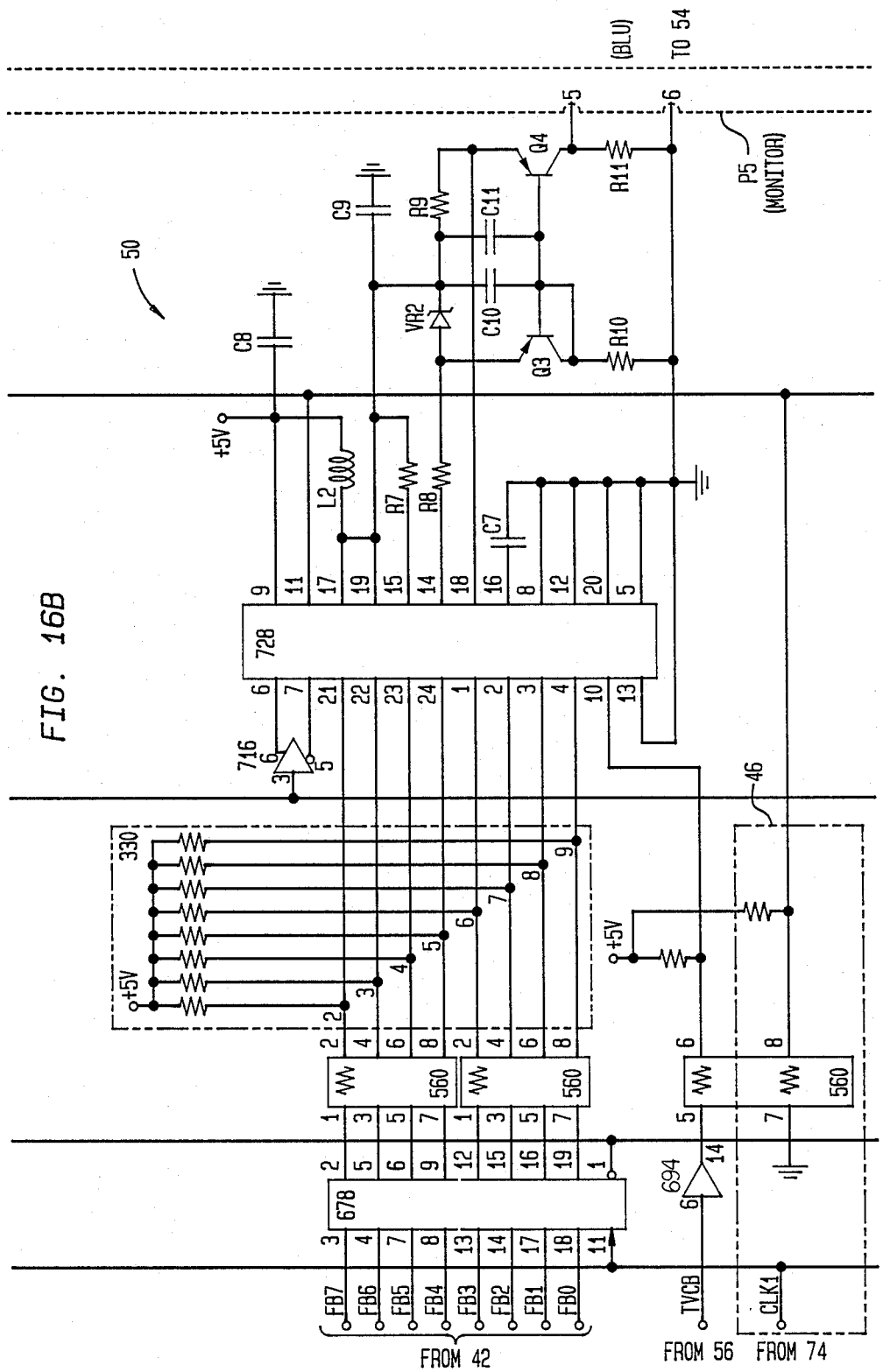
Figure 16C:
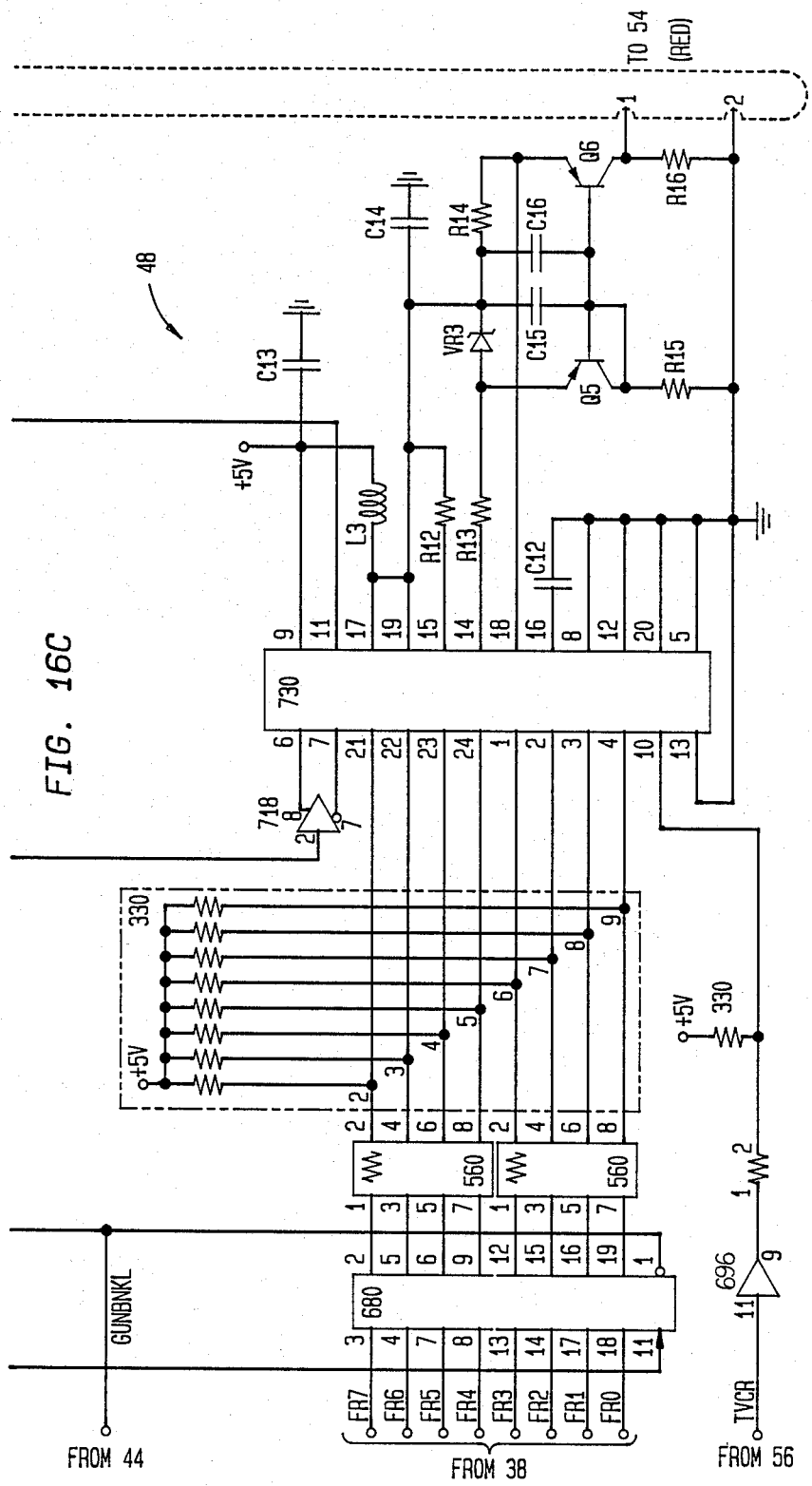

FIGS. 16A–16C show detailed schematics of the components of the preferred color digital-to-analog converter apparatus 46 (48, 50, 52) of the present invention. The 8-bit signal value from the function processing logic apparatus 36 enters the input latch 676 of the green digital-to-analog converter 52 having an integrated digital-to-analog converter circuit 726. If the pixel blank logic apparatus 44 has raised by GUN BNKL signal, the data from the function processing logic apparatus 36 (38, 40, 42), is inhibited from reaching the digital-to-analog converter 46. If the GUN BNKL signal has not been raised, then the green digital-to-analog converter circuit 726 converts the input digital signal to an analog signal. The discrete circuitry on the output of each digital-to-analog integrated circuit 726, 728, and 730, respectively, provides appropriate voltage and impedance for driving standard RGB video inputs to a color raster-scan display 54.

The function processing logic paths for red and blue are identical to that described for green, with the sole exception that green provides the horizontal sync (HSYNC) signal to the color raster-scan display apparatus 54.

EXAMPLES

Example 1

Figure 19B:
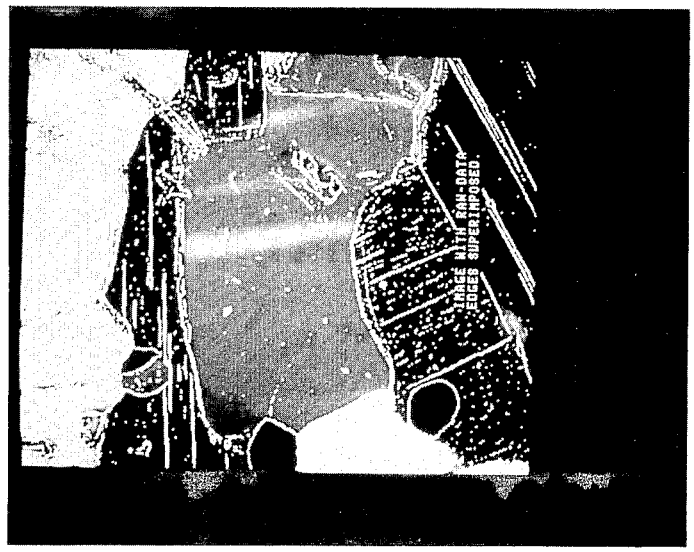
FIG. 19A-19D are black to white photographs of a CRT display showing our invention applied to a scanning electron micrograph of a geological sample.
Figure 19A:

FIGS. 19A–19D are black and white photographs of a CRT display showing the present invention applied to a scanning electron micrograph. FIG. 19A is a photograph of a raster-scan display of a digitized image of a geological rock sample. The sample has grey, black and white areas which represent different types of rock in the sample.

A common technique in digital image processing is called edge or boundary detection. Prior to this invention edge of boundary detection was done by two dimensional filtering of the digitized image data.

Figure 19D:
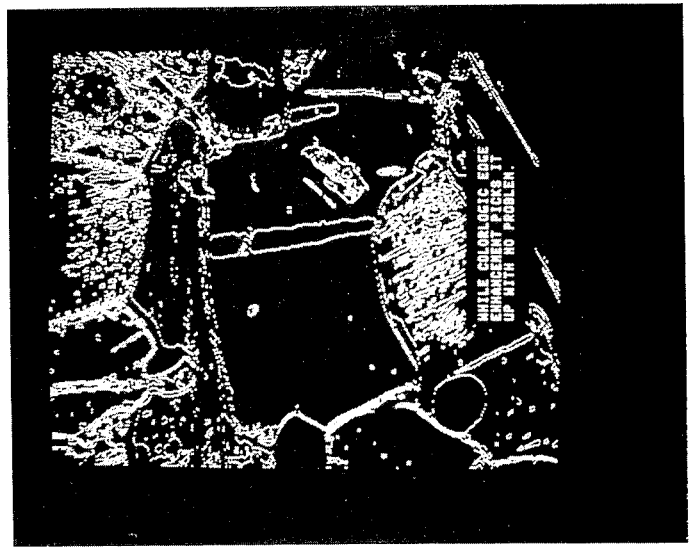
Figure 19C:
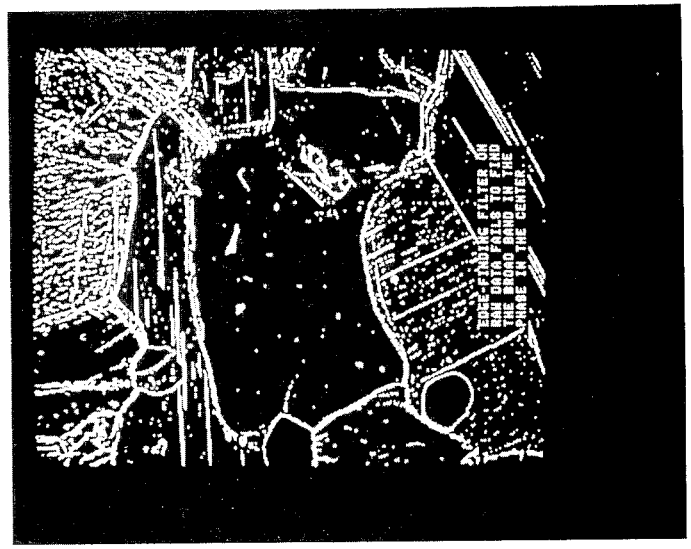

FIG. 19C is a photograph of the same digitized image as FIG. 19A after processing by a two-dimensional digital filter. Note the two differences in the image shown in FIG. 19C as compared to the image shown in FIG. 19A. First, the boundary of the broad, nearly-vertical light band in the center of the grey area is not visible. It is not visible because digital filtering works best on boundaries with very sharp contrasts, for instance an abrupt change from light to dark. The boundaries of the light band are broad and indistinct. Second, note that the filtered area has replaced the original image data in the image memory refresh buffer so that the original data is lost and cannot be displayed again until loaded from the host computer back into the image memory refresh buffer.

FIG. 19D is a photograph generated using the present invention. First, the same digitized image data shown in FIG. 19A is loaded into both the first image memory refresh buffer 12 and into the second image memory refresh buffer 24. Then the images are correctly aligned with the roam and zoom apparatus 13, 25, and 14, 26, respectively. Second, the color lookup table(s)16(18, 20, 22) and 28 (30, 32 and 34), respectively are adjusted so that they grey, white, light and black areas are each assigned a different color. As previously explained, the same color lookup table is used for each image memory refresh buffer.

The function processing logic apparatus are loaded with the XOR function, as previously described. Since the two images are perfectly aligned, the same color at all pixels, the resulting display is completely blank (All function results are 0). To get an image, the roam is changed on one of the image memory refresh buffers so that the images are offset by one pixel with respect to each other. As previously described, the XOR function produces a non-zero result only when two pixels from the two images have different colors, which occurs at the boundaries between different colors. Therefore, by adjusting the roam, the image shown in FIG. 19D appears on the display. As can be seen, the outline of the broad light band in the middle of the figure is clearly visible.

The original image data in each image memory refresh buffer has not been changed. By simply changing the function tables to pass the data from the first image memory refresh buffer and by using the orignal color lookup table values, the image shown in FIG. 19A is restored on the display. The process of restoring the original image on the display requies the host computer interface to load only about 1,000 of data, while reloading the entire image would require loading between 200,000 and 1,000,000 bytes of data, depending on the image size and complexity.

The image shown in FIG. 19B illustrates another function of the present invention. The original image shown in FIG. 19A was loaded into the first image memory refresh buffer, and the digitally-filtered data shown in FIG. 19C was loaded into the second image memory refresh buffer. The function processing logic was loaded with OR function, causing the display to show both images overlaid like transparencies to produce the resulting image shown in FIG. 19B.

Example 2

Figure 20B:
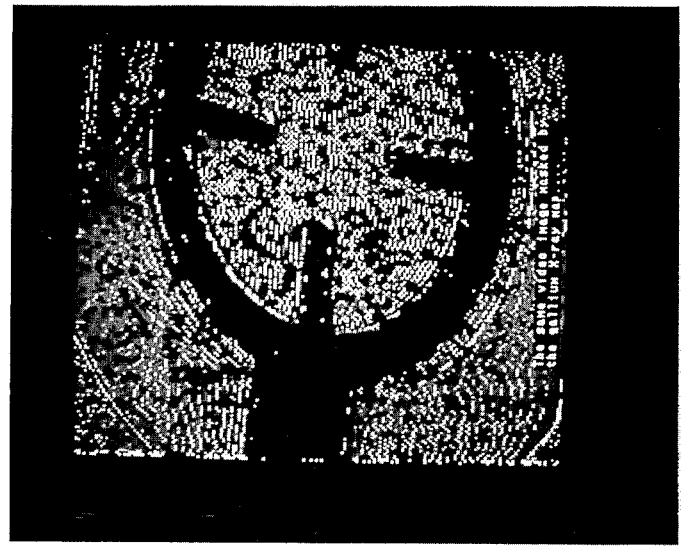
FIG. 20A-20B are black to white photographs of a CRT display showing our invention applied to a scanning electron micrograph of a gallium-arsenide semiconductor device.
Figure 20A:
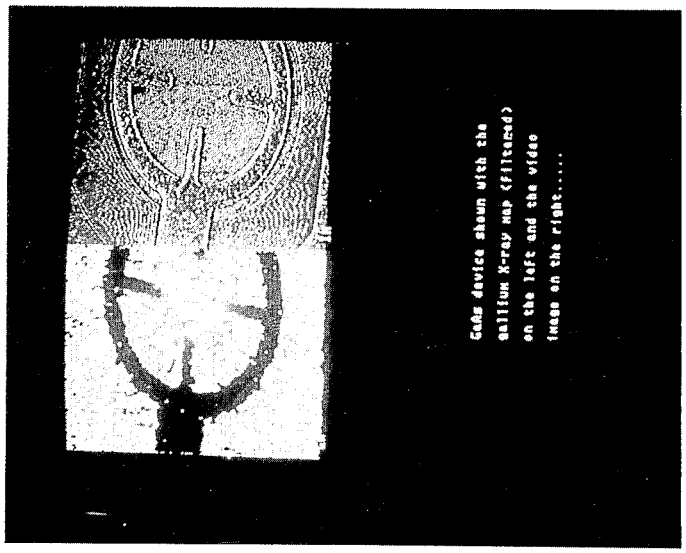

FIG. 20 illustrates the use of the AND function of the present invention. The AND function allows one image to act as a template for another image. The image shown in FIG. 20A is a composite of two small images loaded into different areas of the image memory refresh buffer. The image shown is part of a gallium-arsenide semiconductor device. The small image on the right side of the photograph is a digitized video image of the device as seen from a scanning electron micrograph. The image on the left side of the photograph is an "X-ray map" of the same image of the device shown on the right. X-ray mapping was generated by the host computer and represents the distribution of the chemical element gallium in the semiconductor device. White regions have relatively high amounts of gallium while black regions have small amounts of gallium.

As described for FIG. 19 above, the image data is loaded into both the first image memory refresh buffer and into the second image memory refresh buffer. The first image memory refresh buffer is displayed, zoomed and roamed until the electron micrograph image on the right fills the raster-scan display screen. The second image memory refresh buffer is then displayed, zoomed and roamed until the gallium X-ray map on the left fills the screen and is aligned with the electron micrograph image. The function processing logic apparatus are then loaded for the AND function which produces a visible result when neither input pixel is blank. Processing the AND function on the two images results in the image shown in FIG. 20B. Note that it is the same as the electron micrograph image of 20A wherever the gallium X-ray map is white, and is black whenever the gallium X-ray map is black.

The present invention is not limited to applications described above. It is an apparatus and a method which can be used whenever multiple digital images are to be compared. While the present invention has been described with respect to the preferred embodiments thereof, it will be understood by those of ordinary skill in the art that various changes can be made to the structure and function and parts and steps of the invention without departing from the spirit and scope thereof.

PARTS LIST

The part numbers and descriptions given below are industry standard and will be found in manufacturer's catalogs. They will be recognized and understood by anyone of ordinary skill in the art. The table below gives manufacturers and descriptions for each part number. Following the Parts List is a table of the part numbers and their component number shown in FIGS. 1–20. Different part numbers with the same standard description may differ in speed, power requirements, or other detailed electrical characteristics. Full descriptions may be found in the manufacturer's catalog.

| PART NO. | MFG. | DESCRIPTION |
|---|---|---|
| 93422 | AMD | 256 × 4 TTL RAM |
| 74F00 | FAIRCHILD | QUAD 2-INPUT NAND |
| 74F02 | FAIRCHILD | QUAD 2-INPUT NOR |
| 74F04 | FAIRCHILD | HEX INVERTER |
| 74F32 | FAIRCHILD | QUAD 2-INPUT OR |
| 74F74 | FAIRCHILD | DUAL D-TYPE FLIP-FLOP |
| 74F85 | FAIRCHILD | 4-BIT MAGNITUDE COMPARATOR |
| 74F86 | FAIRCHILD | QUAD 2-INPUT EXCLUSIVE OR |
| 74F138 | FAIRCHILD | 1-OF-8 DECODER |
| 74F161 | FAIRCHILD | ASYNCHRONOUS 4-BIT BINARY COUNTER |
| 74F244 | FAIRCHILD | OCTAL BUFFER |
| 74F273 | FAIRCHILD | OCTAL D-TYPE FLIP-FLOP |
| 74F374 | FAIRCHILD | OCTAL D-TYPE FLIP-FLOP |
| 74LS00 | TEXAS INST. | QUAD 2-INPUT NAND |
| 74LS02 | TEXAS INST. | QUAD 2-INPUT NOR |
| 74LS04 | TEXAS INST. | HEX INVERTER |
| 74LS08 | TEXAS INST. | QUAD 2-INPUT AND |
| 74LS11 | TEXAS INST. | TRIPLE 3-INPUT AND |
| 74LS20 | TEXAS INST. | DUAL 4-INPUT NAND |
| 74LS27 | TEXAS INST. | TRIPLE 3-INPUT NOR |
| 74LS32 | TEXAS INST. | QUAD 2-INPUT OR |
| 74LS74 | TEXAS INST. | DUAL D-TYPE FLIP-FLOP |
| 74LS86 | TEXAS INST. | QUAD 2-INPUT EXCLUSIVE OR |
| 74LS109 | TEXAS INST. | DUAL J-K FLIP-FLOP |
| 74LS138 | TEXAS INST. | 1-OF-8 DECODER |
| 74LS163 | TEXAS INST. | SYNCHRONOUS 4-BIT BINARY COUNTER |
| 74LS164 | TEXAS INST. | 8-BIT SIPO SHIFT REGISTER |
| 74LS174 | TEXAS INST. | HEX D-TYPE FLIP-FLOP |
| 74LS244 | TEXAS INST. | OCTAL BUFFER |
| 74LS283 | TEXAS INST. | 4-BIT BINARY FULL ADDER |
| 74LS393 | TEXAS INST. | DUAL 4-BIT BINARY COUNTER |
| 7497 | TEXAS INST. | SYNCHRONOUS 6-BIT BINARY RATE MULTIPLIER |
| 74S161 | TEXAS INST. | SYNCHRONOUS PRESETTABLE BINARY COUNTER |
| 74S163 | TEXAS INST. | SYNCHRONOUS 4-BIT BINARY COUNTER |
| 4256 | TEXAS INST. | 256K DRAM |
| 87S291 | NATIONAL SEMI. | PROGRAMMABLE READ-ONLY MEMORY |
| 14040 | MOTOROLA | 12-BIT BINARY COUNTER |
| 8641 | NATIONAL SEMI. | QUAD UNIFIED BUS TRANSCEIVER |
| TDC 1018 | TRW | 8-BIT D/A CONVERTER |
| 9638 | FAIRCHILD | DUAL DIFFERENTIAL LINE DRIVER |
| 10T60 | ESC | DELAY LINE |

| COMPONENT NUMBERS | INDUSTRY STANDARD PART NUMBER |
|---|---|
| 102 | 74S163 |
| 104, 106 | 74LS04 |
| 110 | 74F00 |

-continued

| COMPONENT NUMBERS | INDUSTRY STANDARD PART NUMBER |
|---|---|
| 112 | 74LS164 |
| 114, 116 | 74LS11 |
| 118 | 74LS00 |
| 120 | 74LS27 |
| 122 | 74LS04 |
| 124–128 | 74LS32 |
| 130 | 74LS04 |
| 132, 134 | 7497 |
| 136 | 74LS174 |
| 138, 140 | 74LS27 |
| 142 | 74LS08 |
| 144 | 74F00 |
| 146 | 74LS08 |
| 202 | 74LS161 |
| 204 | 74F138 |
| 206–216 | 74LS74 |
| 218, 220 | 74F74 |
| 222, 224 | 74LS00 |
| 226 | 74LS04 |
| 302, 304 | 74LS74 |
| 306 | 74LS08 |
| 308 | 74LS393 |
| 310, 312 | 74LS244 |
| 314 | 74LS20 |
| 316 | 8641 |
| 318 | 74LS02 |
| 320 | 74LS04 |
| 322, 324 | 74F02 |
| 326 | 74LS244 |
| 328 | 14040 |
| 330, 332 | 87S291 |
| 334–342 | 74LS283 |
| 344–352 | 74LS163 |
| 354–360 | 74F244 |
| 362 | 74LS32 |
| 364 | 74LS04 |
| 366, 368 | 74LS00 |
| 370 | 74LS109 |
| 372 | 74LS86 |
| 374 | 74F02 |
| 410–472 | 4256 |
| 502–508 | 74SL244 |
| 510 | 74LS04 |
| 512–516 | 74F374 |
| 518 | 74LS374 |
| 600 | 74F374 |
| 602–612 | 93422 |
| 614 | 74F3474 |
| 616–626 | 93422 |
| 628 | 74LS244 |
| 630 | 74F374 |
| 632 | 74LS244 |
| 634 | 74F374 |
| 636 | 74LS244 |
| 638–642 | 93422 |
| 644 | 74LS244 |
| 646 | 74F374 |
| 648 | 74LS244 |
| 650 | 74F374 |
| 652 | 74LS244 |
| 654–658 | 93422 |
| 660 | 74LS244 |
| 662 | 74F374 |
| 664 | 74LS244 |
| 666 | 74F374 |
| 668 | 74LS244 |
| 670–674 | 93422 |
| 676–680 | 74F273 |
| 682–688 | 74LS164 |
| 690–696 | 74F244 |
| 714–718 | 9638 |
| 720, 722 | 74F04 |
| 724 | 10T60 |
| 726–730 | TDC 1018 |
| 738 | 74F86 |
| 740 | 74F04 |
| 742 | 74F86 |
| 744 | 74F04 |
| 746 | 9638 |
| 748 | 74F02 |

-continued

| COMPONENT NUMBERS | INDUSTRY STANDARD PART NUMBER |
|---|---|
| 750–752 | 74F85 |
| 754 | 74F374 |
| 756 | 74F32 |
| 758 | 74F02 |
| 760, 762 | 74F32 |

GLOSSARY

AND
A circuit which has two or more input-signal ports and which delivers an output if and only if every input signal port is simultaneously energized.

BUFFER (Register Circuit)
A switching circuit with memory elements that can store from a few to millions of bits of coded information: when needed, the information can be taken from the circuit in the same code as the input, or in a different code.

DECODER
A matrix of logic elements that selects one or more input channels, depending on the combination of input signals present.

DELAY LINE
A transmission line, or an electric network approximation of it, which, if terminated in its characteristic impedance, will reproduce as its output a waveform applied to its input terminals with little distortion, but at a time delayed by an amount dependent upon the electrical length of the line.

D/A (Digital-to-Analog) CONVERTER
A converter in which digital input signals are changed to essentially proportional analog signals.

EXCLUSIVE-OR
A logic circuit that produces a binary output signal of 1 if its two binary output signals are the same, and an output signal of 0 if the input signals differ.

FLIP-FLOP (Bistable Multivibrator)
A multivibrator in which either of the two active devices may remain conducting, with the other nonconducting, until the application of an external pulse.

INVERTER
A logic device that inverts the the input signal, so that the output is out of phase with the input.

LATCH
A circuit identical in function to a BUFFER, except that its contents are loaded from the input only upon the application of an external pulse, at which point the contents appear at the output until new data is loaded.

LINE DRIVER
An integrated circuit that acts as the interface between logic circuits and a two-wire transmission line.

MAGNITUDE COMPARATOR
An electronic circuit that produces an output voltage or current whenever two input levels simultaneously satisfy predetermined amplitude requirements.

NAND (Not-And)
A logic circuit whose output signal is a logical 1 if any of its inputs is a logical 0, and whose output signal is a logical 0 if all of its inputs are logical 1.

NOR (Not-Or)
A circuit in which output voltage appears only when signal is absent from all of its input terminals.

OR

A multiple-input circuit whose output is energized when any one or more of its inputs is in a prescribed state.

PROM (Programmable Read-Only Memory)

A data storage device whose contents can be loaded once, but not altered. PROM's do not lose their contents when power is removed.

RAM (Random Access Memory)

A data storage device having the property that the time required to access a randomly selected datum does not depend upon the time of the last access or the location of the most recently accessed datum.

SHIFT REGISTER

A computer hardware element constructed to perform shifting of its contained data.

We claim:

1. An improved computer graphics digital image comparison apparatus for processing and comparing at least two digitally stored images provided from a host computer and displaying on a raster-scan display means, a visible image of the result of said comparison, the apparatus comprising:
   (a) at least two image memory refresh buffer means for digitally storing said images in respective pixel matrices, each said matrix having at least two bits per pixel;
   (b) zoom and roam logic means for each of said image memory refresh buffer means for independently providing on said raster-scan display means, apparent magnification of a region of each digitally stored image, said apparent magnification including the selection of a pixel in each of said image memory refresh buffer means, which corresponds to a specific pixel correlated with said images being displayed on said raster-scan display means, said region having a selected size and position within the image memory refresh buffer means;
   (c) lookup table means for each of said image memory refresh buffer means, each said lookup table means independently transforming into a programmed pixel value, each said pixel stored in said image memory refresh buffer means, and selected by the zoom and roam logic means;
   (d) function processing logic means for processing said programmed pixel values from all of said lookup table means and generating new programmed pixel values;
   (e) digital-to-analog conversion means for converting said new programmed pixel values generated by said function processing logic means, into an analog signal; and,
   (f) raster-scan display means for using said analog signal to produce a visible image.

2. The apparatus of claim 1, wherein said zoom and roam logic means comprises:
   (a) roam means for setting said position of said region within the image memory refresh buffer means; and,
   (b) zoom means for providing apparent continuous magnification which chooses a ratio of a display size in pixels on said raster-scan display means to said selected size of said region set at said position in said image memory refresh buffer means, wherein the ratio of the display size to the selected size of said region is a ratio of two whole numbers each not greater than the display size.

3. The apparatus of claim 2 wherein said zoom means further comprises:
   (a) N-bit storage register means for storing a zoom factor number ranging from 0 to $2^N-1$ in $2^N$ integer steps, the zoom factor number of the N-bit storage register controlling,
   (i) a first variable rate N-bit binary rate multiplier means for dividing a pixel clock signal, wherein for every $2^N$ pixel clock pulses which enter said first multiplier means, a number of pulses which is a function of the stored zoom factor number leaves said first multiplier means,
   (ii) a second variable rate N-bit binary rate multiplier means for dividing a line clock signal wherein for every $2^N$ line clock pulses which enter said second multiplier means, a number of pulses which is a function of the stored zoom factor number, leaves said second multiplier means; and,
   (b) zero detection means for comparing the zoom factor number to zero and if the zoom factor number is equal to zero thereby causing the number of pulses leaving each of said multiplier means, respectively, to be equal to the number of pulses entering each of the multiplier means, respectively.

4. The apparatus of claim 2, wherein
   (a) said lookup table means comprises a color lookup table means for each of said image memory refresh buffer means including at least three independently programmable lookup table means each corresponding to a different additive primary color for transforming said pixel values selected by said zoom and roam logic means;
   (b) said function processing logic means include at least three function processing logic means each corresponding to a different additive primary color, for processing the programmable values from all of said lookup table means corresponding to a particular primary color and generating a new value for the particular primary color;
   (c) said digital-to-analog conversion means includes at least three digital-to-analog conversion means each corresponding to the different additive primary color for converting the new value generated by the function processing logic means corresponding to the particular additive primary color to an analog signal; and
   (d) said raster-scan display means includes a color raster-scan means for using all of the analog signals corresponding to the different additvie primary colors to produce a visible color image.

5. The apparatus of claim 4, wherein each of said function processing logic means includes an additional logic means for processing said programmable values from all of said lookup table means corresponding to a particular additive primary color, and generating an additional value for the particular primary color;
   said apparatus further including pixel blank means for inhibiting all said digital-to-analog conversion means when at least one of said additional values generated by at least one of said additional logic means is equal to a particular programmed value.

6. The apparatus of claim 5, wherein each of said function processing logic means corresponding to a said different additive primary color is independently programmable for a specific process.

7. The apparatus of claim 6, wherein:
   (a) each of said function processing logic means are independently programmable for at least two specific processes; and, (b) said apparatus further including a function select logic means for selecting which of the specific processes is performed by said function processing logic means on said programmable values, the specific processes selected by the function select logic means corresponding to a specific pixel on said raster-scan display means.

8. The apparatus of claim 2, wherein:
(a) each of said function processing logic means are independently programmable for at least two specific processes; and,
(b) said apparatus further including a function select logic means for selecting which of the specific processes is performed by said function processing logic means on said programmable values, the specific processes selected by the function select logic means corresponding to a specific pixel on said raster-scan display means.

9. An improved zoom and logic means for a digital computer graphics apparatus, of the type using an image memory refresh buffer, for providing on a raster-scan display, apparent magnification of a region of a digitally stored image stored in a pixel matrix, said region having a selected size and position within said image memory refresh buffer means, where said provision of continuous magnification includes interactively selecting a pixel in said image memory refresh buffer means which corresponds to a specific pixel on the raster-scan display means, and selecting a zoom factor number from 0 to $2^N-1$ where N equals the binary bit length of said zoom factor number, wherein the improvement comprises:
(a) roam means for setting the position of the region of said image displayed on said raster-scan display means, said region corresponding to a region of said pixel matrix stored within the image memory refresh buffer means; and,
(b) zoom means for providing apparent magnification of said image, and having non-uniform image magnification step increments wherein said image magnification step increments are small near unity image magnification, the apparent magnification of said image extending over the image magnification range of 1 to $2^N$, and said magnification step increments becoming progressively larger at magnifications away from unity image magnification.

10. The apparatus of claim 9, wherein said zoom means further comprises:
N-bit storage register means for storing a zoom factor number from 0 to $2^N-1$ in $2^N$ integer steps;
a first variable rate N-bit binary rate multiplier means for dividing a pixel clock signal wherein for every $2^N$ pixel clock pulses which enter said first multiplier means, a number of pulses, which is a function of the stored zoom factor number, leaves said first multiplier means;
a second variable rate N-bit binary rate multiplier means for dividing a line clock signal wherein for every $2^N$ line clock pulses which enter said second multiplier means, a number of pulses, which is a function of the stored zoom factor number, leaves said second multiplier means, said zoom factor number of said N-bit storage register means controlling said first and second variable rate N-bit rate multiplier means; and
zero detection means for comparing the zoom factor number to zero and if the zoom factor number is equal to zero causing the number of pulses leaving each of the multiplier means, respectively, to be equal to the number of pulses entering each of said multiplier means, respectively, said magnification of said image produced by said zoom means being proportional to $2^N$ divided by the quantity equal to $2^N$ minus said zoom factor.

11. An improved computer graphics digital image comparison method for processing and comparing at least two digitally stored images and displaying a visible image of the result on a raster-scan display means, the method comprising the steps of:
(a) storing at least two digital images from a host computer in at least two image memory refresh buffer means in a pixel matrix having at least two bits per pixel;
(b) selecting a pixel in each of said image memory refresh buffer means which corresponds to a specific pixel on the raster-scan display means, said selection step using a zoom and roam logic means for each of the image memory refresh buffer means for independently providing on the raster-scan display means, apparent magnification of a region of the digitially stored image having a selected size and position within each of the memory refresh buffer means;
(c) transforming into programmed pixel value, each said pixel value stored in said image memory refresh buffer means selected by the zoom and roam logic means, said transformation being carried out using an independent lookup table means for each of the image memory refresh buffer means;
(d) processing said programmed pixel values from all of said lookup table means and generating new programmed pixel values, using a function processing logic means;
(e) converting said new programmed pixel values generated by the function processing logic means, into an analog signal by using a digital-to-analog conversion means; and,
(f) producing a visible image by displaying the analog signal on a raster-scan display means.

12. The method of claim 11, wherein said selecting step further comprises:
(a) setting said position of said region within the image memory refresh buffer means by using a roam means; and,
(b) choosing a ratio of a display size in pixels on said raster-scan display means to said selected size of said region set at said position in said image memory refresh buffer means, by using a zoom means for providing apparent continuous magnification, wherein the ratio of the display size to the selected size of said region is a ratio of two whole numbers each not greater than the display size.

13. The method of claim 12, wherein said choosing step further comprises:
(a) storing a zoom factor number ranging from 0 to $2^N-1$ in $2^N$ integer steps in an N-bit storage register means,
(b) dividing a pixel clock signal by means of a first variable rate N-bit binary rate multiplier means controlled by said stored zoom factor number in the N-bit storage register means, wherein for every $2^N$ pixel clock pulses which enter said first multiplier means, a number of pulses which is a function of the stored zoom factor number, leaves said first multiplier means;

(c) dividing a line clock signal by means of a second variable rate N-bit binary rate multiplier means controlled by said stored zoom factor number in the N-bit storage register means, wherein for every $2^N$ line clock pulses which enter said second multiplier means, a number of pulses which is a function of the stored zoom factor number, leaves said second multiplier means; and, (d) comparing the zoom factor number to zero and if the zoom factor number is equal to zero, causing the number of pulses leaving each of said multiplier means, respectively, to be equal to the number of pulses entering each multiplier means, respectively, by using a zero detection means.

14. The method of claim 12,
wherein said transforming step further comprises transforming said pixel selected by said zoom and roam logic means by using said independent programmable lookup table means which includes at least three independently programmable lookup table means for each of said image memory refresh buffer means, each corresponding to a different additive primary color;

wherein said processing step further comprises processing the programmable values from all of the lookup table means corresponding to a particular additive primary color and generating a new value for the particular additive primary color by using said function processing logic means which includes at least three function processing logic means each corresponding to a different additive primary color;

wherein said converting step further comprises converting the new value generated by the function processing logic means corresponding to the particular additive primary color to an analog signal by using said digital-to-analog conversion means which includes at least three digital-to-analog conversion means each corresponding to the different additive primary color; and wherein said producing a visible image step further comprises producing a visible color image using all the analog signals corresponding to the different additive primary colors by using said raster-scan display means which includes a color raster-scan display means.

15. The method of claim 14, wherein said processing step further comprises processing said programmable values from all said lookup table means corresponding to a particular additive primary color, and generating an additional value for the particular additive primary color using said function processing logic means which includes an additional logic means for said processing,
said method further comprising the additional step of inhibiting all said digital-to-analog conversion means, by using a pixel blank means, when at least one of said additional values generated by at least one of said additional logic means is equal to particular programmed value.

16. The method of claim 15, wherein said processing step further comprises independently programming said function processing logic means corresponding to said different additive primary color for a specific process.

17. The method of claim 16, wherein:

(a) said programming step further comprises independently programming each of said function processing logic means for at least two specific processes; and, (b) said method further comprising the additional step of selecting which of the specific processes is performed by said function processing logic means on said programmable values, by means of a function select logic means, the specific processes selected by the function select logic means corresponding to a specific pixel on said raster-scan display means.

18. The method of claim 12, wherein:

(a) said programming step further comprises independently programming each of said function processing logic means for at least two specific processes; and, (b) said method further comprising the additional step of selecting which of the specific processing is performed by said function processing logic means on said programmable values, by means of a function select logic means, the specific processes selected by the function select logic means corresponding to a specific pixel on said raster-scan display means.

19. A method for providing zoom and roam capability for an image memory refresh buffer means of a digital computer graphics apparatus, to provide on a raster-scan display, apparent magnification of a region of a digitally stored image stored in a pixel matrix, said region having a selected size and position within image memory refresh buffer means, said method comprising the steps of:

(a) selecting said position of said region within the image memory refresh buffer means by using a roam means; and, (b) selecting said size of said region, by (i) storing a zoom factor number ranging from 0 to $2^N-1$ in $2^N$ integer steps in an N-bit storage register means, (ii) dividing a pixel clock signal by means of a first variable rate N-bit binary rate multiplier means controlled by said stored zoom factor number in the N-bit storage register means, wherein for every $2^N$ pixel clock pulses which enter said first multiplier means, a number of pulses, which is a function of the stored zoom factor number, leaves said first multiplier means;

(iii) dividing a line clock signal by means of a second variable rate N-bit binary rate multiplier means controlled by said stored zoom factor number in the N-bit storage register means wherein for every $2^N$ line clock pulses which enter said second multiplier means, a number of pulses, which is a function of the stored zoom factor number, leaves said second multiplier means; and, (iv) comparing the zoom factor number to zero and if the zoom factor number is equal to zero, causing the number of pulses leaving each of said multiplier means, respectively, to be equal to the number of pulses entering each multiplier means, respectively, by using a zero detection means.

20. An improved computer graphics digital image processing apparatus for processing at least two digitally stored images provided from a host computer and displaying a visible image of the result on a raster-scan display means, said apparatus comprising:

(a) at leat two image memory refresh buffer means for digitally storing said images in respective pixel matrices, each said matrix having at least two bits per pixel;

(b) zoom and roam logic means for each of said image memory refresh buffer means for independently providing on said raster-scan display means, apparent magnification of a region of each digitally stored image;

(c) lookup table means for each of said image memory refresh buffer means, each said lookup table means independently transforming into a programmed pixel value, each said pixel of said image memory refresh buffer means, selected by the zoom and roam logic means;

(d) function processing logic means for processing said programmed pixel values from all of said lookup table means and generating new programmed pixel values therefrom;

(e) digital-to-analog conversion means for converting said new programmed pixel values into an analog signal; and (f) raster-scan display means for using said analog signal to produce a visible image.

21. The apparatus of claim 20 wherein said lookup table means comprises a color lookup table means for each of said image memory refresh buffer means.

* * * * *

UNITED STATES PATENT AND TRADEMARK OFFICE
CERTIFICATE OF CORRECTION

PATENT NO. : 4,825,388

DATED : April 25, 1989

INVENTOR(S) : Dailey, et al.

It is certified that error appears in the above-identified patent and that said Letters Patent is hereby corrected as shown below:

On the cover sheet, after "Attorney, Agent, or Firm" should additionally read --Alan M. Sack--.

In Column 2, line 9, the word "test" should be --text--.

In Column 19, line 44, the word "couner" should be --counter--.

In Column 22, line 64, the word "foruth" should be --fourth--.

Signed and Sealed this

First Day of January, 1991

*Attest:*

HARRY F. MANBECK, JR.

*Attesting Officer*   *Commissioner of Patents and Trademarks*